US009633256B2

(12) United States Patent
Chulinin

(10) Patent No.: US 9,633,256 B2
(45) Date of Patent: Apr. 25, 2017

(54) METHODS AND SYSTEMS FOR EFFICIENT AUTOMATED SYMBOL RECOGNITION USING MULTIPLE CLUSTERS OF SYMBOL PATTERNS

(71) Applicant: ABBYY Development LLC, Moscow (RU)

(72) Inventor: Yuri Chulinin, Moscow (RU)

(73) Assignee: ABBYY Development LLC (RU)

( * ) Notice: Subject to any disclaimer, the term of this patent is extended or adjusted under 35 U.S.C. 154(b) by 34 days.

(21) Appl. No.: 14/565,782

(22) Filed: Dec. 10, 2014

(65) Prior Publication Data

US 2015/0213313 A1  Jul. 30, 2015

(51) Int. Cl.
*G06K 9/18* (2006.01)
*G06K 9/00* (2006.01)

(52) U.S. Cl.
CPC ..... *G06K 9/00456* (2013.01); *G06K 9/00429* (2013.01); *G06K 2209/011* (2013.01)

(58) Field of Classification Search
CPC .............................. G06K 9/00456; G06K 9/74
USPC .................................................. 382/182, 185
See application file for complete search history.

(56) References Cited

U.S. PATENT DOCUMENTS

| 4,950,167 A | 8/1990 | Harris et al. |
| 5,425,110 A | 6/1995 | Spitz et al. |
| 5,771,712 A | 6/1998 | Campbell et al. |
| 6,005,986 A | 12/1999 | Ratner et al. |
| 6,512,522 B1 | 1/2003 | Miller et al. |
| 6,556,712 B1 * | 4/2003 | Loudon ............... G06K 9/6297 382/187 |
| 6,657,625 B1 | 12/2003 | Chik et al. |
| 6,661,417 B1 | 12/2003 | Cheng |
| 6,738,518 B1 * | 5/2004 | Minka ...................... G06K 9/72 382/194 |
| 7,013,264 B2 | 3/2006 | Dolan et al. |

(Continued)

OTHER PUBLICATIONS

Cenparmi, et al., "Analysis and Recognition of Asian Scripts—the State of the Art", Proceeding of the Seventh International Conference on Document Analysis and Recognition (ICDAR), 2003, 13 pages.

(Continued)

*Primary Examiner* — Ruiping Li
(74) *Attorney, Agent, or Firm* — Veronica Weinstein

(57) ABSTRACT

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed carry out an initial processing step on one or more scanned images to identify, for each symbol image within a scanned document, a set of graphemes that match, with high frequency, symbol patterns that, in turn, match the symbol image. The set of graphemes identified for a symbol image is associated with the symbol image as a set of candidate graphemes for the symbol image. The set of candidate graphemes are then used, in one or more subsequent steps, to associate each symbol image with a most likely corresponding symbol code.

22 Claims, 50 Drawing Sheets

(56) References Cited

U.S. PATENT DOCUMENTS

| | | |
|---|---|---|
| 7,027,054 B1 | 4/2006 | Cheiky et al. |
| 7,106,905 B2 | 9/2006 | Simske |
| 7,254,269 B2 | 8/2007 | Nakagawa et al. |
| 7,805,004 B2 | 9/2010 | Liu et al. |
| 8,027,539 B2 | 9/2011 | Chen et al. |
| 8,041,119 B2 | 10/2011 | Tsai et al. |
| 8,478,045 B2 | 7/2013 | Sun et al. |
| 2011/0043528 A1 | 2/2011 | Solomonov et al. |

OTHER PUBLICATIONS

Liu, et al., "ICDAR 2011 Chinese Handwriting Recognition Competition", International Conference on Document Analysis and Recognition, 2011, 6 pages, China.

Macrostie, et al., "The BBN Byblos Japanese OCR System", Speech & Language Processing Department, 2004, 4 pages, BBN Technologies, Cambridge, MA.

Zhang, et al., "Novel Method of Feature Extraction and Classification for OPCCR", 2016 International Symposium on Computer, Consumer and Control, 2016, 4 pages, Image Information Institute, College of Electronics and Information Engineering, Sichuan University, Chengdu, China.

\* cited by examiner

<My goal was supposed to be a math teacher, however, I ended up to be hired by a personal computer company.>

Taking programing classes in my college and purchasing a microcomputer seemed to be a trigger for working with a computer. One day, when I got news that a new, high peformance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

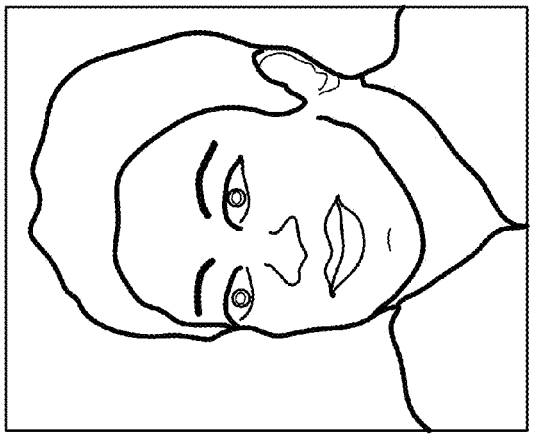

Fall Down
Seven Times,
Get up Eight

Handmade Search Engine
by Grope

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FIG. 1B

| symbol | h/hw | v/vw | b | num vs | num hs | num vs + num hs | v/h |
|---|---|---|---|---|---|---|---|
| 1 | .2 | .6 | .12 | 0 | 0 | 0 | 3 |
| 2 | .6 | .6 | .28 | 0 | 0 | 0 | 1 |
| 3 | .6 | .2 | .12 | 0 | 0 | 0 | .33 |
| 4 | .2 | .6 | .12 | 0 | 0 | 0 | 3 |
| 5 | .6 | .46 | .2 | 0 | 0 | 0 | .77 |
| 6 | .6 | .46 | .2 | 0 | 0 | 0 | .77 |
| 7 | .2 | .6 | .6 | 1 | 0 | 1 | 3 |
| 8 | .6 | .6 | .28 | 0 | 0 | 0 | 1 |
| 9 | .6 | .6 | .28 | 0 | 0 | 0 | 1 |
| 10 | .6 | .6 | .28 | 0 | 0 | 0 | 1 |
| 11 | .46 | .6 | .2 | 0 | 0 | 0 | 1.3 |
| 12 | .46 | .6 | .2 | 0 | 0 | 0 | 1.3 |
| 13 | .6 | .6 | .28 | 0 | 0 | 0 | 1 |
| 14 | .6 | .6 | .32 | 0 | 0 | 0 | 1 |
| 15 | .6 | .2 | .16 | 0 | 1 | 1 | .33 |
| 16 | .6 | .6 | .28 | 0 | 0 | 0 | 1 |
| 17 | .2 | .2 | .08 | 1 | 0 | 1 | 1 |
| 18 | .2 | .2 | .12 | 0 | 0 | 0 | 1 |
| 19 | .2 | .6 | .16 | 1 | 0 | 1 | 3 |
| 20 | .6 | .6 | .32 | 0 | 0 | 0 | 1 |
| 21 | .6 | .2 | .16 | 0 | 1 | 1 | .33 |
| 22 | .6 | .6 | .28 | 0 | 0 | 0 | 1 |
| 23 | .2 | .6 | .2 | 1 | 0 | 1 | 3 |
| 24 | .2 | .2 | .12 | 0 | 0 | 0 | 1 |
| 25 | .2 | .6 | .16 | 1 | 0 | 1 | 3 |
| 26 | .6 | .6 | .2 | 0 | 0 | 0 | 1 |
| 27 | .2 | .2 | .08 | 0 | 1 | 1 | 1 |
| 28 | .2 | .6 | .08 | 0 | 1 | 1 | 1 |
| 29 | .2 | .6 | .2 | 1 | 0 | 1 | 3 |
| 30 | .2 | .2 | .16 | 0 | 0 | 0 | 1 |
| 31 | .2 | .6 | .16 | 1 | 0 | 1 | 3 |
| 32 | .6 | .6 | .2 | 0 | 0 | 0 | 1 |
| 33 | .2 | .33 | .15 | 0 | 0 | 0 | 1.7 |
| 34 | .2 | .33 | .15 | 0 | 0 | 0 | 1.7 |
| 35 | .2 | .33 | .23 | 0 | 0 | 0 | 1.7 |
| 36 | .2 | .2 | .16 | 0 | 0 | 0 | 1 |
| 37 | .6 | .6 | .32 | 0 | 0 | 0 | 1 |
| 38 | .6 | .6 | .2 | 0 | 0 | 0 | 1 |
| 39 | .2 | .33 | .19 | 0 | 0 | 0 | 1.7 |
| 40 | .2 | .33 | .19 | 0 | 0 | 0 | 1.7 |
| 41 | .2 | .33 | .19 | 0 | 0 | 0 | 1.7 |
| 42 | .2 | .2 | .04 | 0 | 0 | 0 | 1 |
| 43 | .6 | .6 | .2 | 0 | 0 | 0 | 1 |
| 44 | .6 | .6 | .2 | 0 | 0 | 0 | 1 |
| 45 | .6 | .6 | .2 | 0 | 0 | 0 | 1 |
| 46 | .2 | .33 | .19 | 0 | 0 | 0 | 1.7 |
| 47 | .2 | .33 | .23 | 0 | 0 | 0 | 1.7 |
| 48 | .2 | .2 | .16 | 1 | 1 | 2 | 1 |

FIG. 9

```
code process (symbolImage s)
{
    double score = 0, t;
    double p_values[num_parameters];
    int i, j, k, c, p;
    for (i = 0; i < num_InitialParameters; i++) p_values[i] = parameterize(s, i);    ← 1624
    for (j = 0; j < num_clusters; j++)
    {
        t = 0;
        for (i = 0; i < num_InitialParameters; i++) t + = compare(clusters[j].parameter(i), p_values[i]);
        if (t > score)
        {
            score = t;
            c = j;
        }
    }                                                                                 ← 1620
    score = 0;
    for (i = num_InitialParameters; i < clusters[c].numAdditionalParameters; i++)
    {
        k = clusters[c].additionalParameter(i);
        p_values[i] = parameterize(s, k);
    }                                                                                 ← 1626
    for (j = 0; j < clusters[c].numPatterns; j++)
    {
        t = 0;
        for (i = numInitialParameter, k = 1; i < clusters[c].numAdditionalParameters; i++, k++)
            t + = compare(clusters[c].patterns[j].parameter(k), p_values[i]);
        if (t > score)
        {
            score = t;
            p = j;
        }
    }                                                                                 ← 1622
    return (clusters[c].patterns[p].code);
}
```

1630:
number of symbols on page = $N$
number of clusters = $C$
number of patterns/cluster = $P'$
number of initial parameters = $R_1$
number of additional parameters = $R_2$ computational complexity = $N(CR_1 + P'R_2)$

FIG. 16B

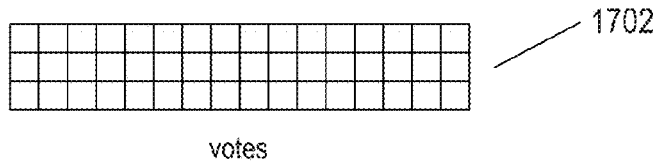

votes — 1702

```
for (i = 0; i < 22; i++)
    for (j = 0; j < 18; j++)
    {
        NxtLvlClusters[(i*18)+j] = new cluster [num_clusters];
        orderByVoting (page_of_text [i,j], NxtLvlClusters[(i*18)+j])
    }
```
1704, 1706, 1708

```
list* process (symbolImage s, cluster* clusters)
{
    list* similarPatterns;
    double score = 0, t;
    double p_values[num_parameters];
    int i,j;
    similarPatterns = new (list);
    for (i = 0; i < num_parameters; i++) p_values[i] = parameterize(s, i);
    for (j = 0; j < num_clusters &&!similarPatterns → full( ); j++)
    {
        if (similar (p_values, clusters[j]))
        {
            for (k = 0; k < clusters[j].numPatterns( ); k++)
            {
                if (similar(p_values, clusters[j].patterns[k]))
                    similarPatterns → add(clusters[j].patterns[k]);
                if (similarPatterns→ full( )) break;
            }
        }
    }
    return similarPatterns;
}
```
1712, 1710, 1714, 1716

FIG. 17 computational complexity = $N\left(e + \frac{1}{d}(CR_1 + P'R_2)\right)$ — 1720, 1744, 1722

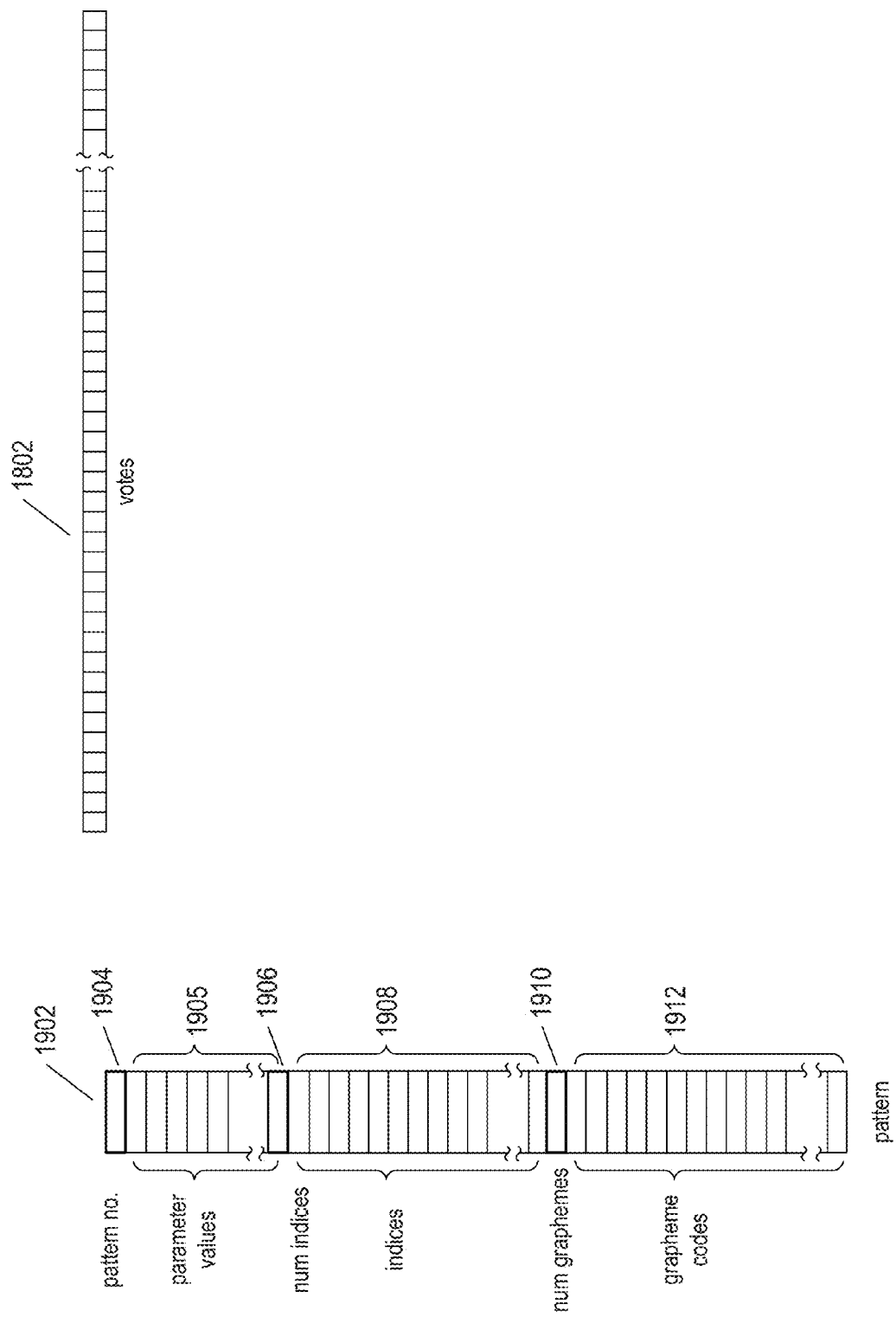

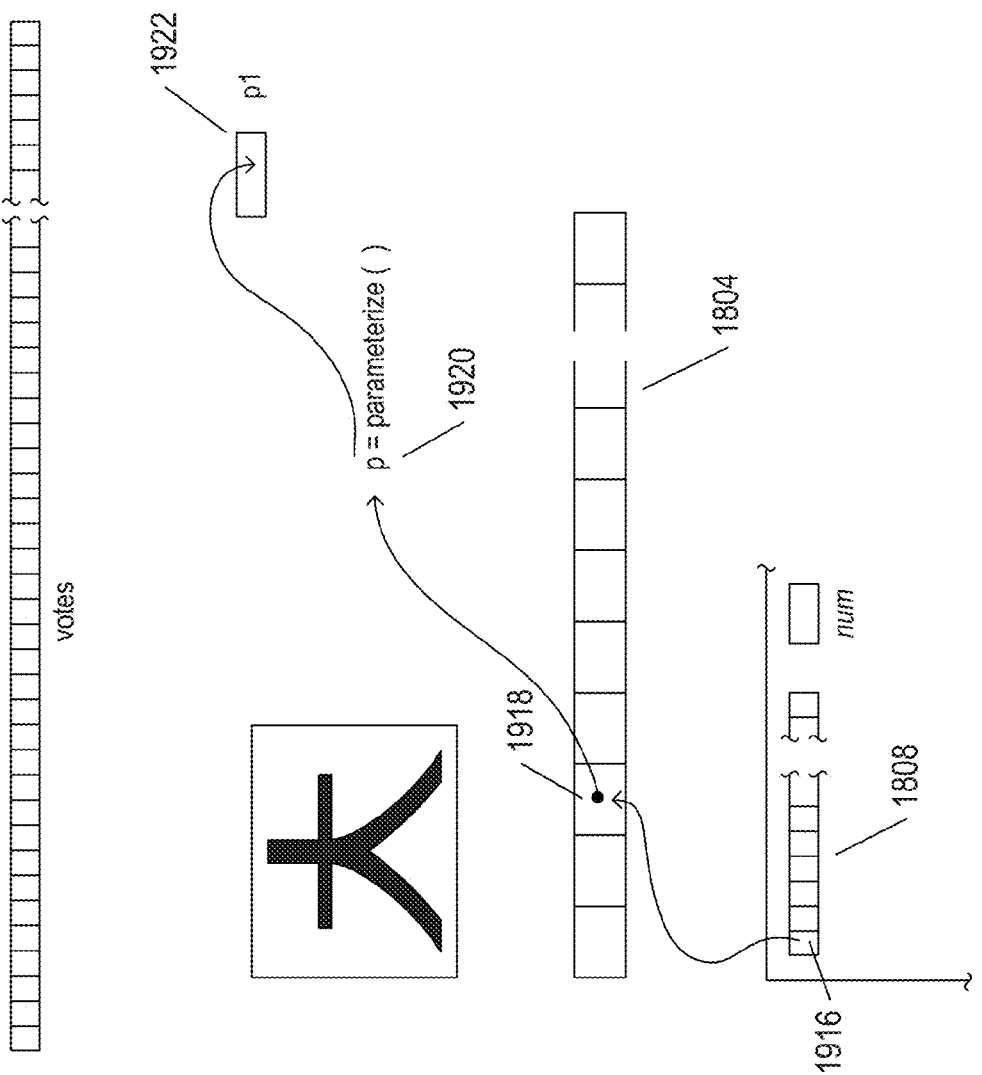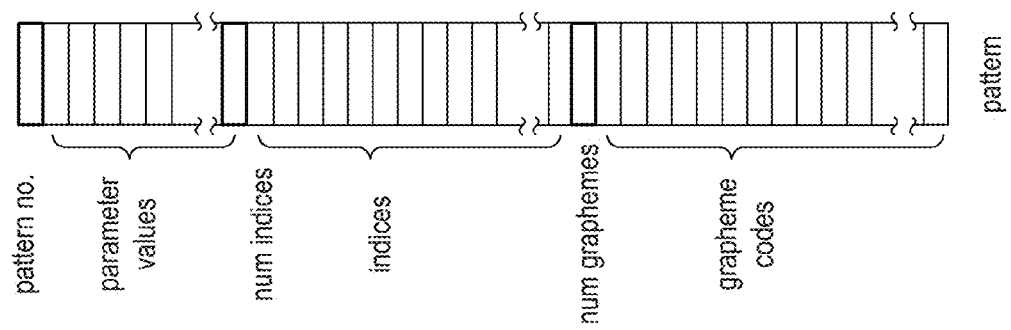
FIG. 19C

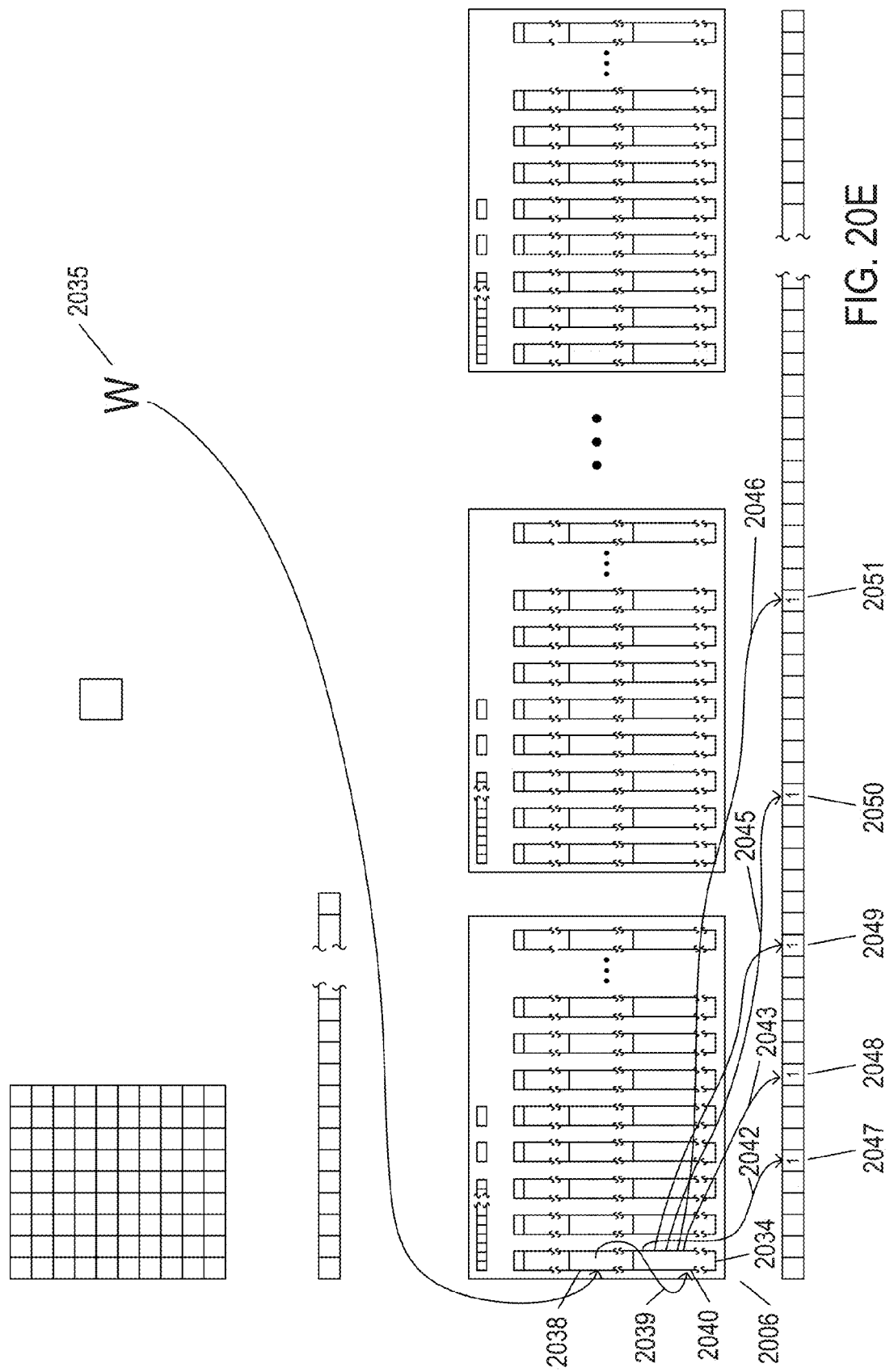

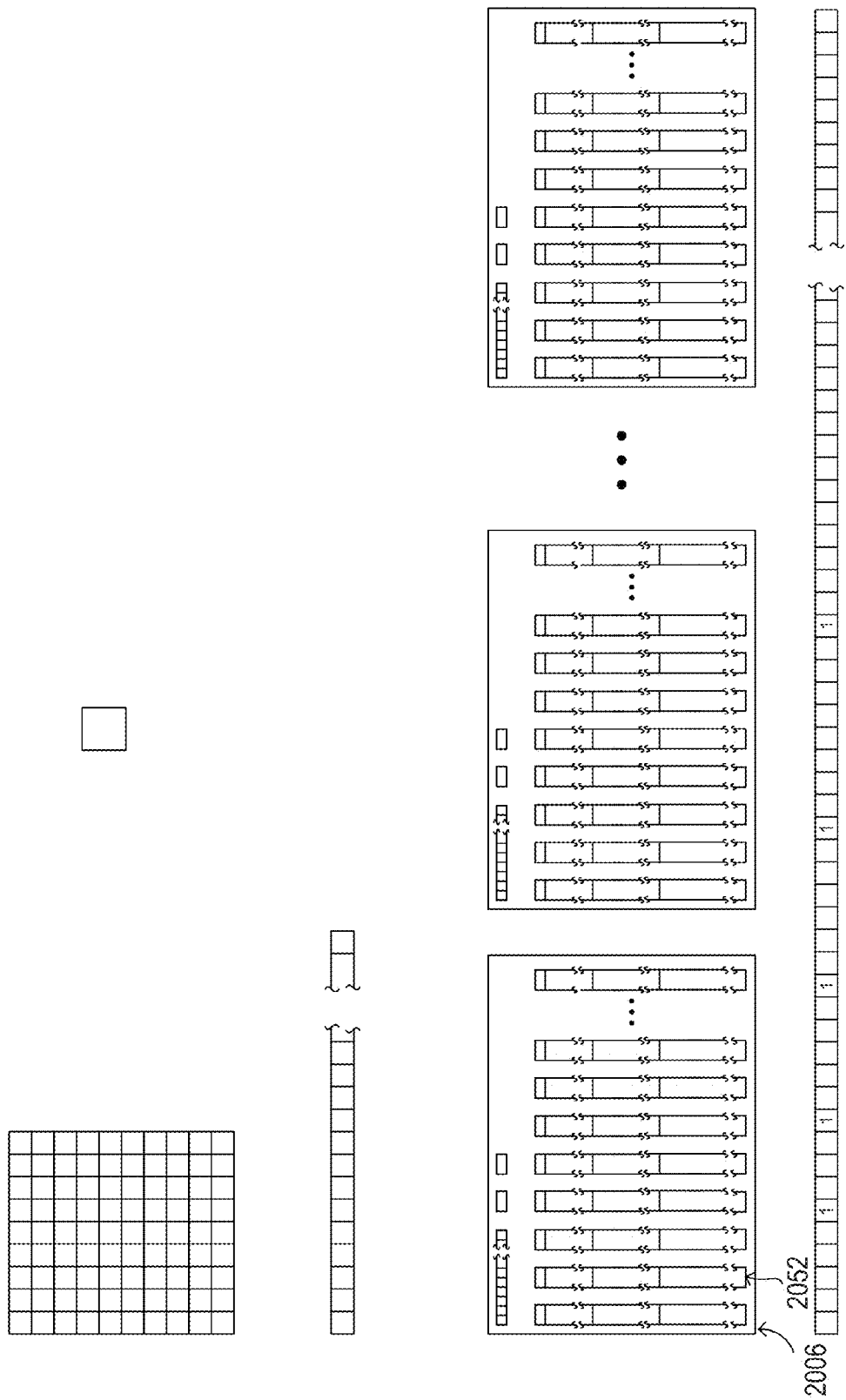

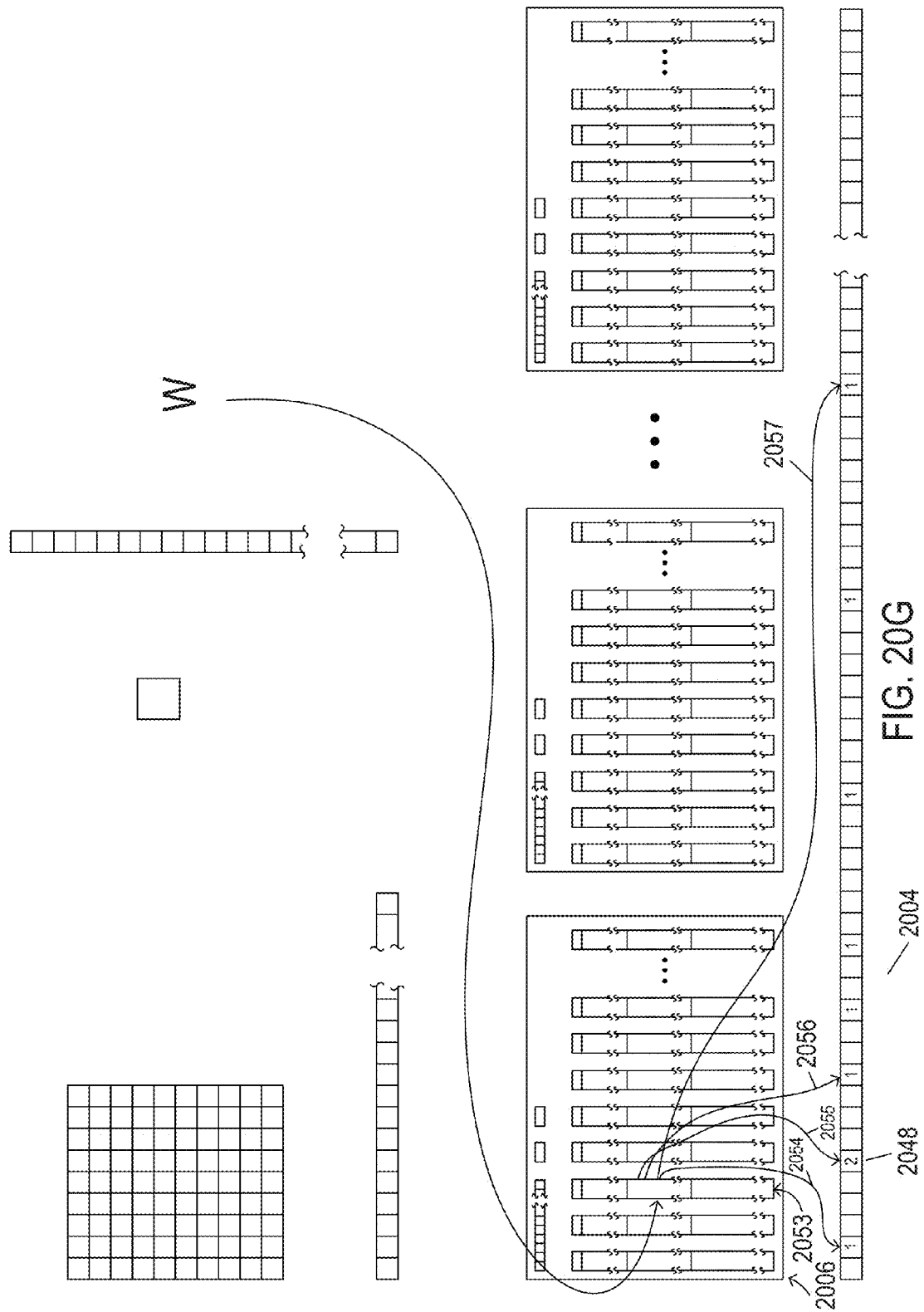

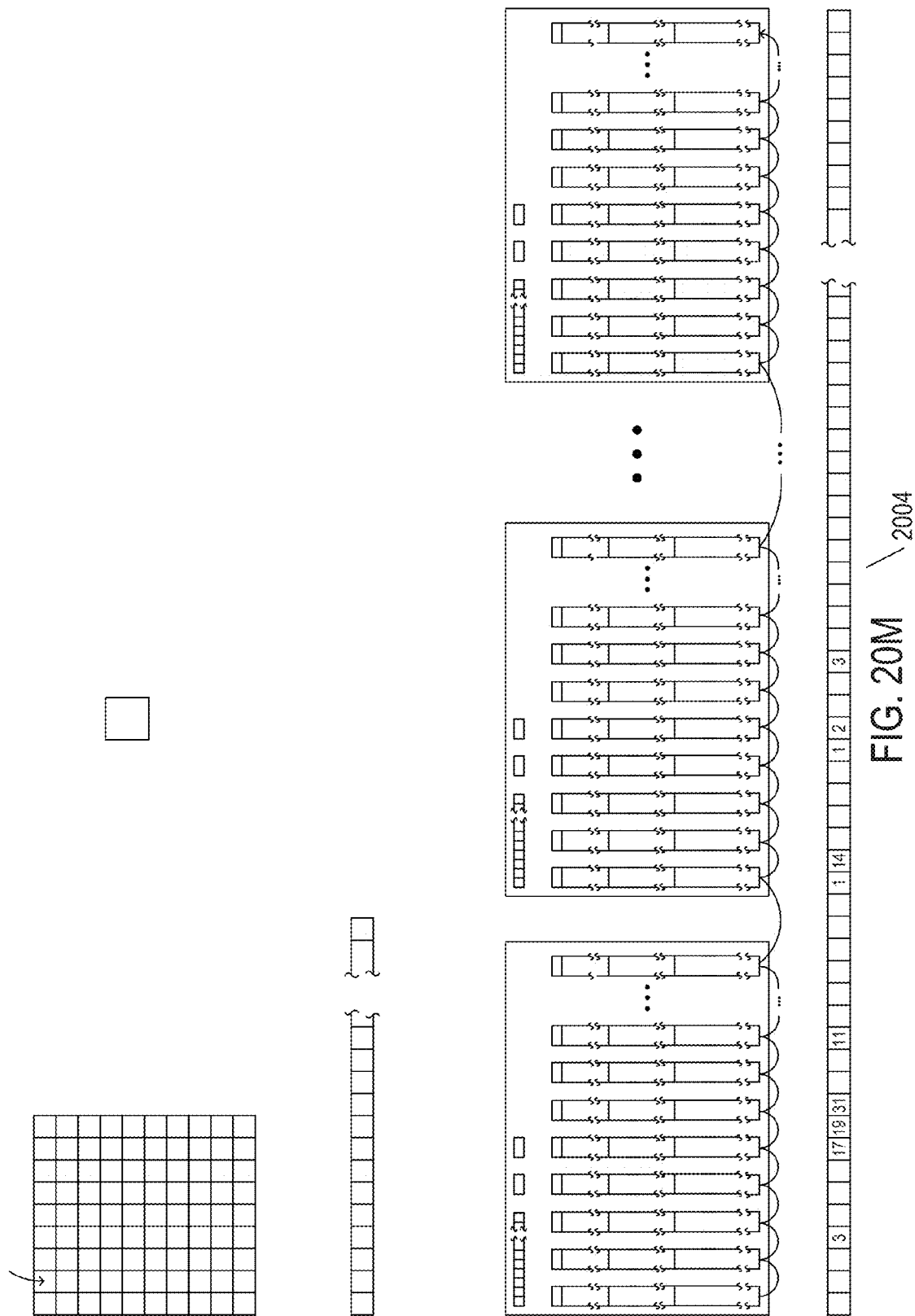

METHODS AND SYSTEMS FOR EFFICIENT AUTOMATED SYMBOL RECOGNITION USING MULTIPLE CLUSTERS OF SYMBOL PATTERNS

CROSS REFERENCE TO RELATED APPLICATIONS

This application claims the benefit of priority to Russian Patent Application No. 2014103156, filed Jan. 30, 2014; the disclosure of which is incorporated herein by reference.

TECHNICAL FIELD

The current application is directed to automated processing of scanned-document images and other text-containing images and, in particular, to methods and systems that efficiently convert symbol images extracted from scanned documents to digital encodings of the corresponding symbols using multiple clusters of symbol patterns.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of overwhelming advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") control programs that control a personal computer to convert a printed-paper document into a corresponding electronic document that can be displayed and edited using a word-processing program.

While modern OCR systems have advanced to the point that complex printed documents that include pictures, frames, line boundaries, and other non-text elements as well as text symbols of any of many common alphabet-based languages can be automatically converted to electronic documents, challenges remain with respect to conversion of printed documents containing Chinese and Japanese characters or Korean morpho-syllabic blocks.

SUMMARY

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed carry out an initial processing step on one or more scanned images to identify, for each symbol image within a scanned document, a set of graphemes that match, with high frequency, symbol patterns that, in turn, match the symbol image. The set of graphemes identified for a symbol image is associated with the symbol image as a set of candidate graphemes for the symbol image. The set of candidate graphemes are then used, in one or more subsequent steps, to associate each symbol image with a most likely corresponding symbol code.

BRIEF DESCRIPTION OF THE DRAWINGS

FIG. 1B illustrates a printed document.

FIG. 9 shows a table of parameter values computed for all of the symbols in the example symbol set shown in FIG. 6.

FIG. 16B illustrates a second implementation of the routine "process' (1404 in FIG. 14).

FIG. 17 illustrates a third implementation of the routine "process," discussed in the previous subsection, using the same illustration and pseudocode conventions used in the previous subsection.

FIG. 19A illustrates preprocessing of a symbol image using the data structures discussed above with reference to FIG. 18.

FIG. 19C illustrates preprocessing of a symbol image using the data structures discussed above with reference to FIG. 18.

FIG. 20E illustrates multi-cluster OCR-based symbol-image-containing document processing.

FIG. 20F illustrates multi-cluster OCR-based symbol-image-containing document processing.

FIG. 20G illustrates multi-cluster OCR-based symbol-image-containing document processing.

FIG. 20M illustrates multi-cluster OCR-based symbol-image-containing document processing.

FIG. 20O illustrates multi-cluster OCR-based symbol-image-containing document processing.

DETAILED DESCRIPTION

The current document is directed to methods and systems for identifying symbols corresponding to symbol images in a scanned-document image. In one implementation, the methods and systems to which the current document is directed carry out an initial processing step on one or more scanned images to identify a frequency at which each grapheme in a set of graphemes is associated with symbol patterns that match symbol images used in the scanned document image or images. A score is computed for each symbol pattern based on the frequencies of association of the graphemes referenced by the symbol pattern and the symbols patterns within each cluster of symbol patterns is sorted according to their scores. By ordering the symbol patterns, the most likely symbols patterns are first encountered during a second optical-character-recognition step in which symbol images are associated with one or more graphemes or symbol codes.

Scanned Document Images and Electronic Documents

Figure 1A:
FIG. 1A illustrates a printed document.

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for sense-orientation determination to which the current application is directed. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
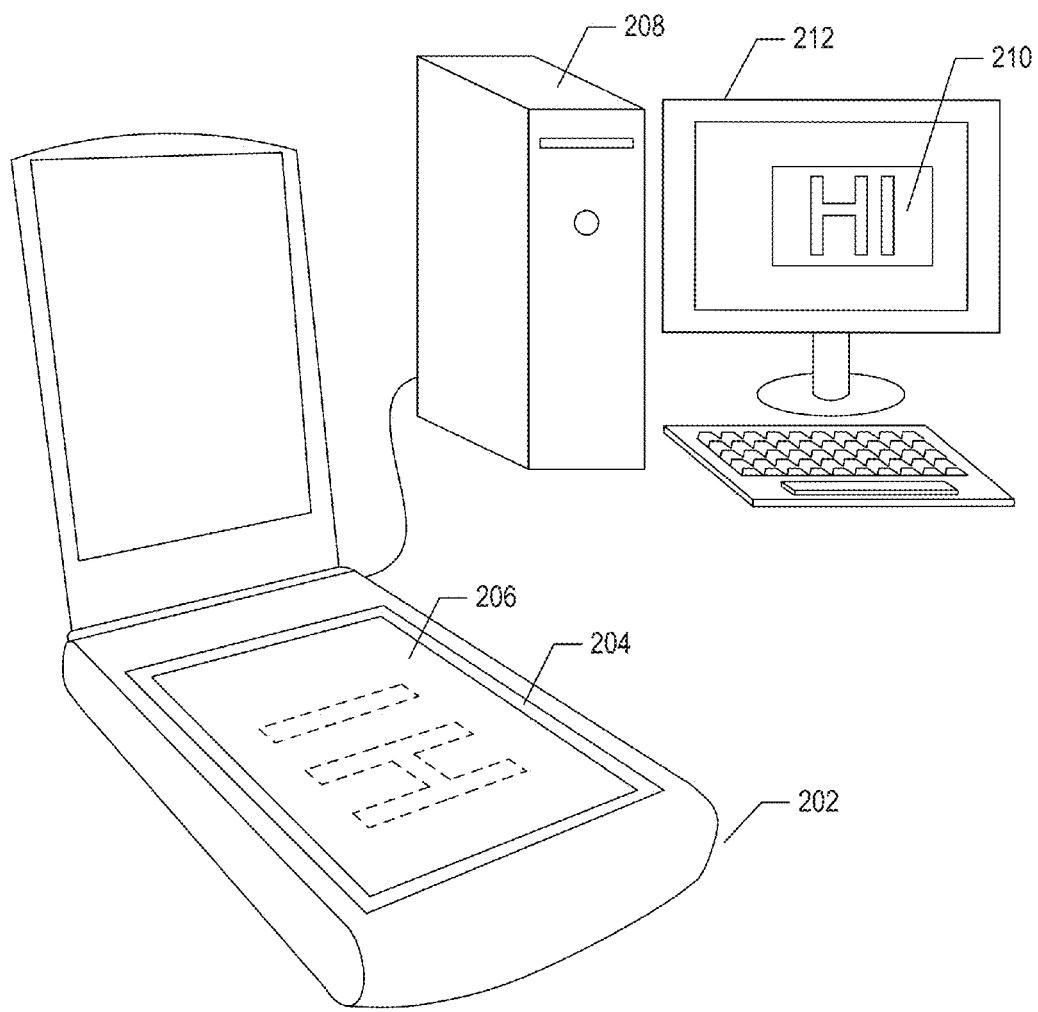
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
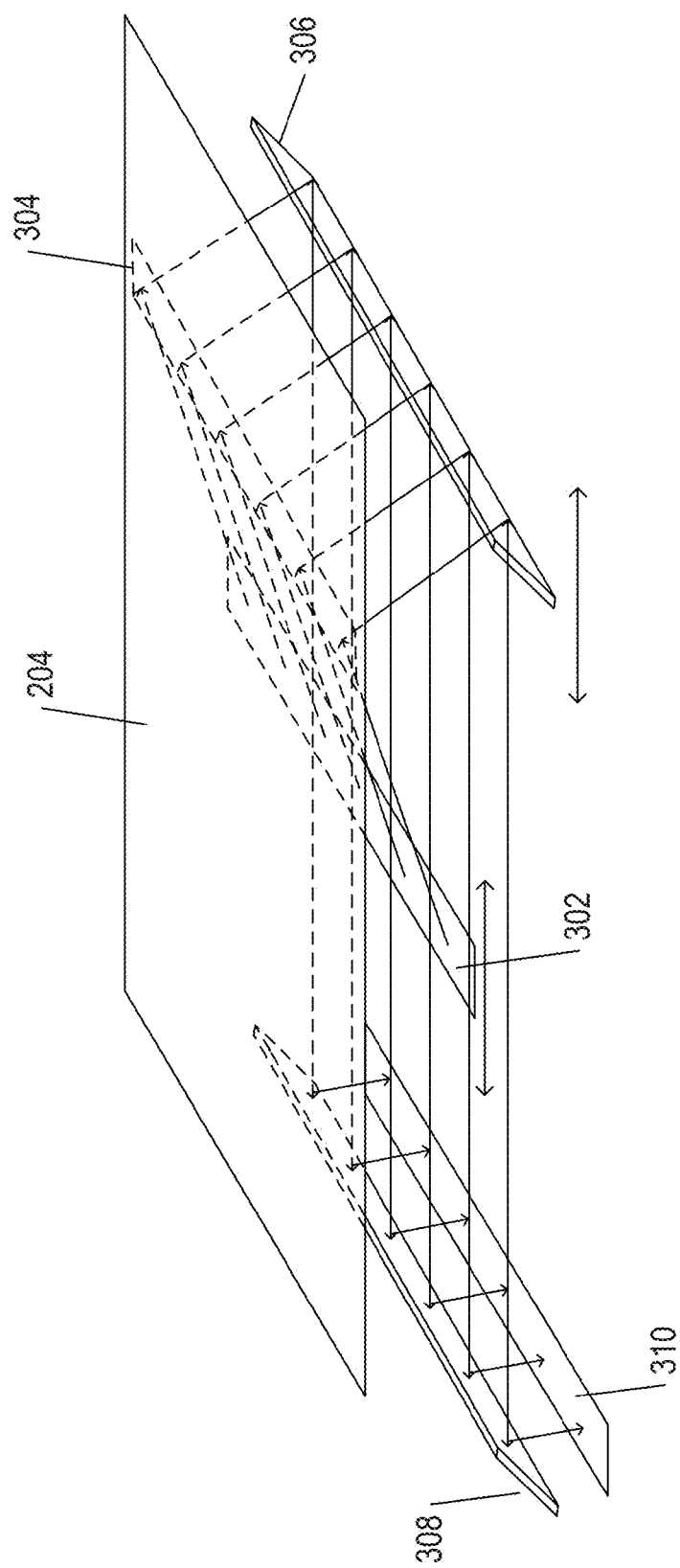
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
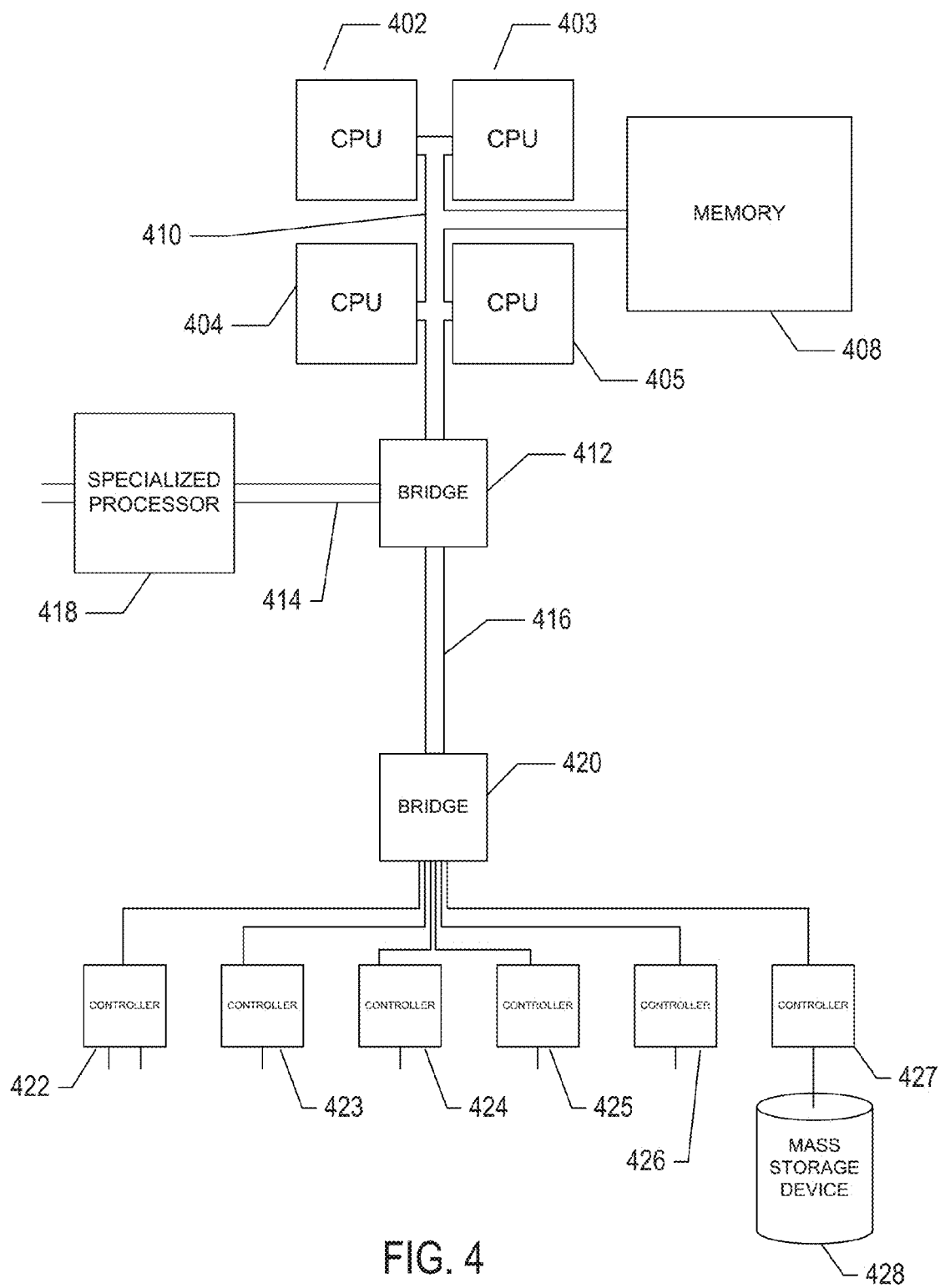
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
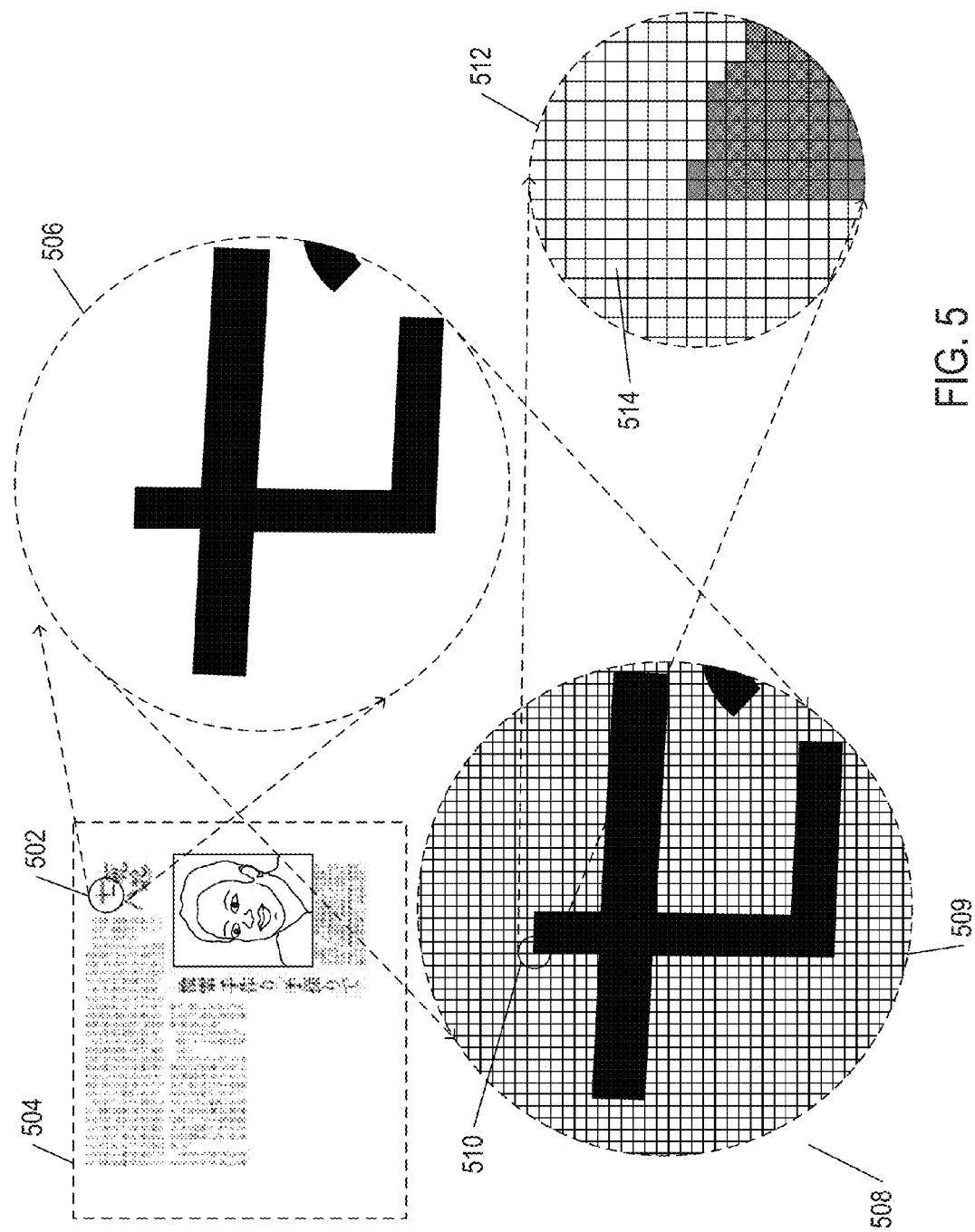
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character. Sub-images corresponding to symbol images can be processed to produce a bit for the symbol image, in which bits with value "1" correspond to the symbol image and bits with value "0" correspond to background. Bit maps are convenient for representing both extracted symbol images as well as patterns used by an OCR system to recognize particular symbols.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. The tree representing the document includes a root node corresponding to the document as a whole and six leaf nodes each corresponding to one of the identified regions. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region is determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. The text-containing regions are then partitioned into sub-images that contain individual characters or symbols, and these sub-images are then generally scaled and oriented, and the symbol images are centered within the sub-image to facilitate subsequent automated recognition of the symbols that correspond to the symbol images.

Example OCR Methods and Systems

Figure 6:
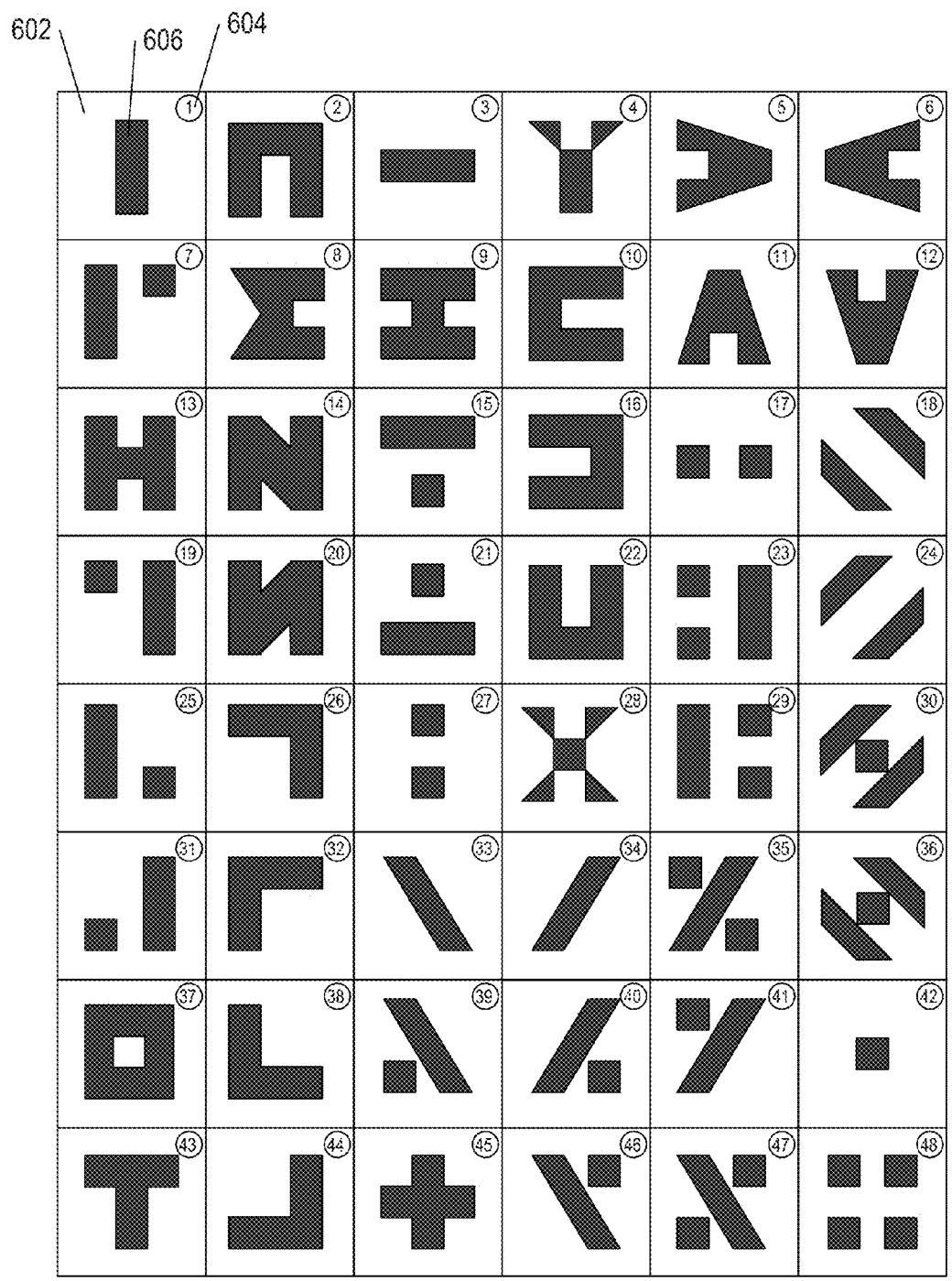
FIG. 6 shows a hypothetical symbol set.

In order to provide a concrete discussion of various optical-character-recognition techniques, an example symbol set for a hypothetical language is used. FIG. 6 shows a hypothetical symbol set. In FIG. 6, 48 different symbols are shown within each of 48 rectangular regions, such as rectangular region 602. In the right-hard corner of each rectangular region, a numerical index or code for the symbol is shown inscribed within a circle, such as the index or code "1" 604 corresponding to the first symbol 606 shown in rectangular region 602. The example is chosen for illustration of both currently existing OCR methods and systems as well as new OCR methods and systems disclosed in the current document. In fact, for character-based written languages, including Chinese and Japanese, there may be many tens of thousands of different symbols used for printing and writing the language.

Figure 7A:
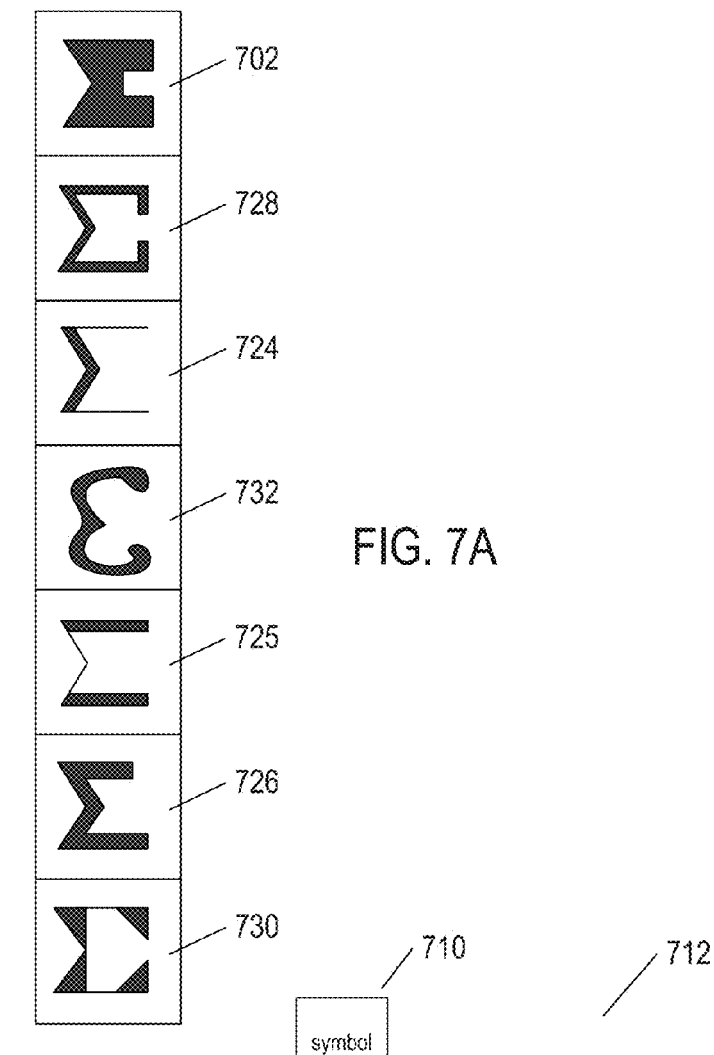
FIG. 7A illustrates various aspects of symbol sets for natural languages.
Figure 7B:
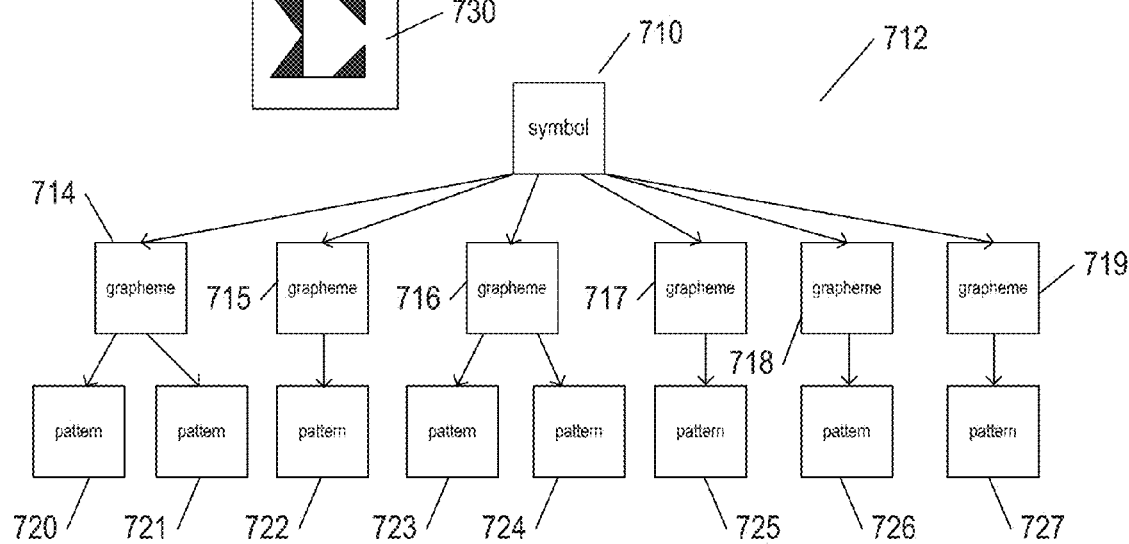
FIG. 7B illustrates various aspects of symbol sets for natural languages.

FIGS. 7A-B illustrate various aspects of symbol sets for natural languages. In FIG. 7A, a column of different forms of the eighth symbol in the symbol set shown in FIG. 6 is provided. The eighth symbol 702 of the symbol set shown in FIG. 6 is followed, in a column 704, by different forms of the symbol in different styles of text. In many natural languages, there may be many different text styles and alternative written forms for a given symbol.

FIG. 7B shows various different concepts related to symbols of a natural language. In FIG. 7B, a particular symbol of a natural language is represented by node 710 in graph 712. A particular symbol may have numerous different general written or printed forms. For OCR purposes, each of these different general forms constitutes a grapheme. In certain cases, a particular symbol may comprise two or more graphemes. For example, Chinese characters may comprise a combination of two or more graphemes, each of which occurs in additional characters. The Korean language is actually alphabetic, with Korean morpho-syllabic blocks containing a number of alphabetic characters in different positions. Thus, a Korean morpho-syllabic block may represent a higher-level symbol composed of multiple grapheme components. For symbol 710 shown in FIG. 7B, there are six different graphemes 714-719. There are, in addition, one or more different printed or written renderings of a grapheme, each rendering represented by a pattern. In FIG. 7B, graphemes 714 and 716 each has two alternative renderings represented by patterns 720 and 721 and 723-724, respectively. Graphemes 715 and 717-719 are each associated with a single pattern, patterns 722 and 725-727, respectively. For example, the eighth symbol of the example symbol set, shown in FIG. 6, may be associated with three graphemes, including one grapheme that encompasses renderings 702, 724, 725, and 726, a second grapheme that encompasses renderings 728 and 730, and a third grapheme that encompasses rendering 732. In this case, the first grapheme has straight horizontal members, the second grapheme has horizontal members with right-hand, short vertical members, and the third grapheme includes curved, rather than straight, features. Alternatively, all of the renderings of the eighth symbol 702, 728, 724, 732, 725, 726, and 730 may be represented as patterns associated with a single grapheme for the eighth symbol. To a certain extent, the choice of graphemes is somewhat arbitrary. In certain types of character-based languages, there may be many thousands of different graphemes. Patterns can be thought of as alternative renderings or images, and may be represented by a set of parameter/parameter-value pairs, as discussed below.

Figure 7C:
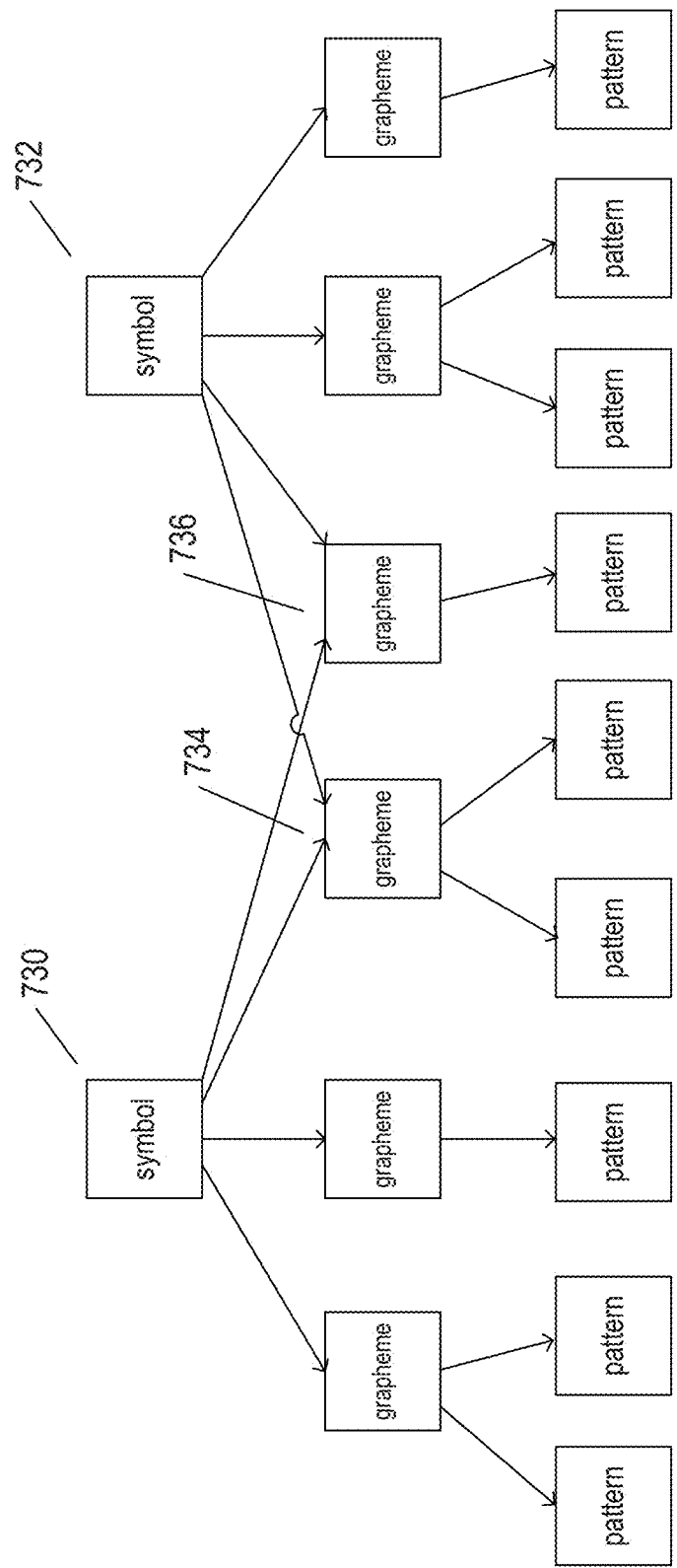
FIG. 7C illustrates various aspects of symbol sets for natural languages.

In fact, although the relationships between symbols, graphemes, and patterns is shown, in FIG. 7B, as being strictly hierarchical, with each grapheme related to a single, particular parent symbol, the actual relationships may not be so simply structured. FIG. 7C illustrates a slightly more complex set of relationships, in which two symbols 730 and 732 are both parents of two different graphemes 734 and 736. As one example, the English-language symbols "o," the lower-case letter, "O," the upper-case letter, "0," the digit zero, and "°", the symbol for degree, may all be associated with a circle-like grapheme. The relationships might alternatively be represented as graphs or networks. In certain cases, graphemes, rather than, or in addition to, symbols might be shown at the highest levels within the representation. In essence, there is a significant degree of arbitrariness in the symbols, graphemes, and patterns identified for a particular language and the relationships between them.

Figure 8A:
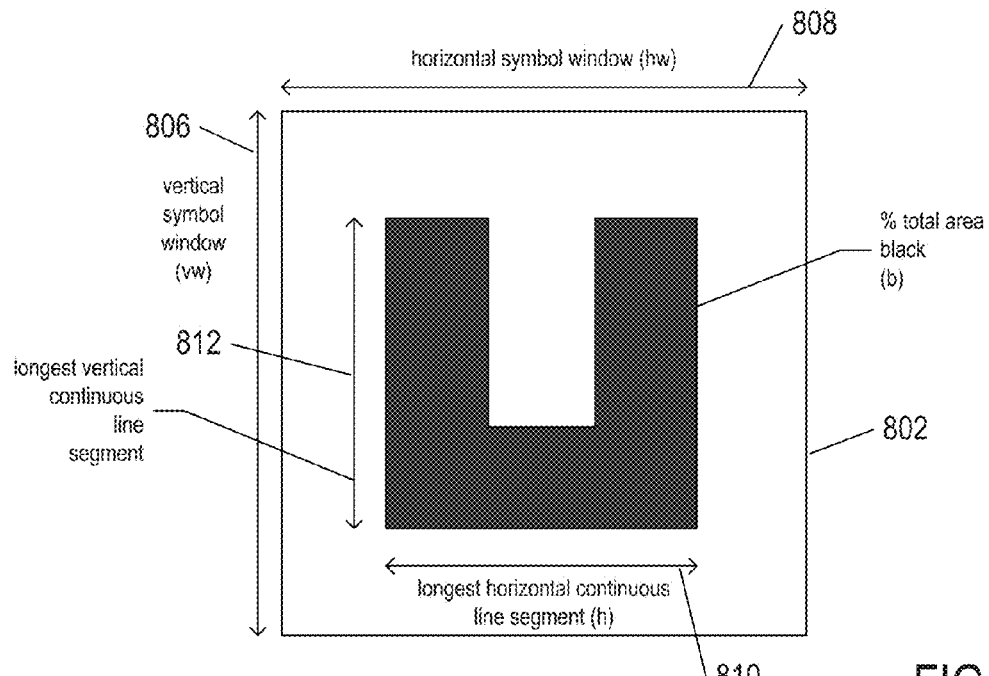
FIG. 8A illustrates parameters and parameter values computed with respect to symbol images.
Figure 8B:
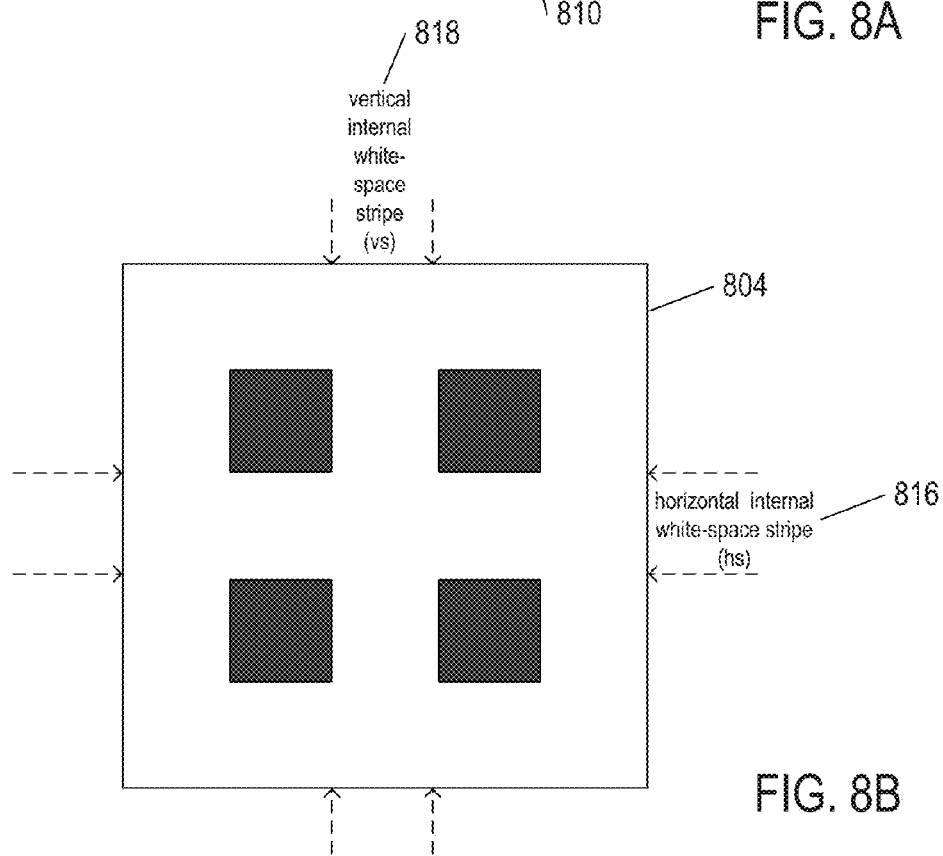
FIG. 8B illustrates parameters and parameters values computed with respect to symbol images.

FIGS. 8A-B illustrate parameters and parameter values computed with respect to symbol images. Note that the phrase "symbol image" may describe a printed, written, or displayed rendering of a symbol or grapheme. In the following example, parameters and parameter values are discussed with respect to images of symbols, but, in an actual real-language context, the parameters and parameter values are often used to characterize and represent images of graphemes. FIG. 8A shows a rectangular symbol image 802 extracted from a text-containing image that includes an image of the $22^{nd}$ symbol in the example symbol set shown in FIG. 6. FIG. 8B includes a rectangular symbol image 804 extracted from the text-containing image corresponding to the $48^{th}$ symbol in the example symbol set shown in FIG. 6. In printing and writing of the hypothetical language corresponding to the example symbol set, the symbols are centered within rectangular symbol areas. When this is not the case, initial processing steps carried out by OCR systems may reorient, rescale, and reposition extracted symbol images with respect to a background area in order to normalize extracted symbol images for subsequent processing steps.

FIG. 8A illustrates three different parameters that may be used by an OCR system to characterize symbols. Note that the area of the symbol image, or symbol window, is characterized by a vertical symbol-window dimension 806, abbreviated "vw") and a horizontal symbol-window dimension 808, referred to as "hw." A first parameter is the longest horizontal continuous line segment within the symbol image, referred to as "h" 810. This is the longest sequence of contiguous dark pixels within the generally white-pixel background of the symbol window. A second parameter is the longest vertical continuous line segment 812 within the symbol image. A third parameter is the percentage of pixels in the symbol window corresponding to the symbol image, in the current case, the percentage of black pixels within the generally white symbol window. In all three cases, parameter values can be straightforwardly computed once a bitmap for the symbol window has been generated. FIG. 8B shows two additional parameters. The first parameter is the number of horizontal, internal white-space stripes within the symbol image, with the symbol represented by the symbol image shown in FIG. 8B having a single horizontal internal white-space stripe 816. A second parameter is the number of vertical internal white-space stripes within the symbol image. For the 48$^{th}$ symbol of the symbol set, represented by the image within the symbol window 804 shown in FIG. 8B, there is a single vertical internal white-space stripe 818. The number of horizontal white-space stripes is referred to as "hs" and the number of internal vertical white-space stripes is referred to as "vs."

FIG. 9 shows a table of parameter values computed for all of the symbols in the example symbol set shown in FIG. 6. In the table 902 shown in FIG. 9, calculated parameter values for a particular symbol are shown in each row of the table. The parameters include: (1) the longest horizontal continuous line segment relative to the symbol window, $$\frac{h}{hw},$$

904; (2) the longest vertical continuous line segment relative to the vertical symbol-window dimension, $$\frac{v}{vw},$$

906; (3) the percent total area corresponding to the symbol image, or black space, b, 908; (4) the number of internal vertical stripes, vs, 910; (5) the number of horizontal internal stripes, hs, 912; (6) the sum of the number of internal vertical stripes and horizontal stripes, vs+hs, 914; and (7) the ratio of the longest vertical line segment to the longest horizontal line segment, $$\frac{v}{h},$$

916. Thus, considering the first row 920 of table 902 in FIG. 9, the first symbol of the symbol set (606 in FIG. 6) is a vertical bar, and thus, as would be expected, the numeric value of $$\frac{v}{vw},$$

0.6, is significantly greater than the numeric value of $$\frac{h}{hw},$$

0.2. Symbol 606 represents only 12 percent of the entire symbol window 602. There are no internal horizontal or vertical white spaces within symbol 606, and thus vs, hs, and vs+hs are all 0. The ratio $$\frac{v}{h}$$

is 3. Because the example symbols are all relatively simple and block-like, there are relatively few different values for each of the parameters in table 902.

Figure 10:
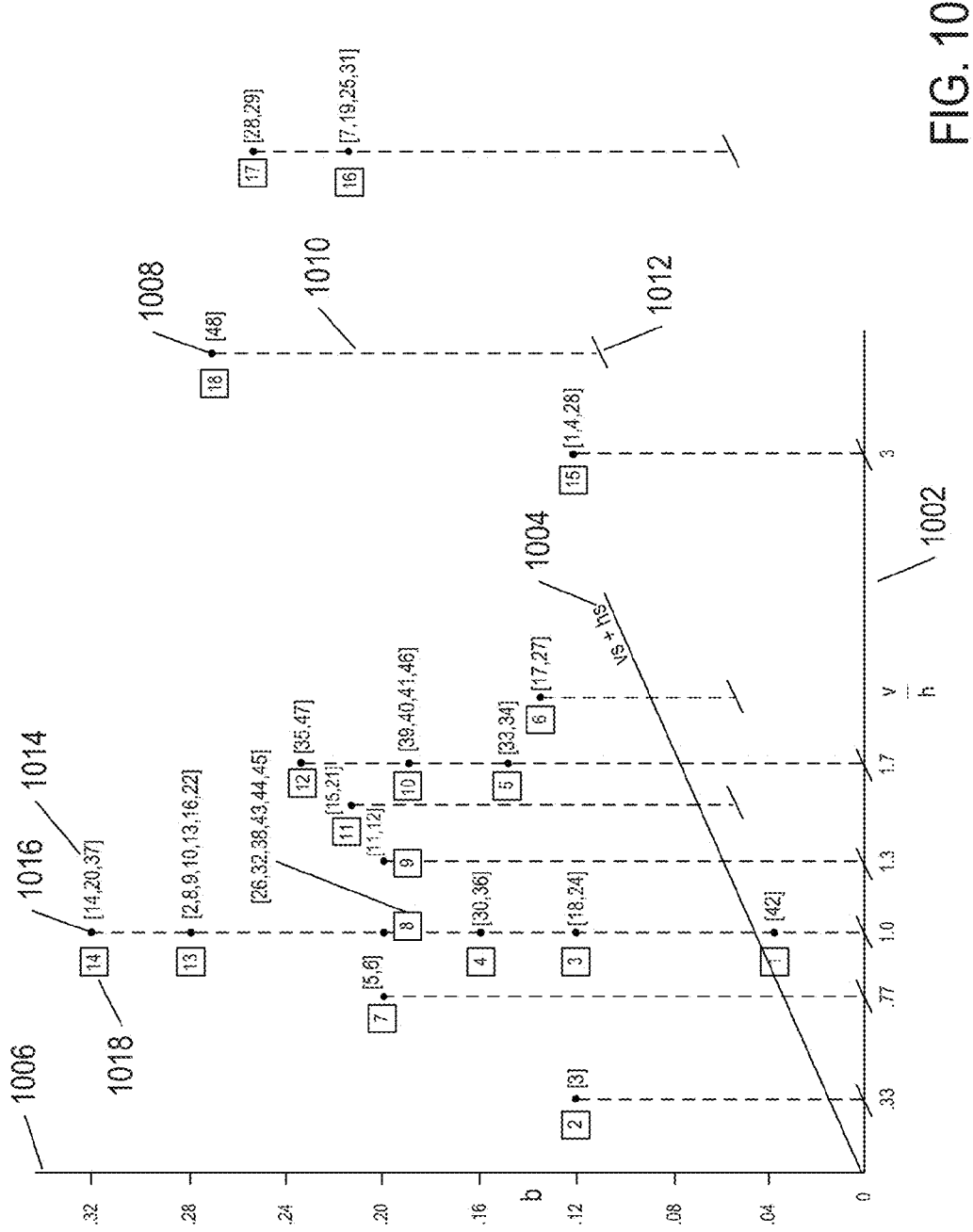
FIG. 10 illustrates a three-dimensional plot of the symbols of the example set of symbols shown in FIG. 6 within a three-dimensional space, where the dimensions represent values of each of three different parameters.

Despite the fact that each of the parameters discussed above with reference to FIG. 9 have only relatively few different parameters values with respect to the 48 example characters, only three of the parameters are sufficient to partition the example characters into 18 partitions, or clusters. FIG. 10 illustrates a three-dimensional plot of the symbols of the example set of symbols shown in FIG. 6 within a three-dimensional space, where the dimensions represent values of each of three different parameters. In FIG. 10, a first horizontal axis 1002 represents the parameter $$\frac{v}{h}$$

Figure 11A:
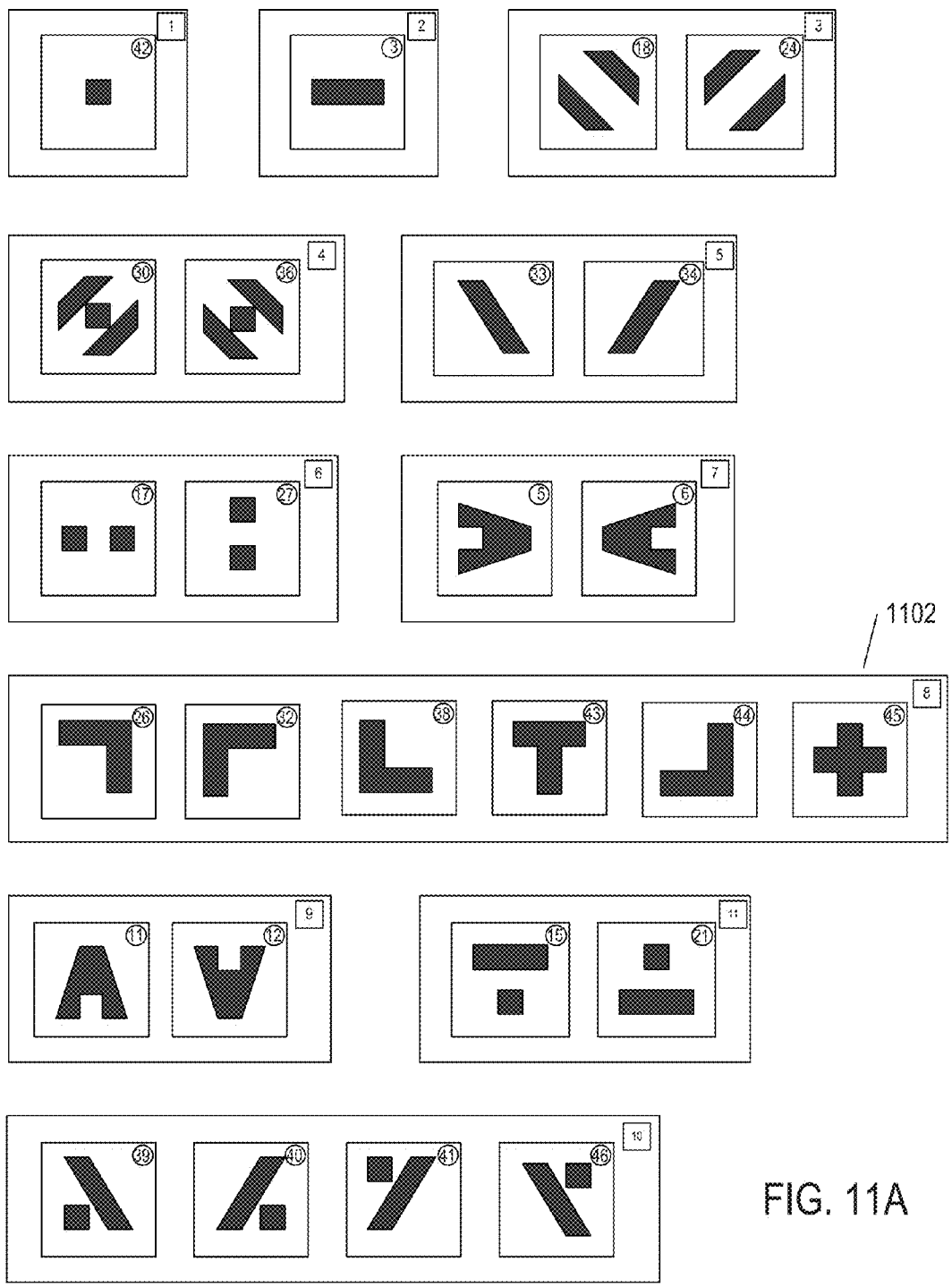
FIG. 11A shows the symbols contained in each of the clusters represented by points in the three-dimensional space shown in FIG. 10.
Figure 11B:
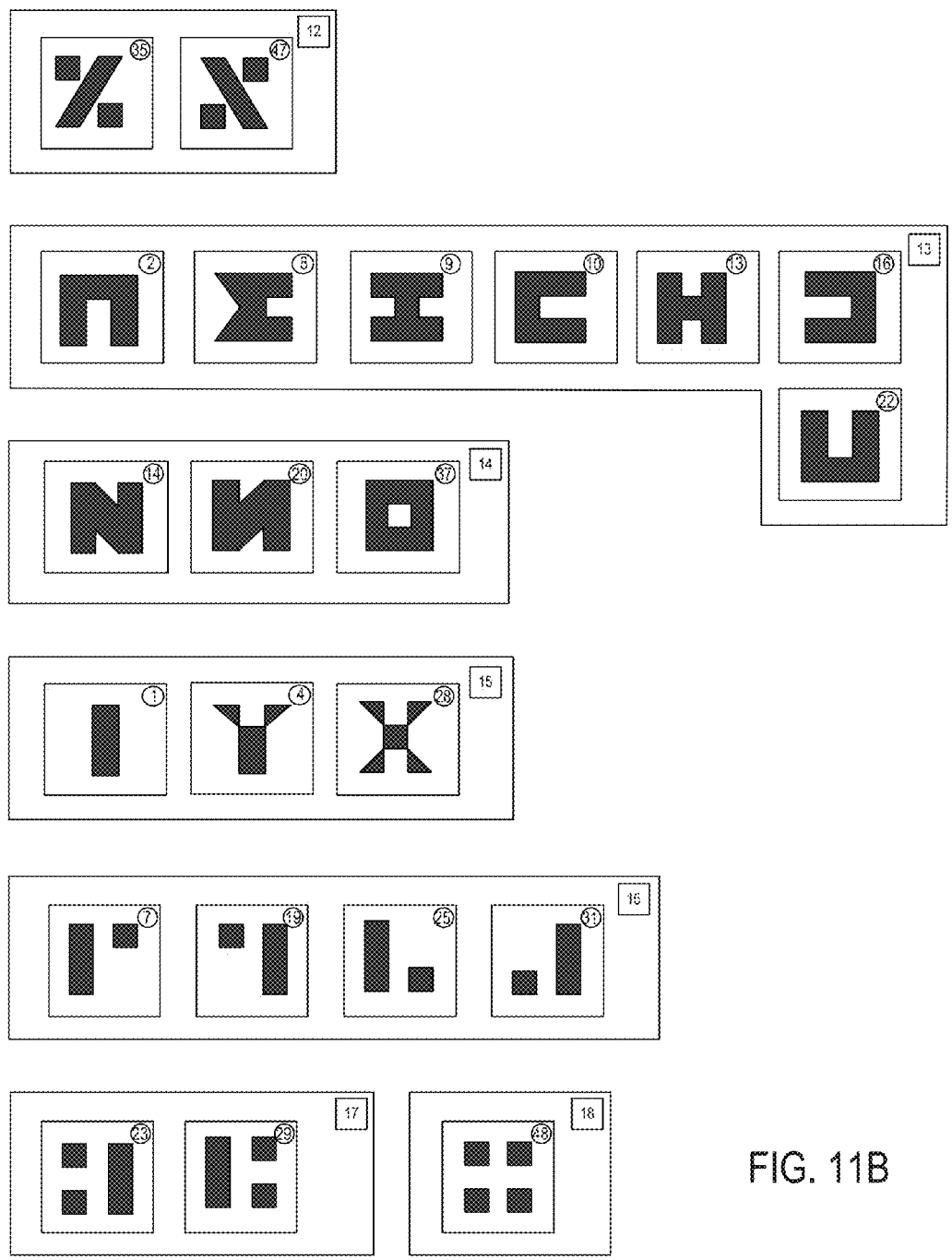
FIG. 11B shows the symbols contained in each of the clusters represented by points in the three-dimensional space shown in FIG. 10.

(916 in FIG. 9), a second horizontal axis 1004 represents the parameter vs+hs (914 in FIG. 9), and a third, vertical axis 1006 represents the parameter b (908 in FIG. 9). There are 18 different plotted points, such as plotted point 1008, each shown as a small darkened disk, with the vertical projection of the point down to the horizontal plane that includes axes 1002 and 1004 represented by a vertical dashed line, such as vertical dashed line 1010 connecting point 1008 to its projection on the horizontal plane 1012. The code or sequence number for the symbols that map to a particular point are shown within brackets to the right of the point. For example, symbols 14, 20, and 37 (1014) all map to point 1016 with coordinates (1, 0, 0.32) with respect to axes 1002, 1004, and 1006. Each point is associated with a partition or cluster number in a small rectangle to the left of the point. For example, point 1016 is associated with cluster number "14" 1018. FIGS. 11A-B show the symbols contained in each of the clusters represented by points in the three-dimensional space shown in FIG. 10. As can be readily observed from the symbol contents of these clusters, or partitions, the three parameters employed to distribute the symbols within the three-dimensional space shown in FIG. 10 are actually effective in partitioning the 48 example symbols into related sets of symbols.

Figure 12A:
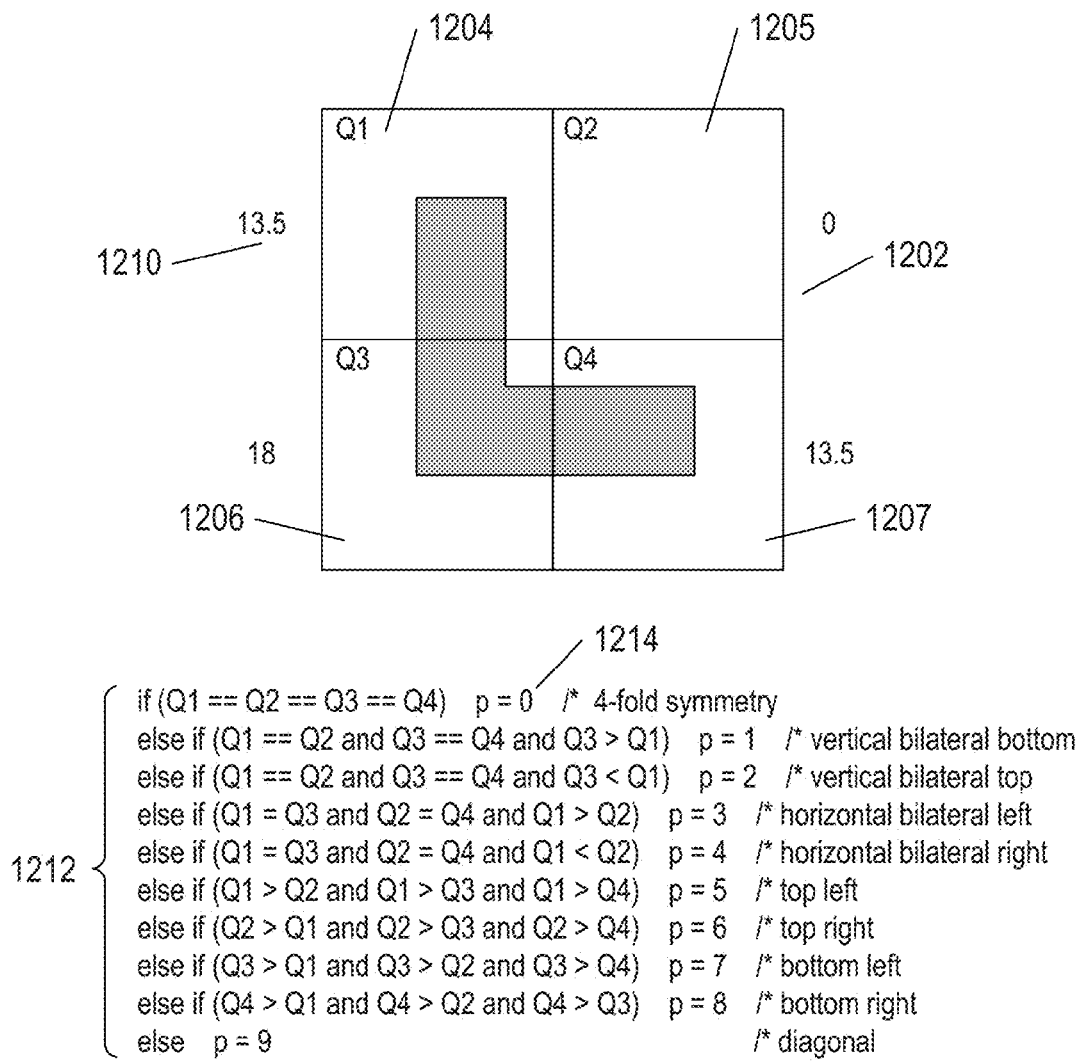
FIG. 12A illustrates a different parameter that can be used, in combination with the three parameters corresponding to dimensions in the three-dimensional parameter space shown in FIG. 10, to fully distinguish each of the symbols in cluster 8.
Figure 12B:
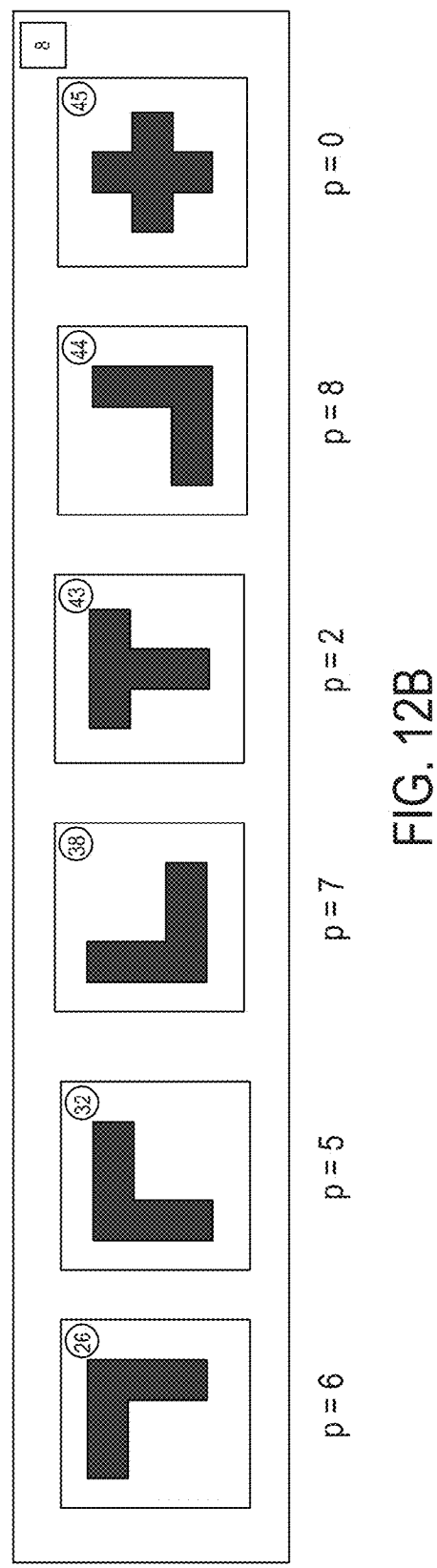
FIG. 12B illustrates the value of the additional parameter, discussed with reference to FIG. 12A, for each of the symbols in cluster 8.

Additional parameters can be used in order to uniquely distinguish each symbol within each cluster or partition. Consider, for example, cluster 8 (1102) shown in FIG. 11A. This cluster of symbols includes four angular, "L"-like symbols with four-fold rotational variations have symbol codes 26, 32, 38, and 44, as well as the "T"-like symbol with symbol code 43 and the cross-sign-like symbol with symbol code 45. FIG. 12A illustrates a different parameter that can be used, in combination with the three parameters corresponding to dimensions in the three-dimensional parameter space shown in FIG. 10, to fully distinguish each of the symbols in cluster 8. As shown in the symbol window 1202 in FIG. 12A, the symbol window is divided into four quadrants Q1 1204, Q2 1205, Q3 1206, and Q4 1207. The number of units of area within the quadrant occupied by the symbol image is then computed and shown adjacent to the quadrant. For example, 13.5 units of area 1210 are occupied by the portion of the symbol image in quadrant Q1 1204. These values for the number of units of area within each quadrant are then assigned to the variables Q1, Q2, Q3, and Q4. Thus, in the example shown in FIG. 12A, the variable Q1 is assigned the value 13.5, the variable Q2 is assigned the value 0, the variable Q3 is assigned the value 18, and the variable Q4 is assigned the value 13.5. Then, the value for the new parameter p is computed according to the small pseudocode snippet 1212 shown in FIG. 12A below the symbol window. For example, when all four variables Q1, Q2, Q3, and Q4 have the same value, then the parameter p is assigned the value 0 (1214), indicating a four-fold symmetry in the symbol window with respect to the number of units of area occupied by the symbol image. FIG. 12B illustrates the value of the additional parameter, discussed with reference to FIG. 12A, for each of the symbols in cluster 8. As can be seen from the parameters values associated with the symbols in FIG. 12B, the new parameter, discussed above with reference to FIG. 12A, has a different value for each of the six symbols in cluster 8. In other words, a combination of the three parameters used to create the three-dimensional plot shown in FIG. 10 and the additional parameter discussed above with reference to FIG. 12A can be used together to uniquely identify all of the symbols in cluster 8.

Figure 13:
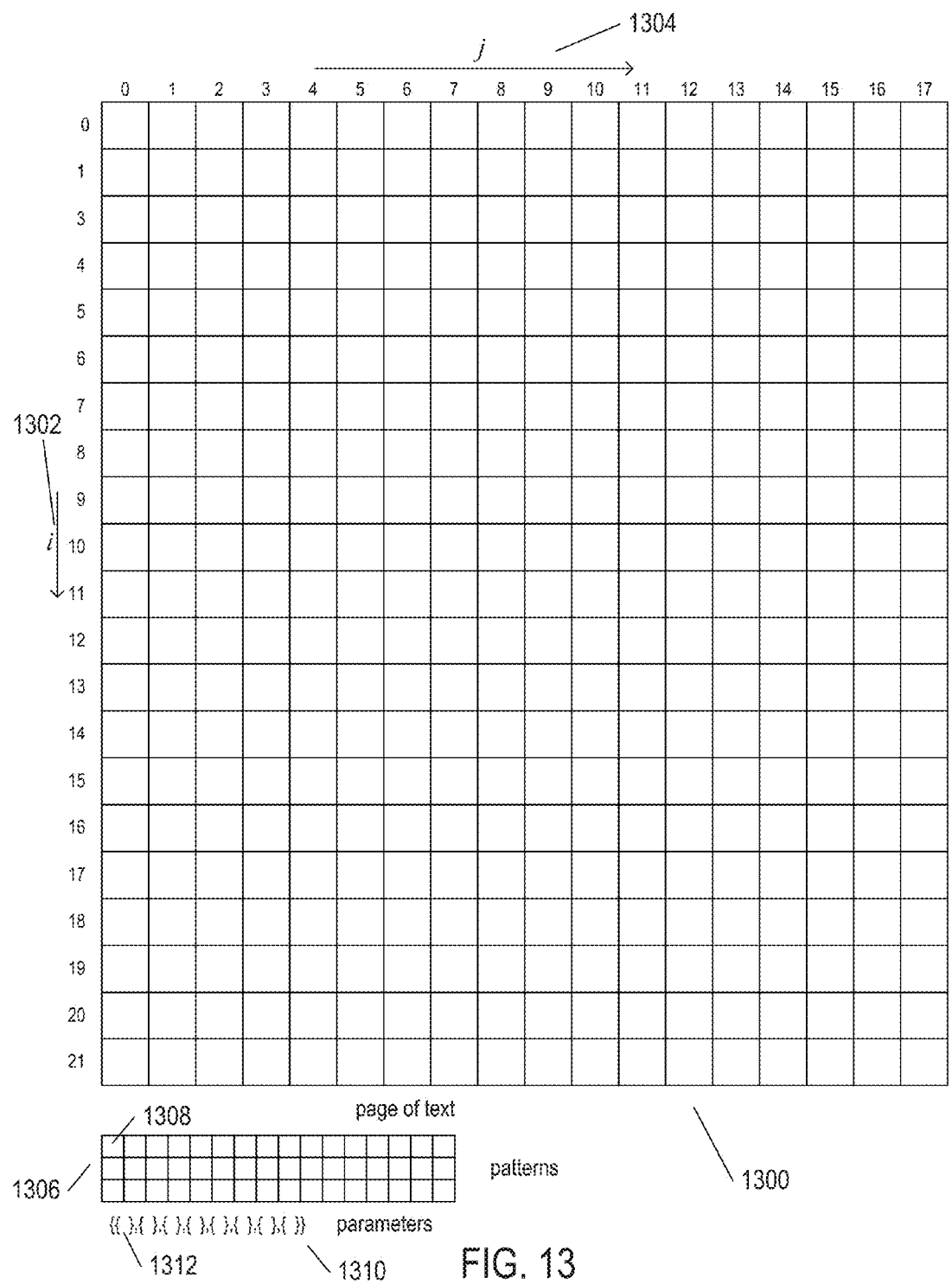
FIG. 13 illustrates a small text-containing image that has been initially processed, by an OCR system, to produce a grid of symbol windows 1300, each containing a symbol image.

FIG. 13 illustrates a small text-containing image that has been initially processed, by an OCR system, to produce a grid of symbol windows 1300, each containing a symbol image. Only the grid of symbol windows 1300 is shown in FIG. 13, without the symbol images contained within them, for clarity of illustration. The symbol windows are indexed by a vertical index i 1302 and a horizontal index j 1304. In this example, discussed below, for the sake of simplicity, symbols and symbol images are discussed, rather than graphemes. In the example, it is assumed that there is a one-to-one correspondence between symbols, graphemes, and patterns used to identify symbol images in symbol windows. In addition to the grid of symbol windows 1300, FIG. 13 also shows an array or matrix 1306 of patterns, each cell of which, such as cell 1308, including a pattern. Patterns are represented a sets of parameter/parameter-value pairs, with parameters chosen to uniquely distinguish symbol images, as discussed above with reference to FIGS. 8A-12B. FIG. 13 also shows an array of parameters 1310, illustrated as a set containing pairs of braces, such as the pair of braces 1312. Each pair of braces represents the functionality that computes a parameter value for a parameter with respect to a symbol image.

Figure 14:
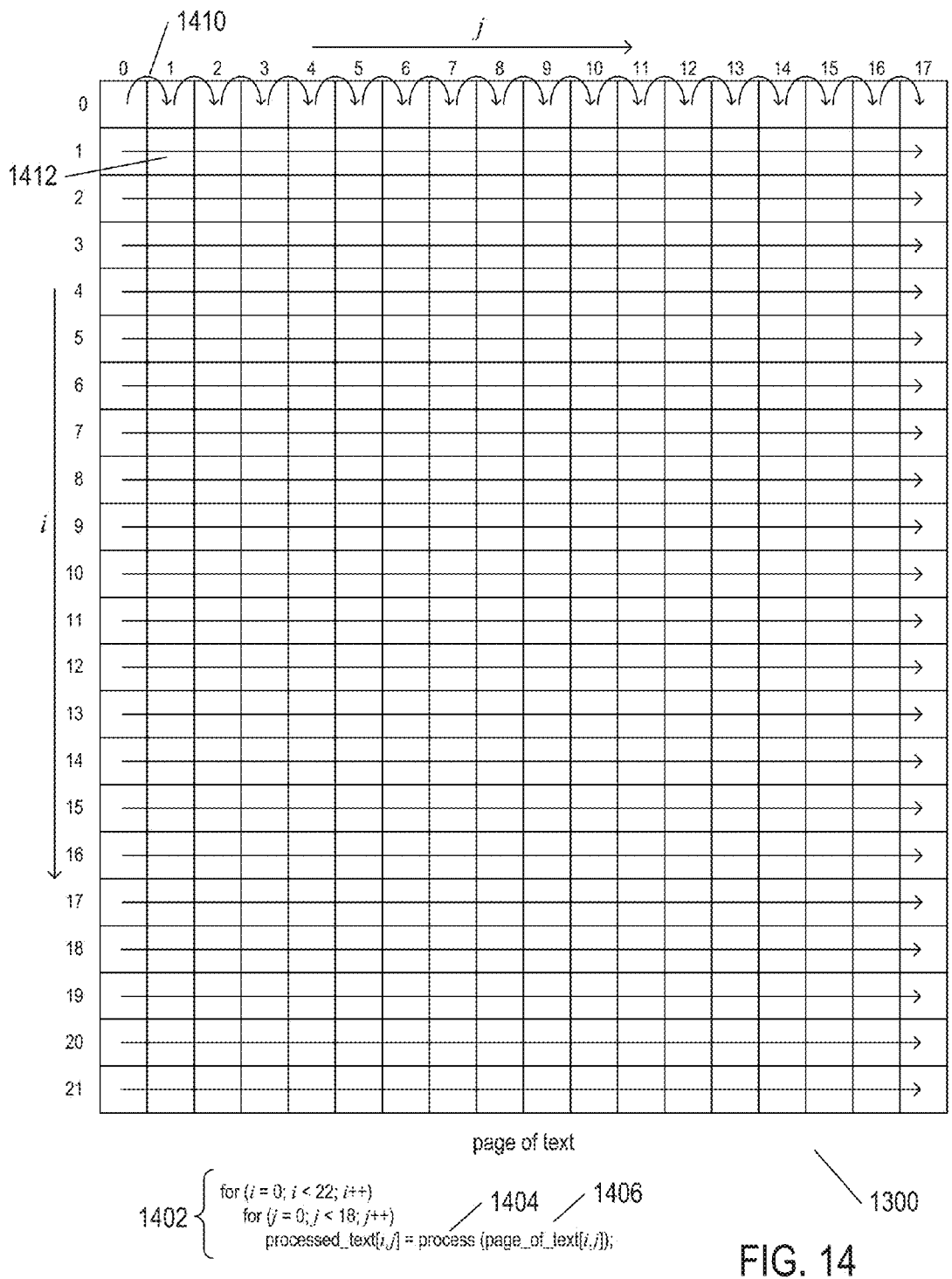
FIG. 14 illustrates a general approach to processing of the grid of symbol windows, shown in FIG. 13.

FIG. 14 illustrates a general approach to processing of the grid of symbol windows, shown in FIG. 13. At the highest level, processing can be considered to be a nested for-loop 1402 in which a routine "process" 1404 is called to analyze each symbol window 1406 in order to produce a corresponding symbol code 1408. In other words, the grid of symbol windows is represented, in the pseudocode example, as the two-dimensional array "page_of_text," and OCR processing generates a two-dimensional array of symbol codes "processed_text" from the two-dimensional array of symbol windows "page_of_text." In FIG. 14, curved arrows, such as curved arrow 1410, are used to show the traversal of the first row of the two-dimensional array, or grid, of symbol windows 1300 and horizontal arrows, such as arrow 1412, illustrate processing of the subsequent rows by for-loop 1402. In other words, the grid of symbol windows 1300 is traversed according to a traversal path and each symbol window in the grid is separately processed to produce a corresponding symbol code.

Figure 15:
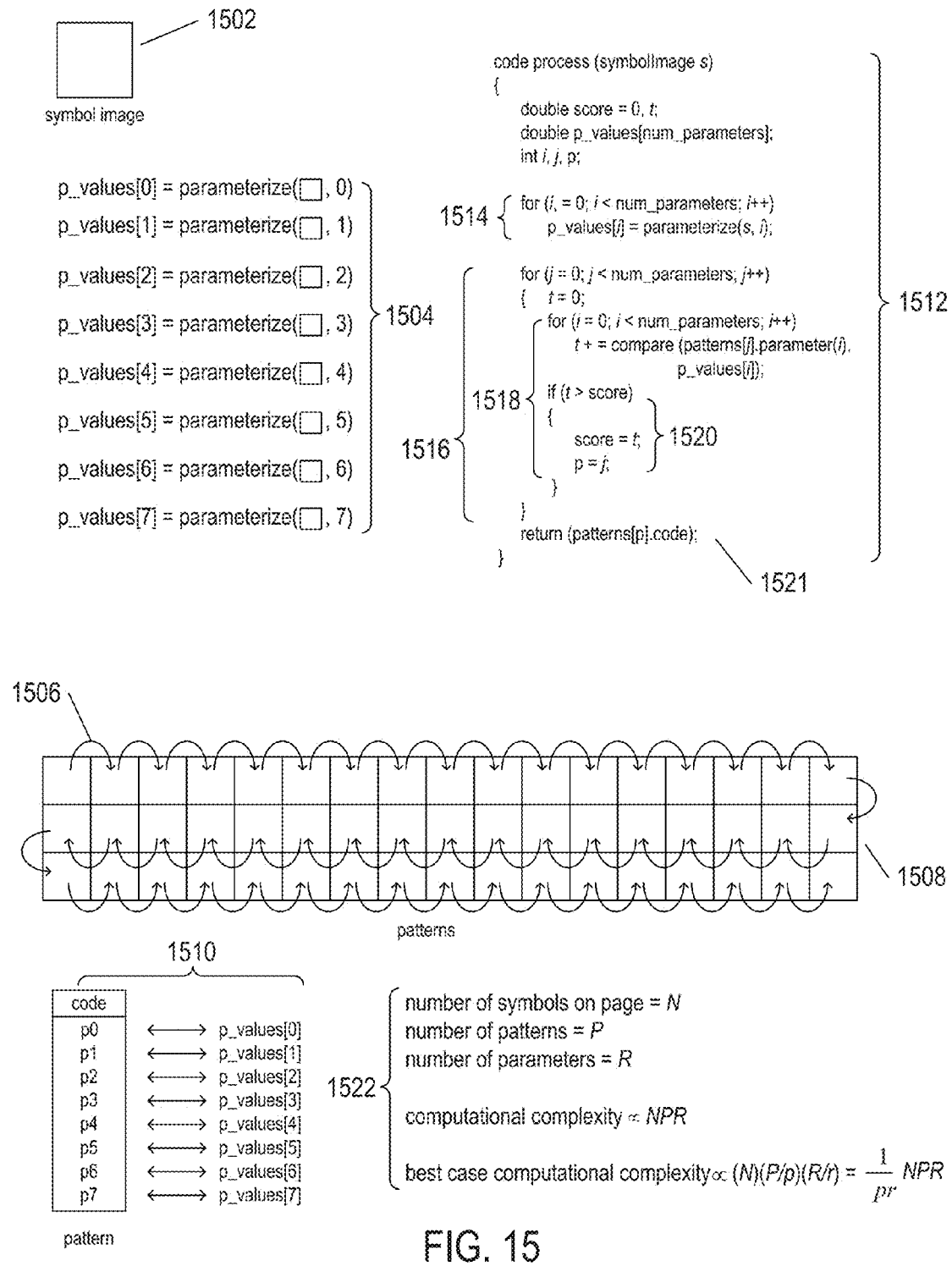
FIG. 15 illustrates a first approach to implementing the routine "process" (1404 in FIG. 14).

FIG. 15 illustrates a first approach to implementing the routine "process" (1404 in FIG. 14). A symbol image within a symbol window 1502 is input to the routine "process." The routine "process" computes parameter values p1-p8 for eight different parameters used in the example to characterize symbol images by calling a routine "parameterize," as shown by the eight calls to this routine 1504 in FIG. 15. The routine "parameterize" receives, as arguments, the symbol image and an integer indicating for which parameter to compute a parameter value and returns the computed parameter value. The parameter values are stored in an array of parameter values "p_values." Then, as shown by curved arrows, such as curved arrow 1506, the routine "process" traverses all of the patterns 1508 corresponding to symbols of the language, comparing the computed parameter values for the symbol image stored in the array "p_values" to precomputed parameter values for each pattern, as shown in the illustration of the comparison operation 1510 in FIG. 15. The pattern that best matches the computed parameters for the symbol image is chosen as the matching pattern, and the symbol code corresponding to that pattern is returned as the return value of the routine "process." Pseudocode for this first implementation of the routine "process" is also shown in FIG. 15 as pseudocode example 1512. In a first for-loop 1514, the values for the parameters with respect to the input symbol s are computed. Then, in the outer for-loop 1516 of a set of nested for-loops, each pattern in an array or vector of patterns 1508 is considered, the traversal of the array indicated by curved arrows, such as curved arrow 1506. In an inner for-loop 1518, a routine "compare" is called to compare each computed parameter value for the symbol image to a corresponding precomputed parameter value for the pattern, with the sum of the results of the comparisons accumulated in a local variable t. The highest accumulated comparison value is stored in a local variable score and the index of the pattern that most closely matches the symbol image within the input symbol window is stored in a variable p 1520. The symbol code associated with the pattern p is returned as the result of the routine "process" 1520.

Finally, in FIG. 15, a rough characterization of the computational complexity for the first implementation of the routine "process" 1522 is shown. The number of symbol windows in the text-containing image is N=i×j. In the current example, N=357. Of course, the number of symbol images to be processed depends on the type of document and number of document images as well as on the language and other parameters. However, in general, N varies from tens to hundreds of symbol images per document image. The number of patterns against which symbol images are matched is represented by P. For many alphabetic languages, including most European languages, the number of patterns may be relatively small, generally some relatively small multiple of the number of characters in the alphabet. However, for languages such as Chinese, Japanese, and Korean, the number of patterns may vary from tens of thousands to hundreds of thousands. Thus, for processing such languages, P is much larger than N. The number of parameters used to characterize each symbol image and pattern is represented as R. The overall computational complexity is therefore estimated as NPR. The factor N comes from the outer nested for-loops shown in FIG. 14. The factors PR come from the nested for-loops 1516 and 1518 in the implementation of the routine "process" 1512 shown in FIG. 15. In other words, the routine "process" is called once for each of N symbol images, and each invocation or call to the routine "process" involves R comparisons for each of P patterns. The initial parameter-value computation is considered a constant overhead, in this analysis. There are many possible ways for improving the implementation illustrated in FIG. 15. As one example, the comparison operation may consider only a subset of parameters of the total number of parameters needed to uniquely characterize a symbol image with respect to a particular pattern. Thus, an average number of parameter comparisons $$\frac{R}{r}$$

may be needed, rather than R comparisons. Additionally, rather than comparing each symbol image with each pattern, the symbol images may be traversed until a pattern that produces a comparison score above some relatively high threshold is found. In this case, the number of patterns that are compared in each symbol image may be $$\frac{P}{p}$$

rather than P. But, using these improvements, the computational complexity is nonetheless proportional to some generally large fraction of NPR.

Figure 16A:
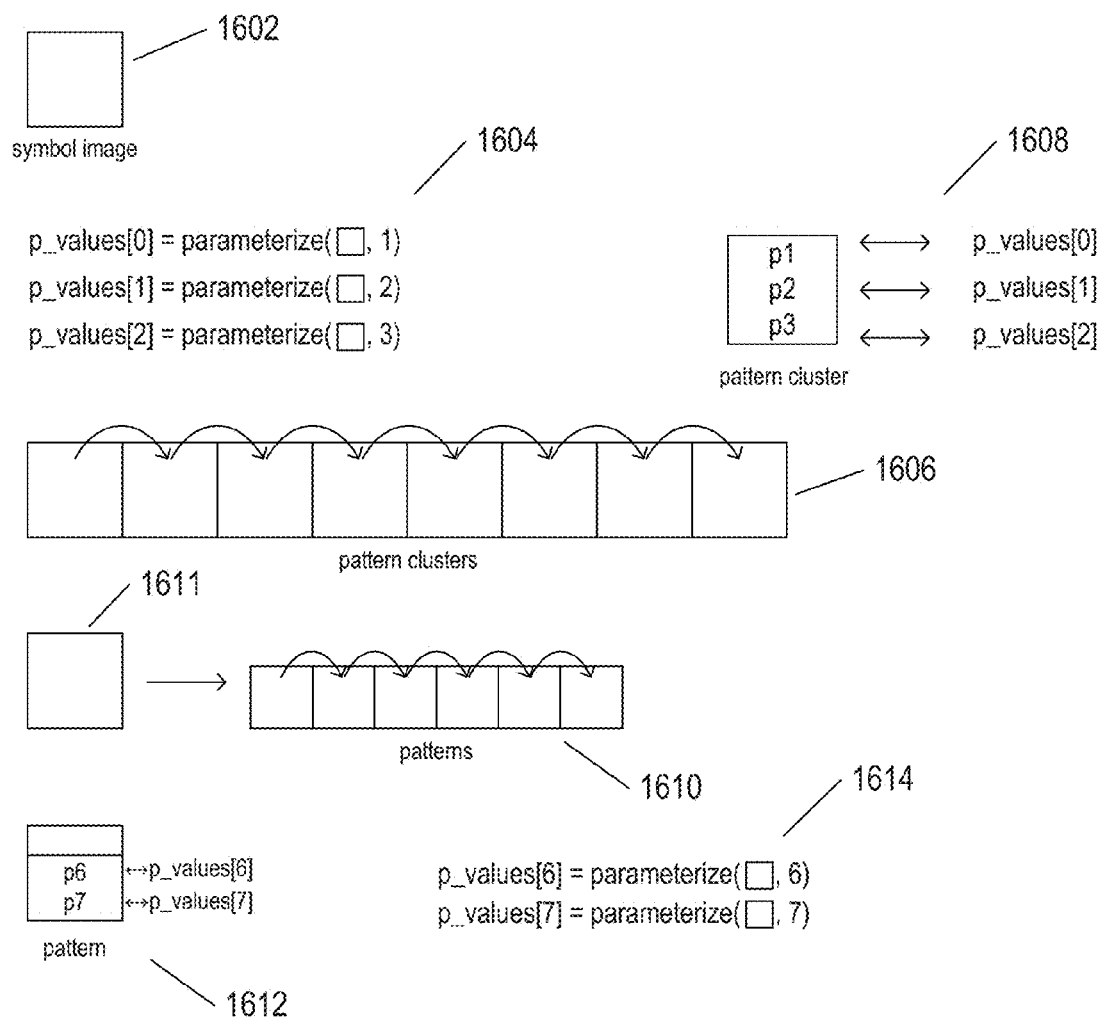
FIG. 16A illustrates a second implementation of the routine "process" (1404 in FIG. 14).

FIGS. 16A-B illustrate a second implementation of the routine "process" (1404 in FIG. 14). In the second implementation, the routine "process" also receives a symbol image 1602 as input. However, in this implementation, the patterns are grouped together into clusters, such as the clusters discussed above with reference to FIGS. 11A-B. The routine "process" computes a sufficient number of parameter values 1604 in order to traverse the clusters of patterns 1606 to identify the most likely matching cluster. Thus, a relatively modest comparison operation 1608 is initially used to select the best pattern cluster. Then, the patterns 1610 within the selected pattern cluster 1611 are traversed using a second, modest comparison operation 1612 that involves some additional number of parameter values 1614 needed to distinguish the best pattern from the relatively small number of patterns 1610 contained in the pattern cluster. Pseudocode for the second implementation of the routine "process" is provided in FIG. 16B. In a first nested for-loop 1620, the most likely or best pattern cluster is selected from among the pattern clusters and in a second nested for-loop 1622, the best pattern from among the patterns within the selected cluster is identified. The initial set of parameters used for determining the best cluster is computed in for-loop 1624 and the additional parameters needed to select a pattern from among the patterns of the selected cluster are computed in the for-loop 1626. FIG. 16B also indicates a rough estimate of the computational complexity for the second implementation of the routine "process" 1630. As indicated, the estimate for the computational complexity for this second implementation of the routine "process" is:

$$N(CR_1 + P'R_2),$$

where the number of symbols on page=N;
number of clusters=C;
number of patterns/cluster=P';
number of initial parameters=R;
number of additional parameters=$R_2$.
Because P' is generally far smaller than P, and because C is even smaller still, the computational complexity for the second implementation of the routine "process" is quite favorable compared to the computational complexity for the first implementation of the routine "process."

Another approach to speeding up the first implementation of the routine "process," discussed above with reference to FIG. 15, is to sort the patterns in the vector or array of patterns so that the most likely patterns corresponding to the most frequently occurring symbols will be first encountered while traversing the vector or array of patterns. When the search for a matching pattern is truncated by finding a pattern with a comparison score greater than some threshold value, and when the patterns are sorted by a frequency of occurrence reflective of the frequency of occurrence of symbols in the text-containing image that is being processed, a significant decrease in computational complexity is obtained. However, the frequency of occurrence of symbols in particular text-containing images may vary enormously depending on the type of document or page that was scanned to produce the image, and is unknown prior to OCR processing. A sorting of the patterns that produces a significant decrease in computational complexity for one type of document may, for another type of document, significantly increase the computational complexity. For example, an overall statistical analysis of all different types of text documents in a particular language, including novels, advertisements, textbooks, and other such documents, may produce a general frequency-of-occurrence-of-symbols sorting of patterns. However, certain documents and specialized fields may have an entirely different set of frequencies of occurrence of symbols. In this case, for the documents of the particular field, the most frequently occurring characters may end up towards the end of the traversal path through the vector or matrix of patterns sorted according to the general frequency-of-occurrence-of-symbols sorting of patterns. The second implementation of the routine "process," discussed above with reference to FIGS. 16A-B, generally produces a significant decrease in computational complexity and corresponding increase in processing speeds. In general, a much smaller number of comparisons are needed in order to find a matching pattern for each symbol image. However, the second implementation is associated with a potentially serious problem in that, should the first nested for-loop that selects the cluster fail, then the routine "process" cannot possibly find the correct matching symbol. The correct matching symbol, in that case, is in a different cluster that is never analyzed in the second nested for-loop. While the examples of symbol sets and clusters provided above are relatively simple, as are the parameters used to characterize them, for the languages such as Chinese and Japanese, the task is far more complex and far more prone to error due to printing imperfections, document damage, and various types of errors that arise in scanning and initial OCR processing steps. Therefore, the chance of improperly choosing a cluster in such real-world problem domains is significant.

FIG. 17 illustrates a third implementation of the routine "process," discussed in the previous subsection, using the same illustration and pseudocode conventions used in the previous subsection. As shown in FIG. 17, the third implementation of the routine "process" uses an additional data structure 1702 referred to as "votes." The votes data structure includes an integer value for each pattern. This data structure is initialized to contain all zero values for all patterns. Then, in a first preprocessing step represented by the doubly nested for-loop 1704 in FIG. 17, a new set of clusters is allocated for each symbol image in the text-containing document 1300 and the patterns within the clusters are ordered based on votes collected within the votes data structure. In other words, the patterns are ordered within the newly allocated set or list of clusters so that those patterns most likely to match the currently considered symbol image are first encountered in a traversal of the patterns. The parameter values for a set of comparison parameters computed for the currently considered symbol image are compared to the parameter values for each pattern, and votes are cast for those patterns that, based on the comparison, have a similarity to the symbol image above a threshold similarity. In certain implementations, the clusters within the set of clusters may also be sorted by cumulative similarity of the patterns within them to the symbol image.

After the preprocessing step carried out in the nested for-loops 1704, each symbol image is processed by a third implementation of the routine "process." Pseudocode for the third implementation of the routine "process" 1710 is provided in FIG. 17. In this implementation, the routine "process" receives a symbol image and the set of clusters prepared for the symbol image in the preprocessing step and stored in the array NxtLvlClusters and returns a pointer to a list of potentially matching patterns. In a first for-loop 1712, parameter values for parameters used to identify patterns matching the received symbol image are computed. In a second outer for-loop 1714, each cluster is considered until the list of potentially matching patterns is full. In other words, when a maximum number of potentially matching patterns has been found, this outer for-loop is short-circuited. In an inner for-loop 1716, a function "similar" is called for each pattern in a cluster to determine whether the pattern is sufficiently similar to the symbol image to add the pattern to the list of potentially matching patterns. Again, when the list of potentially matching patterns is filled, this inner for-loop is also short-circuited. FIG. 17 provides an estimate for the computational complexity of this third implementation of the routine "process" 1720. Because both the outer and inner for-loops 1714 and 1716 are short-circuited when a sufficient number of potentially matching patterns is found, and because the vectors or lists of patterns within each cluster are sorted by frequency of occurrence in the actual document being processed, only a relatively small fraction of the comparisons needed in the second implementation of the routine "process" are needed by the third implementation, as represented by the fraction $$\frac{1}{d}$$

1722. There is, of course, an initial preprocessing penalty represented by the term "e" 1744. However, as discussed above, the number of symbol images that are processed, N, is generally quite small in comparison to P or P', for languages such as Chinese, Japanese, and Korean, and therefore the third implementation of the routine "process" provides significantly decreased computational complexity in comparison to either the first or second implementations of the routine "process," discussed above. More importantly, the third implementation of the routine "process" is guaranteed to look through all of the clusters until some maximum number of potentially matching symbols is found. When the threshold for similarity for clusters is set to a relatively low value and the threshold for similarity for patterns is set relatively high, there is a very high probability that the list of potentially matching symbols returned by the routine "process" will include the actual symbol that best matches the input symbol image.

The above discussion, including the third implementation outlined in FIG. 17, provides a context for describing a particular aspect of this generalized third implementation to which the current document is directed. It should be clearly understood that the above-described implementations are generalized implementations and that any particular implementation of an OCR system may use any of a large number of different possible alternative implementations.

Figure 18:
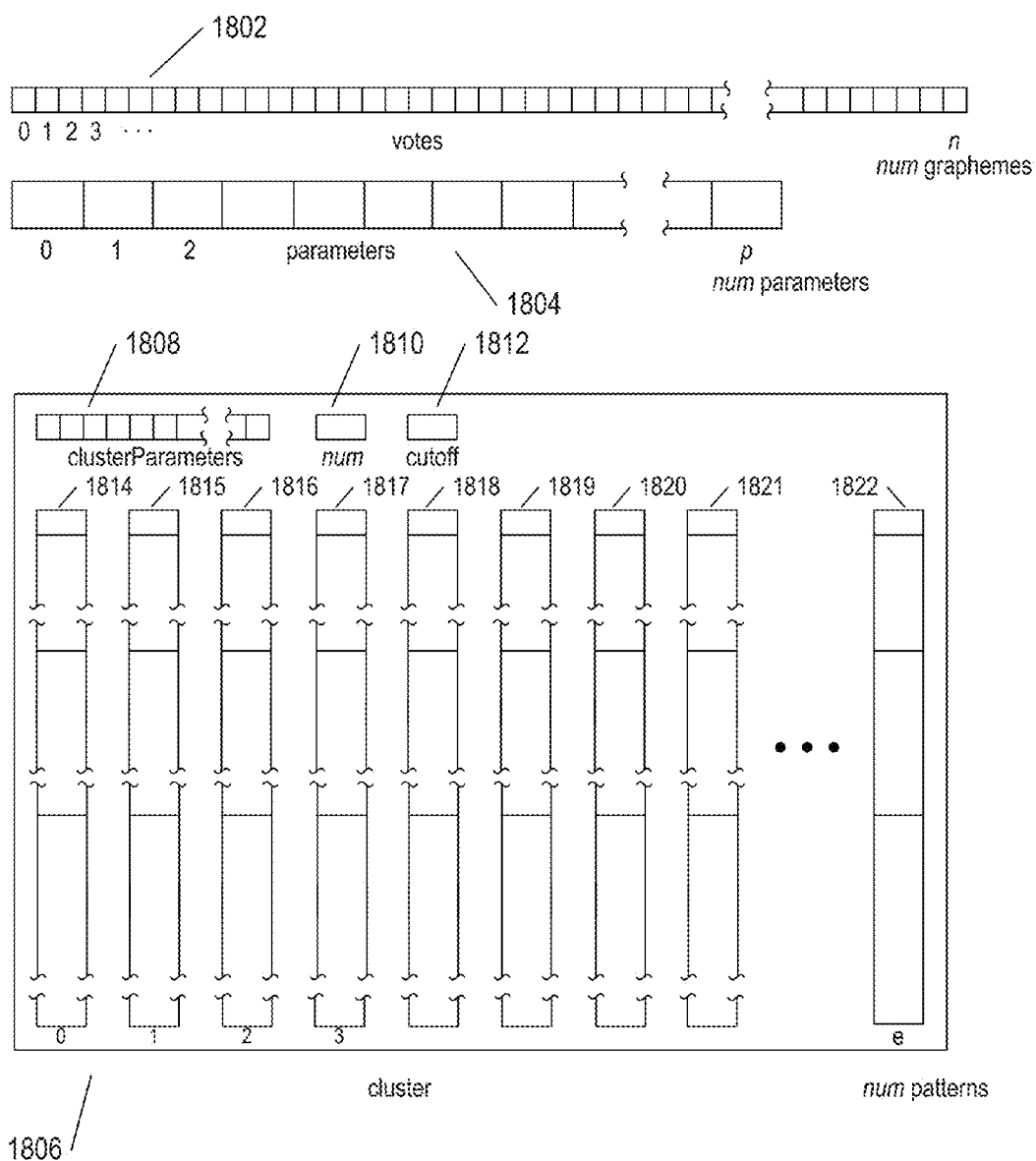
FIG. 18 illustrates data structures that provide for clustering and preprocessing in one implementation of an OCR system that incorporates the general third implementation or the routine "process," described above.

The current document is directed to the control logic and data structures within an OCR system that allows for both clustering of patterns as well as for the above-described preprocessing step in which graphemes within patterns can be sorted by the frequency of occurrence of the graphemes within a text-containing scanned image or set of scanned images. These control logic and data structures are used in a preprocessing/clustering OCR implementation in which a fixed set of parameters is associated with each cluster and used in symbol-image/pattern comparisons with respect to patterns contained in the cluster. The clusters may be used in different local operations or phases of a complex OCR processing task, and the particular parameters used, and the number of parameters used, for symbol-image/pattern comparisons with respect to patterns contained in the cluster may differ in different local operations and phases, and may often differ among different clusters. FIG. 18 illustrates data structures that provide for clustering and preprocessing in one implementation of an OCR system that incorporates the general third implementation of the routine "process," described above. A first data structure is an array or vector 1802 referred to as "votes." In a described implementation, the array "votes" includes one element for each of the graphemes for a language. The array "votes" is indexed by integer grapheme codes. In other words, each grapheme is assigned a unique integer identifier, and that unique identifier, or code, for a grapheme serves as an index into the array "votes." As shown in FIG. 18, the array "votes" may be implemented with n entries, where n is the number of graphemes in the language and the grapheme codes monotonically increase from 0 to n. Of course, the data structure "votes" may be alternatively implemented as a sparse array, when grapheme codes are not monotonically increasing, as a list, or using other types of data structures.

FIG. 18 shows a second data structure 1804 which is an array of instances of the class "parameter." As with the data structure "votes," the array "parameters" may be alternatively implemented by various alternative data structures, including lists, sparse arrays, and other data structures. In the currently described implementation, the array "parameters" includes p entries or elements that are indexed by monotonically increasing parameter numbers 0, 1, 2, . . . , p. Each instance of the class "parameter" represents one of the various parameters used to characterize symbol images and patterns, as discussed above.

FIG. 18 additionally shows a cluster data structure 1806 that represents a cluster or set of patterns. The cluster data structure includes an array "clusterParameters" 1808 that represents the parameters used to characterize the patterns within the cluster at a particular point in time as well as to characterize symbol images for comparison with the patterns contained in the cluster. Each element in the array "clusterParameters" contains an index into the array "parameters" 1804. By using indices into the array "parameters" 1804, the particular parameters and the number of parameters used for comparisons can be easily changed or reconfigured, so that the cluster can be efficiently reconfigured for different local operations or phases. The cluster data structure also includes an integer num 1810 that indicates the number of parameter indices contained in the array "clusterParameters." The cluster data structure additionally contains a double, or floating-point, value, referred to as "cutoff" 1812 that contains a threshold weight for evaluation of patterns, contained in the cluster, with respect to a symbol image. Finally, the cluster data structure 1806 includes a number of pattern data structures 1814-1822. The pattern data structures are discussed below.

Figure 19B:
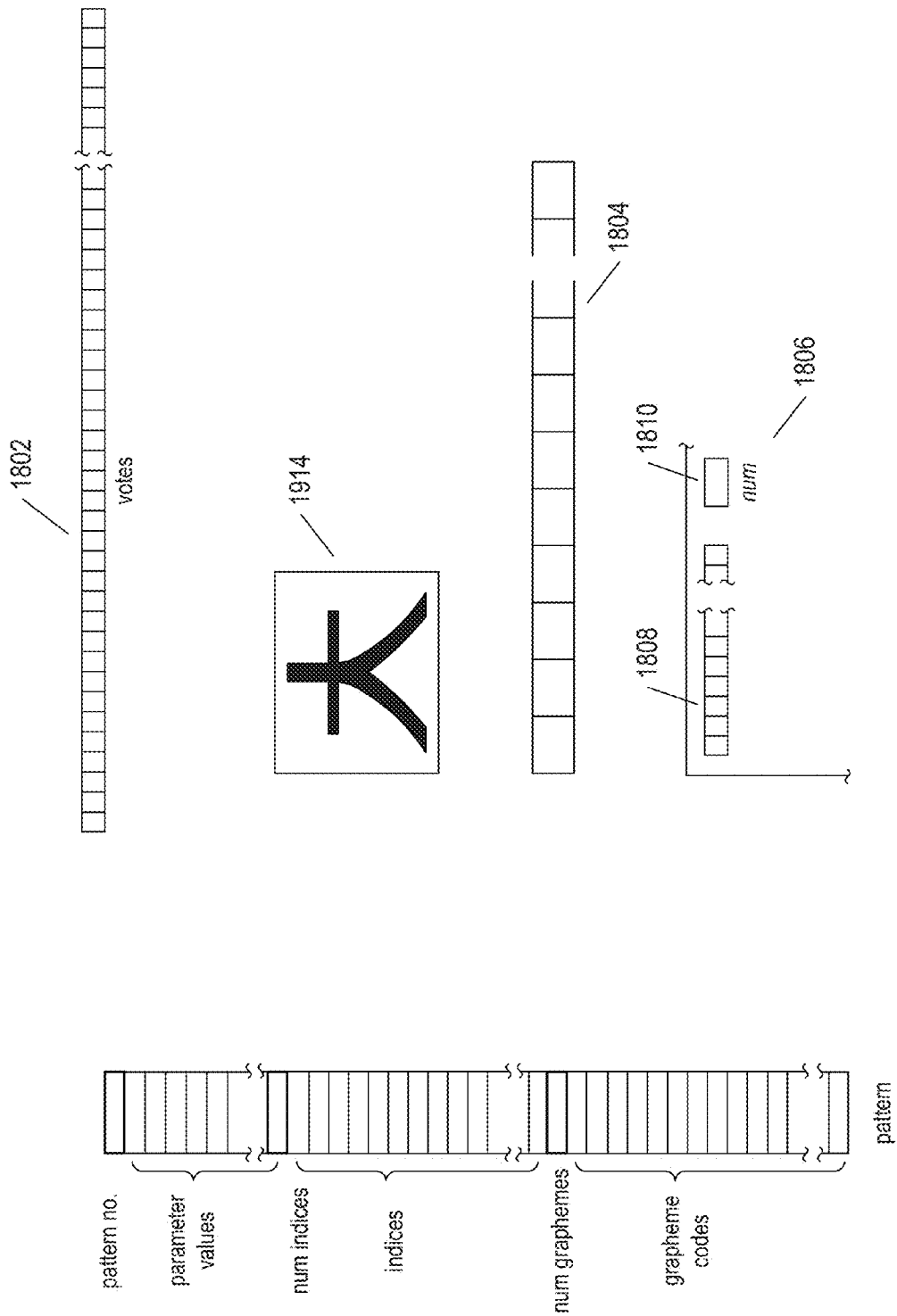
FIG. 19B illustrates preprocessing of a symbol image using the data structures discussed above with reference to FIG. 18.

FIGS. 19A-H illustrate preprocessing of a symbol image using the data structures discussed above with reference to FIG. 18. FIG. 19A shows the data structure "votes" 1802, discussed above with reference to FIG. 18, and a single pattern data structure 1902 selected from the patterns contained in the cluster data structure 1806, also discussed above with reference to FIG. 18. Each pattern data structure includes a pattern number 1904 and a set of parameter values 1905 computed for the pattern using the parameters referenced by indexes contained in the "clusterParameters" array 1808 within the cluster data structure 1806. As noted above, it is important to remember that symbol images are scaled, rotated, and translated to create normalized symbol images to facilitate parameter-based comparisons between symbol images and patterns. The pattern data structure additionally includes an integer 1906 that indicates the number of indices within the pattern data structure, and then the indicated number of indices 1908. These indices are associated with the different possible weights that can be computed during comparison of a symbol image with a pattern. In one implementation, there may be as many indices within the pattern data structure as there are possible computed weights, with each index comprising an integer index as well as the computed weight associated with the index. Other implementations are possible. When a symbol image is parameterized, and the parameter values for the symbol image compared to the pattern represented by the pattern data structure, a weight is produced. The greater the weight value, the less well the symbol image matches the pattern. This weight is used to select a corresponding index, from the indices, that is used to select a number of graphemes corresponding to the pattern for which to vote, during the preprocessing step. Each pattern data structure includes an integer indicating the number of graphemes corresponding to the pattern 1910 and then one code for each grapheme of the set of graphemes corresponding to the pattern 1912. In many implementations, these grapheme codes are sorted with respect to similarity or closeness to the encompassing pattern, in decreasing similarity order.

FIGS. 19B-H illustrate preprocessing of a single symbol image selected from a text-containing scanned image. In the example of FIGS. 19B-H, the symbol image 1914 represents a character from an Asian language. FIG. 19B also shows the array "parameters" 1804, discussed above with reference to FIG. 18, and a small portion of the clusters data structure 1806 that includes the array "clusterParameters" 1808 and the integer num 1810.

Figure 19D:
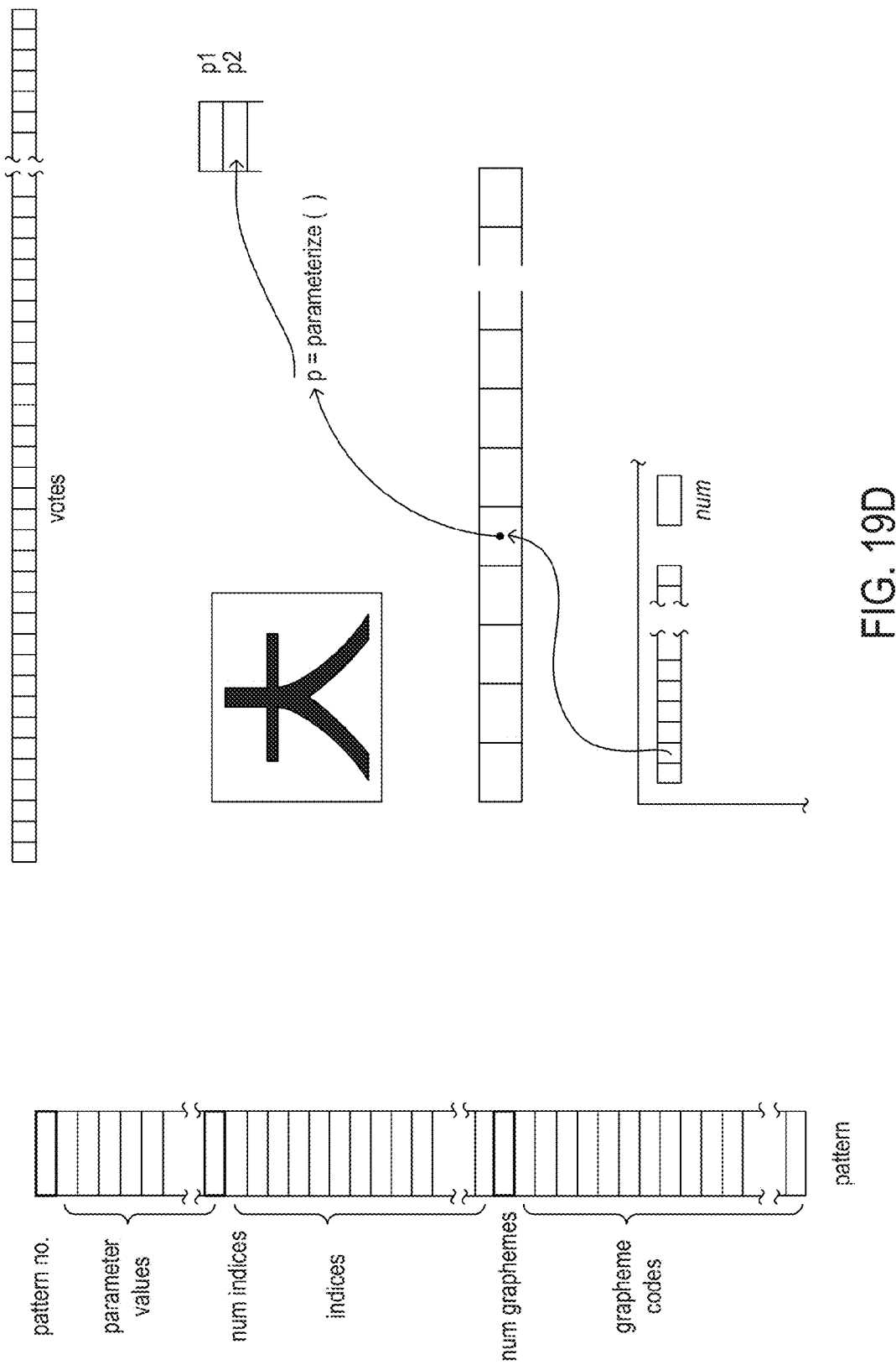
FIG. 19D illustrates preprocessing of a symbol image using the data structures discussed above with reference to FIG. 18.
Figure 19E:
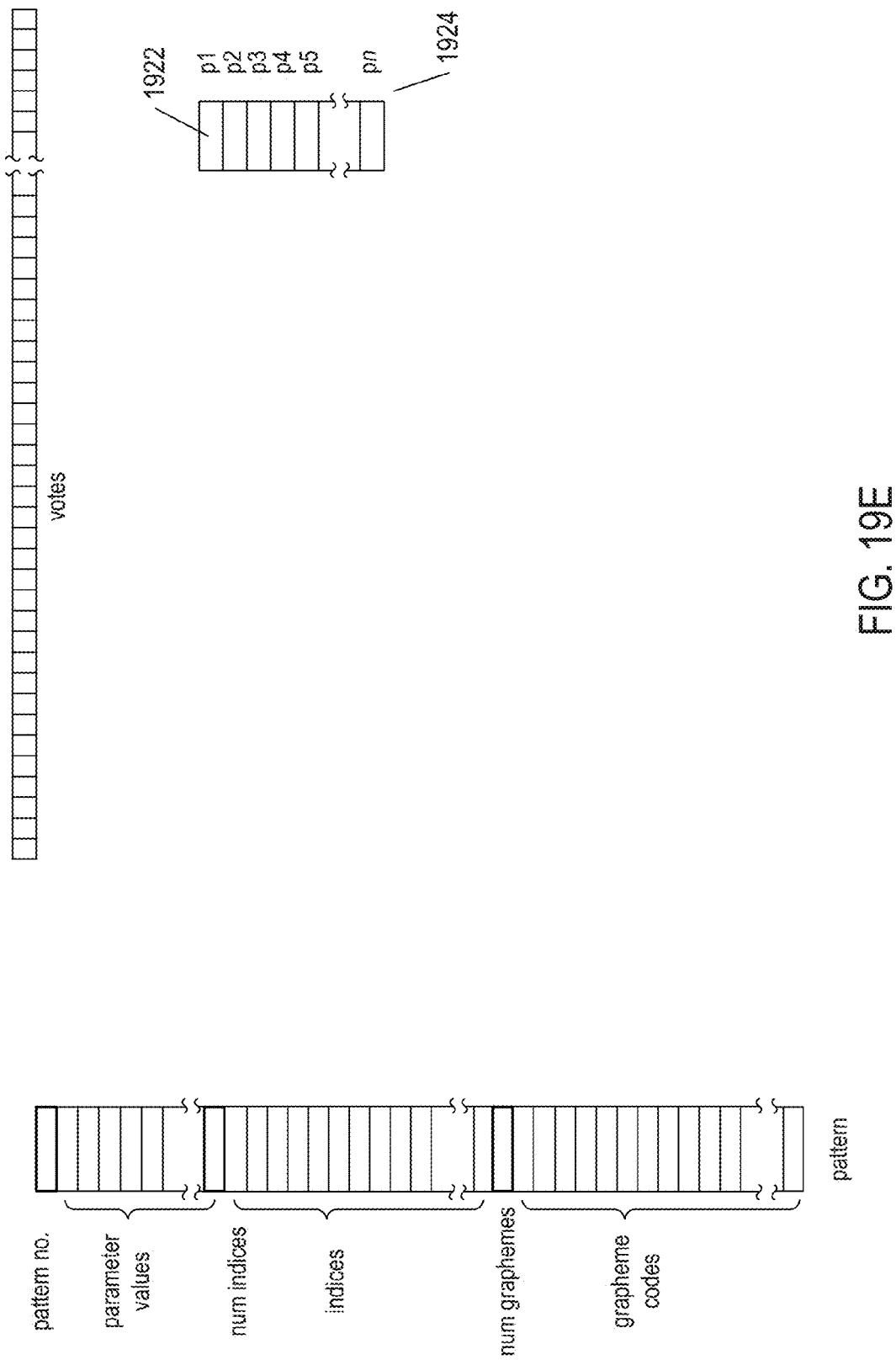
FIG. 19E illustrates preprocessing of a symbol image using the data structures discussed above with reference to FIG. 18.

As shown in FIG. 19C, for each of the num parameters, indexes for which are included in the array "clusterParameters" 1808, the index for a parameter 1916 is extracted from the array "clusterParameters" 1808 and used to access an instance of the class "parameter" 1918 within the array "parameters" 1804. A member function "parameterize" of the instance of the class "parameter" 1918 is called to generate a parameter value 1920 that is then stored in a local variable 1922. FIG. 19C illustrates computation of a first parameter value for the symbol image. FIG. 19D shows computation of a second parameter value for the symbol image. When all num instances of the class "parameter" have been invoked to generate num parameter values for the symbol image, a list or array of symbol-image parameter values 1924 is obtained, as shown in FIG. 19E.

Figure 19F:
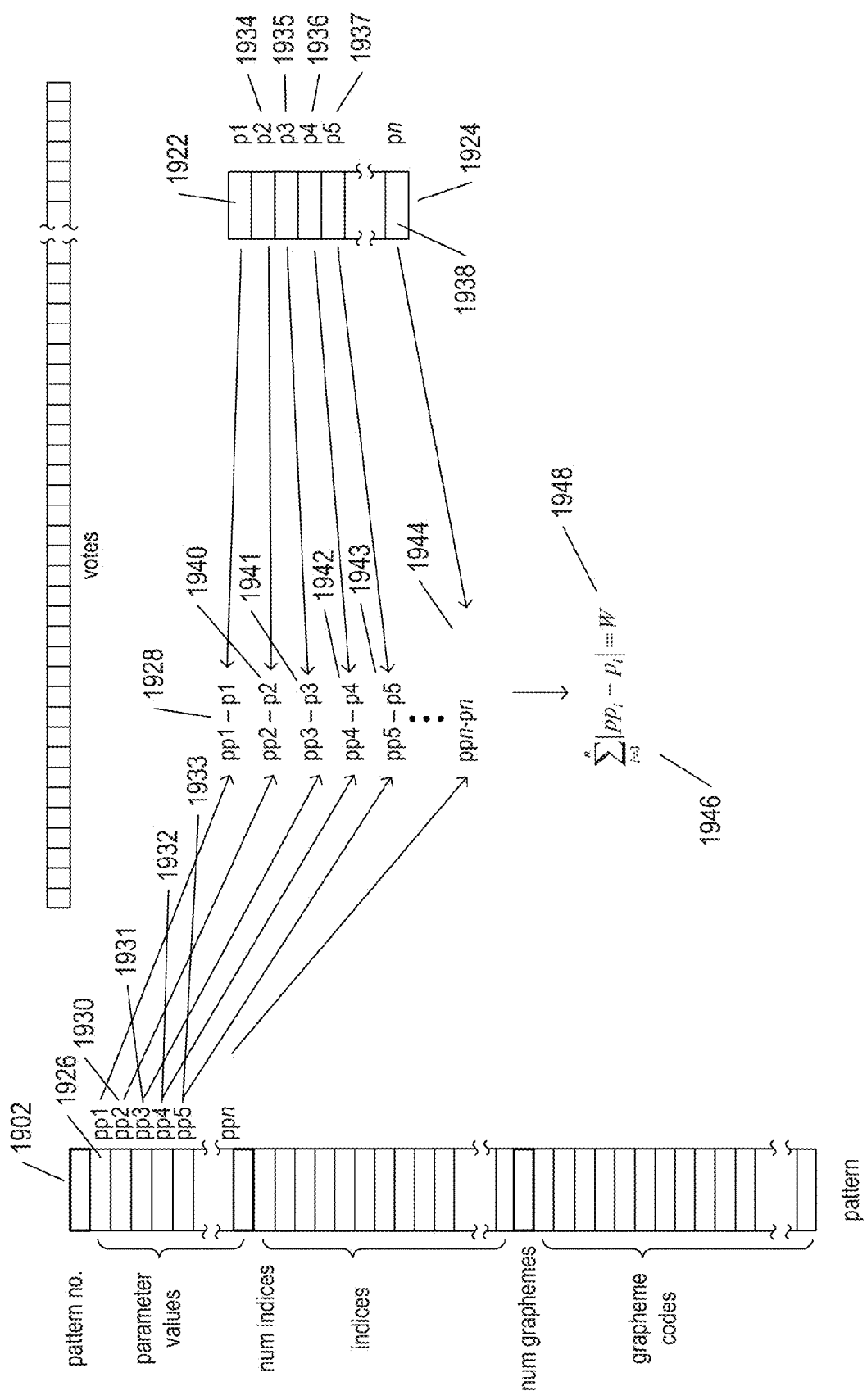
FIG. 19F illustrates preprocessing of a symbol image using the data structures discussed above with reference to FIG. 18.

Next, as shown in FIG. 19F, the corresponding parameter value precomputed for the pattern represented by the pattern data structure and parameter for the symbol image are subtracted to produce a series of computed values, one for each parameter. For example, as shown in FIG. 19F, the first parameter value 1926 stored in the pattern data structure 1902 and the first parameter value 1922 computed for the symbol image are subtracted to produce an intermediate value 1928. The remaining predetermined parameter values for the pattern 1930-1933 and the remaining parameter values for the symbol image 1934-1938 are similarly subtracted to produce additional intermediate computed values 1940-1944. The absolute values of these intermediate values 1928 and 1940-1944 are summed 1946 to produce the weight 1948 that numerically represents a parameter-based comparison between the symbol image and the pattern represented by the pattern data structure 1902. Again, the greater the value of the computer weight, the less similar the symbol image to the pattern, as the weight is an accumulation of differences between parameter values for the symbol image and pattern.

Figure 19G:
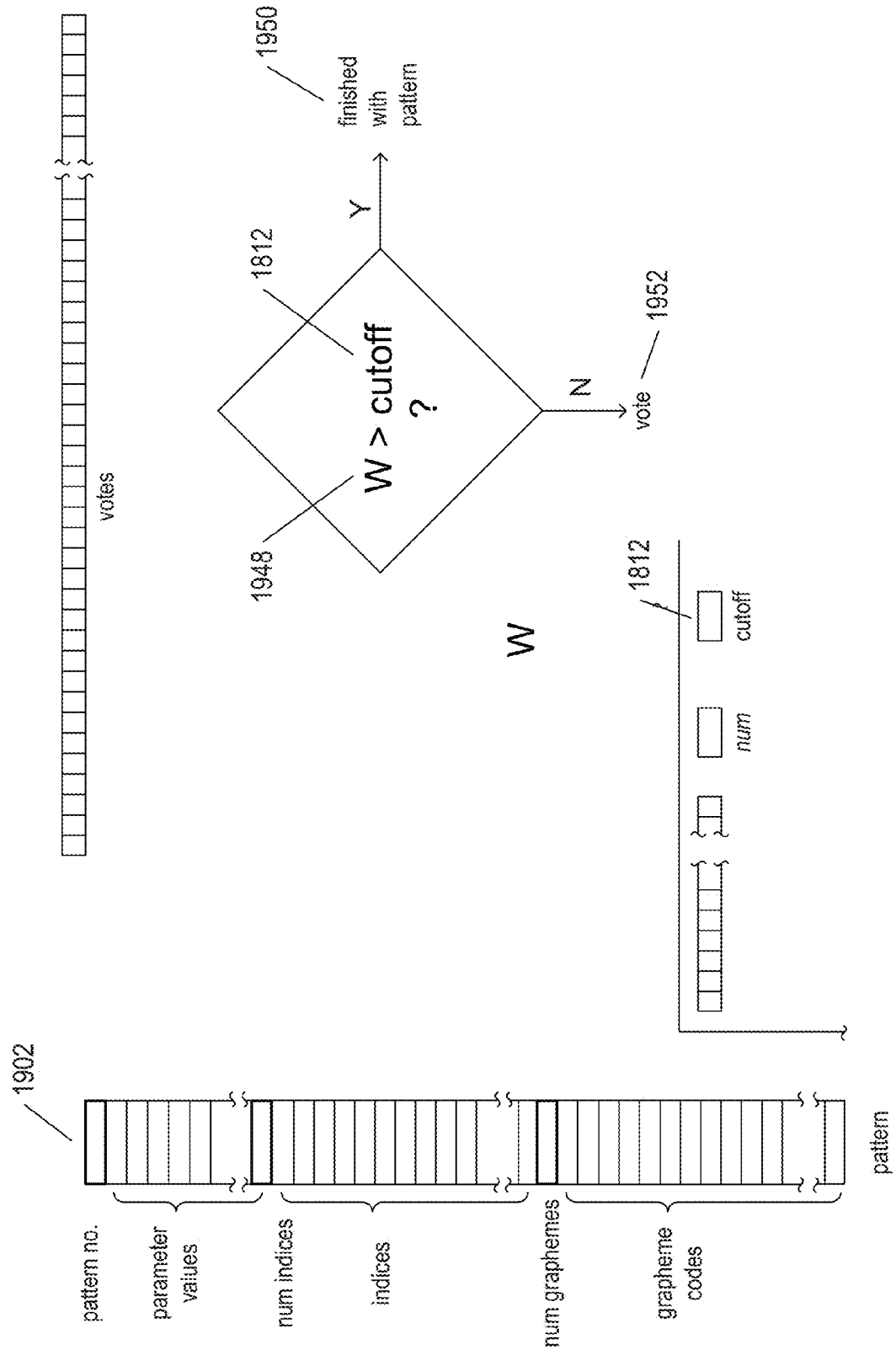
FIG. 19G illustrates preprocessing of a symbol image using the data structures discussed above with reference to FIG. 18.

As shown in FIG. 19G, when the computed weight 1948 is greater than the cutoff value 1812 for the cluster, the preprocessing for the symbol image with respect to the pattern represented by the pattern data structure 1902 is finished 1950. Otherwise, the preprocessing of the symbol image votes for one or more of the graphemes corresponding to the pattern represented by the pattern data structure 1952.

Figure 19H:
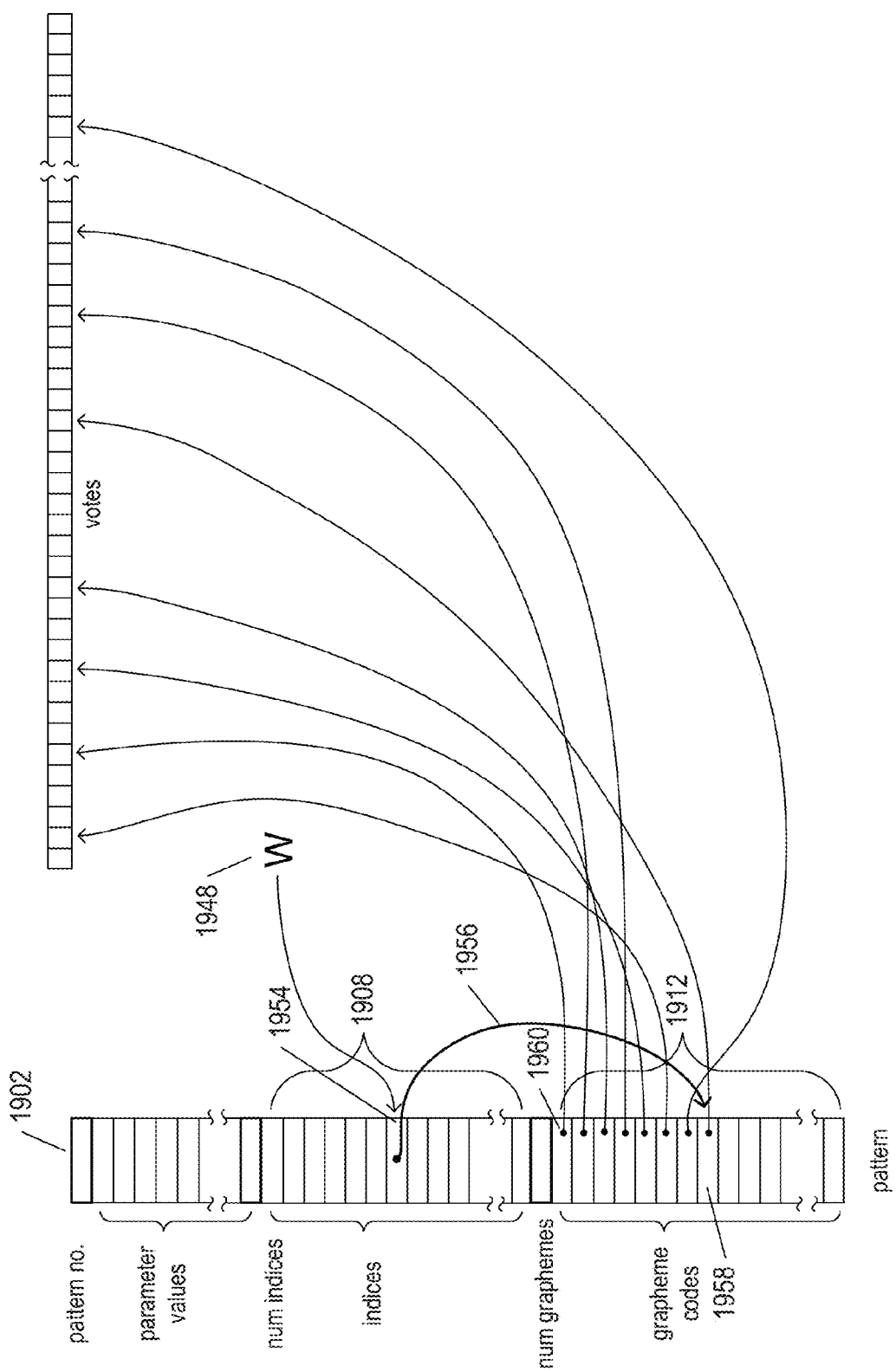
FIG. 19H illustrates preprocessing of a symbol image using the data structures discussed above with reference to FIG. 18.

FIG. 19H illustrates the case when the computed weight that represents the comparison of the symbol image with the pattern represented by the pattern data structure is less than or equal to the cutoff value for the cluster. In this case, the computed weight 1948 is used to select an index 1954 from the set of indices 1908. As discussed above, each of the indices 1908 may contain an index and an associated weight, allowing a particular one of the indices 1954 to be selected by the computed weight 1948, from index which an index into the grapheme codes is extracted. This extracted index points 1956 to a particular grapheme code 1958 within the set of grapheme codes 1912 stored within the pattern data structure to represent those graphemes that correspond to the pattern. Then, for all of the grapheme codes beginning with a first grapheme code 1960 and extending to the grapheme code 1958 pointed to by the extracted index 1956, the corresponding element of the data structure "votes" 1802 is incremented, as represented by the arrows emanating from the elements containing grapheme codes between and including elements 1960 and 1958, such as arrow 1962.

Thus, when the computed weight for the comparison of the symbol image to the pattern is less than the cutoff value, then the symbol image is sufficiently similar to the pattern that at least some of the graphemes corresponding to the pattern deserve a vote in the preprocessing step. Those graphemes sufficiently similar to the symbol image are selected based on the computed weight using an index selected from one of the indices 1908 corresponding to the computed weight. Then, elements of the data structure "votes" corresponding to these graphemes are incremented to reflect votes for these graphemes based on preprocessing of the symbol image.

Next, C++-like pseudocode is provided to illustrate the preprocessing of a symbol image with respect to the patterns within a cluster, as illustrated in FIGS. 19A-H. Relatively simple C++-like pseudocode is employed, including fixed-size arrays and simple control structures. Of course, more efficient, but also more complex, implementations may be used in practical OCR systems, including iterators, data structures that implement associative memory, and other such alternative data structures and associated methods.

First, a number of data structures and class declarations are provided:

```
1    int votes[NUM_GRAPHEMES];
2    class parameter
3    {
4        virtual double parameterize (symbolImage* s);
5    };
6    parameter Parameters [NUM_PARAMETERS];
7    class pattern
8    {
9        private :
10           int patternNo;
11           double parameters[MAX_PARAMETERS];
12           int numIndices;
13           int indices[MAX_INDICES];
14           int numGraphemes;
15           int graphemes[MAX_GRAPHEMES];
16       public :
17           double getParameter (int i);
18           int getIndex (double w);
19           int getGrapheme (int i);
20           pattern ( );
21    };
22   class cluster
23   {
24       private :
25           int num;
26           int clusterParameters[MAX_CLUSTER_PARAMETERS];
27           double cutoff;
28           int numPatterns;
29           pattern*patterns;
30       public :
31           double getCutoff ( );
32           int getNum ( );
33           int getParameter (i);
34           pattern* getPattern (i);
35           int getNumPatterns ( );
36           cluster ( );
37   };
```

The data structure "votes" 1802 is declared on line 1, above. A small portion of a declaration for a class "parameter" is provided on lines 2-5. In the current discussion, the only relevant aspect of the parameter class is that the base class includes a virtual function member "parameterize" that takes, as input, a symbol image and that returns, as output, a floating-point parameter value. Of course, in certain cases, a particular parameter may have only integer values, rather than floating-point values. The data structure "parameters" 1804 is declared on line 6. A portion of a class "pattern" is declared on lines 7-21. The class "pattern" includes private data members "patternNo" (1904 in FIG. 19A), declared on line 10, an array of parameter values "parameters" (1906 in FIG. 19A), declared on line 11, a number of indices "numIndices" (1906 in FIG. 19A), declared on line 12, and a set of indices (1908 in FIG. 19A) of cardinality "numIndices," declared on line 13, an integer value "numGraphemes" (1910 in FIG. 19A), and a set of grapheme codes "graphemes" (1912 in FIG. 19A), of cardinality "numGraphemes." The class "pattern" includes the function members "getParameter," declared on line 17, which returns a parameter value from the set of parameter values "parameters," the function member "getIndex," declared on line 18, which returns an index corresponding to a computed weight, and a function member "getGrapheme," declared on line 19, which returns a grapheme code from the set of grapheme codes "graphemes," declared on line 15. Finally, the class "cluster" is declared on lines 22-37, representing the cluster data structure 1806 in FIG. 18. The class "cluster" includes private data members num (1810 in FIG. 18), declared on line 25, "clusterParameters" (1808 in FIG. 18), declared on line 26, "cutoff" (1812 in FIG. 18), declared on line 27, an integer indicating the number of patterns within the cluster, "numPatterns," declared on line 28, and a pointer to the patterns contained within the cluster, "patterns," declared on line 29. The class "cluster" includes function members to get the cutoff value and number of patterns, "getCutoff" and "getNum," declared on lines 31 and 32, the function member "getParameter" that retrieves parameter indices from the array "clusterParameters," declared on line 32, the function member "getPattern" that returns a particular pattern stored within the cluster, declared on line 33, and the function member "getNumPatterns," declared on line 34, that returns the number of patterns stored within the cluster data structure.

The following pseudocode routine "vote" illustrates implementation of the preprocessing method with respect to a single symbol image and a single cluster:

```
36   void vote (symbolImage* s, cluster* c)
37   {
38       double params[MAX_PARAMETERS];
39       int i, j, k, l;
40       double weight, t;
41       pattern* p;
42
43       for (i = 0; i < c → getNum( ); i++)
44           params[i] = Parameters[c →
                 getParameter (i)].parameterize(s);
45       for (j = 0; j < c → getNumPattern( ); j++)
46       {
47           p = c → getPattern(i);
48           weight = 0;
49           for (i = 0; i < c → getNum( ); c++)
50           {
51               t = p → getParameter (i) – params [i];
52               weight + = (t < 0) ? – t : t;
53           }
54           if (weight > c → getCutoff( )) continue;
55           k = p → getIndex(weight);
56           for (l = 0; l < k; l++)
57               votes[p → getGrapheme(l)]++;
58       }
59   }
```

The routine "vote" receives, as arguments, a pointer to a symbol image and a pointer to a cluster. Local variables include the array "params" declared on line 38, that stores computed parameter values for the symbol image, iteration integers i, j, k, and l, declared on line 39, floating-point variables "weight" and "t," used to store a computed weight resulting from a comparison between the input symbol image and a pattern within the cluster, and a pointer p, declared on line 41, that points to a pattern within the input cluster. In the for-loop of lines 43-44, parameter values for all the parameters used by the cluster are computed for the input symbol image and stored in the array "params" (1924 in FIG. 19E). Next, in the outer for-loop of the nested for-loops of lines 45-58, each parameter within the input cluster is considered. On line 46, a pointer to the currently considered pattern is obtained by calling the cluster function member "getPattern." The local variable "weight" is set to 0, on line 48. Then, in the for-loop of lines 49-53, the weight that represents comparison of the input symbol image to the pattern is computed, as discussed above with reference to FIG. 19F. When the weight is greater than the cutoff value for the cluster, as determined on line 54, the current iteration of the outer for-loop of lines 44-58 is short circuited, since the input symbol image is not sufficiently similar to the currently considered pattern for voting. Otherwise, the local variable k is set to the last index of a grapheme code for voting, on line 55. Then, in the for-loop of lines 56-57, all of the graphemes up to the grapheme with code indexed by k are voted for.

There are many different alternative approaches to the preprocessing step and above-described data structures. For example, rather than a cutoff weight for an entire cluster, cutoff weights for particular patterns may be used, with the cutoff weights included in the pattern data structure. As another example, the indices stored within the pattern may be instances of classes that contain lists of grapheme codes, rather than indexes pointed into an ordered list of grapheme codes, as in the currently described implementation. Many other such alternative implementations are possible. For example, the routine "vote" may receive, as a second argument, a pointer to an array "params" and, in the for-loop of lines 43-44, may computer parameter values only when they have not already been computed while processing the symbol image with respect to other clusters. Different types of weight computations and symbol-image-to-pattern comparisons may be used in alternative implementations. In certain cases, larger-valued weights may indicate greater similarity between a symbol image and a pattern, unlike the above-described weights that increase in value as the similarity between a symbol image and a pattern decreases. In certain OCR systems, real coefficients may be associated with graphemes to allow for fractional votes and votes greater than 1. In certain OCR systems, graphemes, patterns, and/or clusters may be sorted, based on votes accumulated during preprocessing, to facilitate efficient subsequent symbol recognition. In certain implementations, a cluster data structure may include only a number of pattern data structures or references to pattern data structures, with the cutoff and patterns associated with the cluster specified in control logic, rather than stored in the cluster data structure.

Multi-Cluster Document Processing

In the previous discussion, cluster data structures were introduced, in FIG. 18 and the text that refers to FIG. 18, along with pattern data structures, discussed with reference to FIG. 19A. These data structures, and other data structures discussed with reference to FIGS. 18 and 19A-H, facilitate optical character recognition ("OCR") and OCR-based processing of symbol images in documents and other types of information-containing entities that contain symbol images. In the current subsection, a document-processing method that uses multiple cluster data structures for OCR-based document processing is discussed. First, in FIGS. 20A-M, multi-cluster OCR-based processing of symbol-image-containing documents is illustrated using illustration conventions similar to those employed in FIGS. 18 and 19A-H. Additional figures are used to illustrate pattern scoring and sorting of patterns within clusters. Finally, control-flow diagrams are used to illustrate one implementation of multi-cluster OCR-based document processing.

Figure 20A:
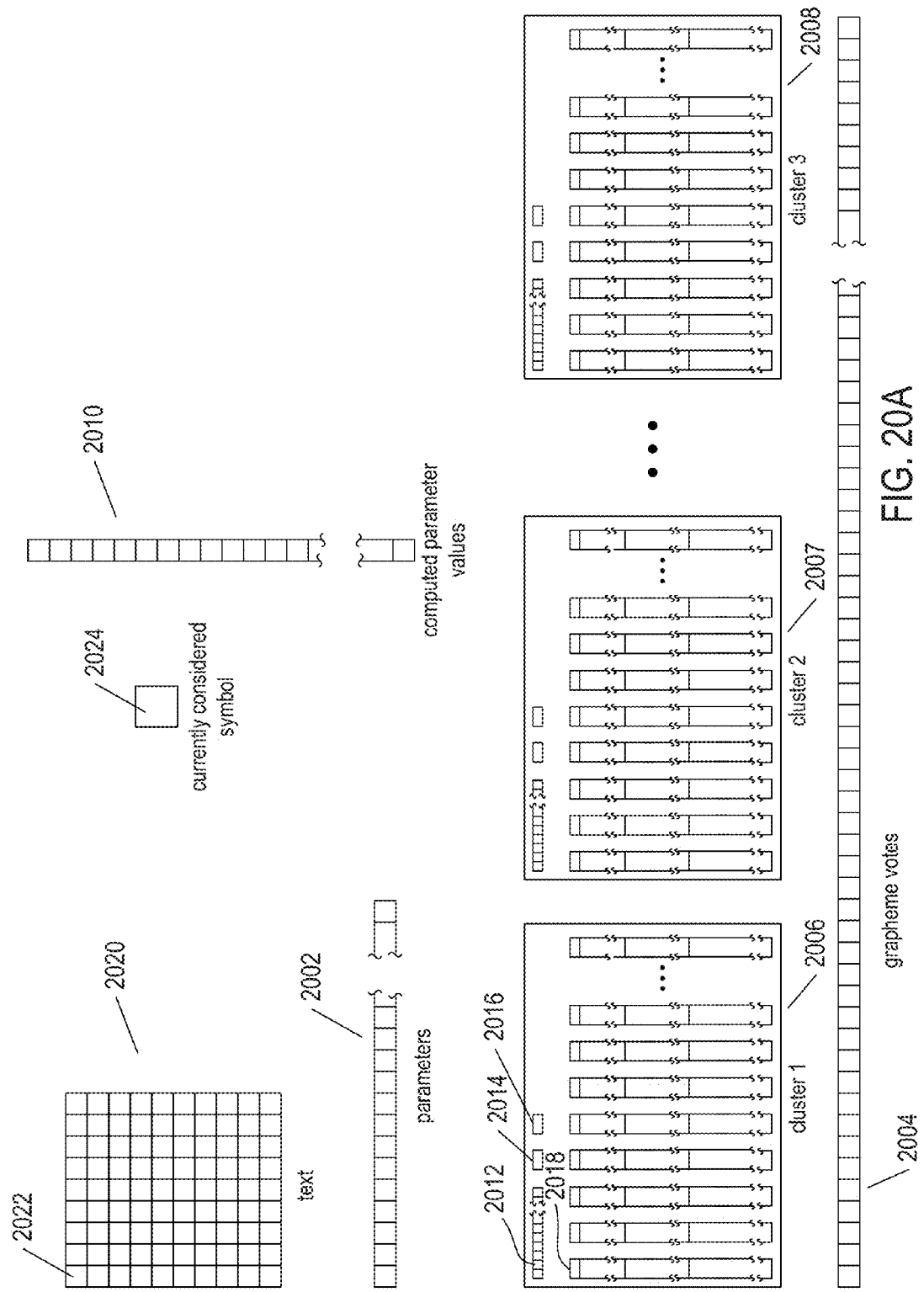
FIG. 20A illustrates multi-cluster OCR-based symbol-image-containing document processing.

FIG. 20A illustrates the data and data structures involved in one example of multi-cluster OCR-based document processing. The same illustration conventions that are used in FIG. 20A are also used in FIGS. 20B-O, which follow. In FIG. 20A, many of the data structures illustrated in FIGS. 18 and 19A-G are again shown. These include the parameters array 2002, shown as array 1804 in FIG. 18, a votes array 2004, shows as votes array 1802 in FIG. 18, three cluster data structures 2006-2008, each identical to the cluster data structure 1806 shown in FIG. 18, and an array of computed parameter values 2010, similar to the array of computed parameter values 1924 shown in FIG. 19F. Note that the data structures are initialized to include appropriate values, with the votes array initialized to have all zero values. Each cluster data structure, such as cluster data structure 2006, includes a parameters array 2012, similar to the clusterParameters array 1808 shown in FIG. 18, a num value 2014 and a cutoff value 2016, identical to the num and cutoff values 1810 and 1812 shown within cluster 1806 in FIG. 18, and multiple pattern data structures, such as pattern data structure 2018, identical to pattern data structure 1902 in FIG. 19A. In addition, FIG. 20A shows a two-dimensional-array-like data structure 2020 that represents a scanned image of a document page that includes a grid-like array of symbol images, with each cell of the grid, such as cell 2022, representing a symbol image. Also, a currently considered symbol-image variable 2024 is shown in FIG. 20A.

The data structures shown in FIG. 20A may be implemented in many different ways, using many different programming languages and data-storage techniques. The data structures may include additional data and data substructures. For example, in one implementation, each pattern data structure in each cluster is references from a sorted array of cluster-data-structure references. In alternative implementations, each pattern data structure in each cluster is associated with a numerical order, allowing the pattern data structures to be traversed in a sorted order. In certain implementations, the pattern data structures may be included in a cluster data structure, while, in other implementations, the pattern data structures may be referenced from the cluster data structure. In many implementations, the data structures may be dynamically expanded or contracted, to adjust to changes in the types of OCR processing to which they are applied. Thus, although the term "array" is used to describe the votes data structure, the votes data structure may be implemented using data structures other than simple arrays that allow for array-like indexing of elements.

The text data structure 2020 represents a page of a document that is to be processed by the multi-cluster OCR-based document processing method in order to generate an equivalent, electronic document containing symbol codes from the input scanned document containing symbol images. The terms "document," "page," and "symbol image" may have different meanings in different contexts. In the current example, a document consists of multiple pages and each page includes multiple symbol images. Of course, the same or a similar multi-cluster OCR-based document processing method can be applied to a variety of different types of documents, whether or not containing pages, that include one or more symbol images.

Figure 20B:
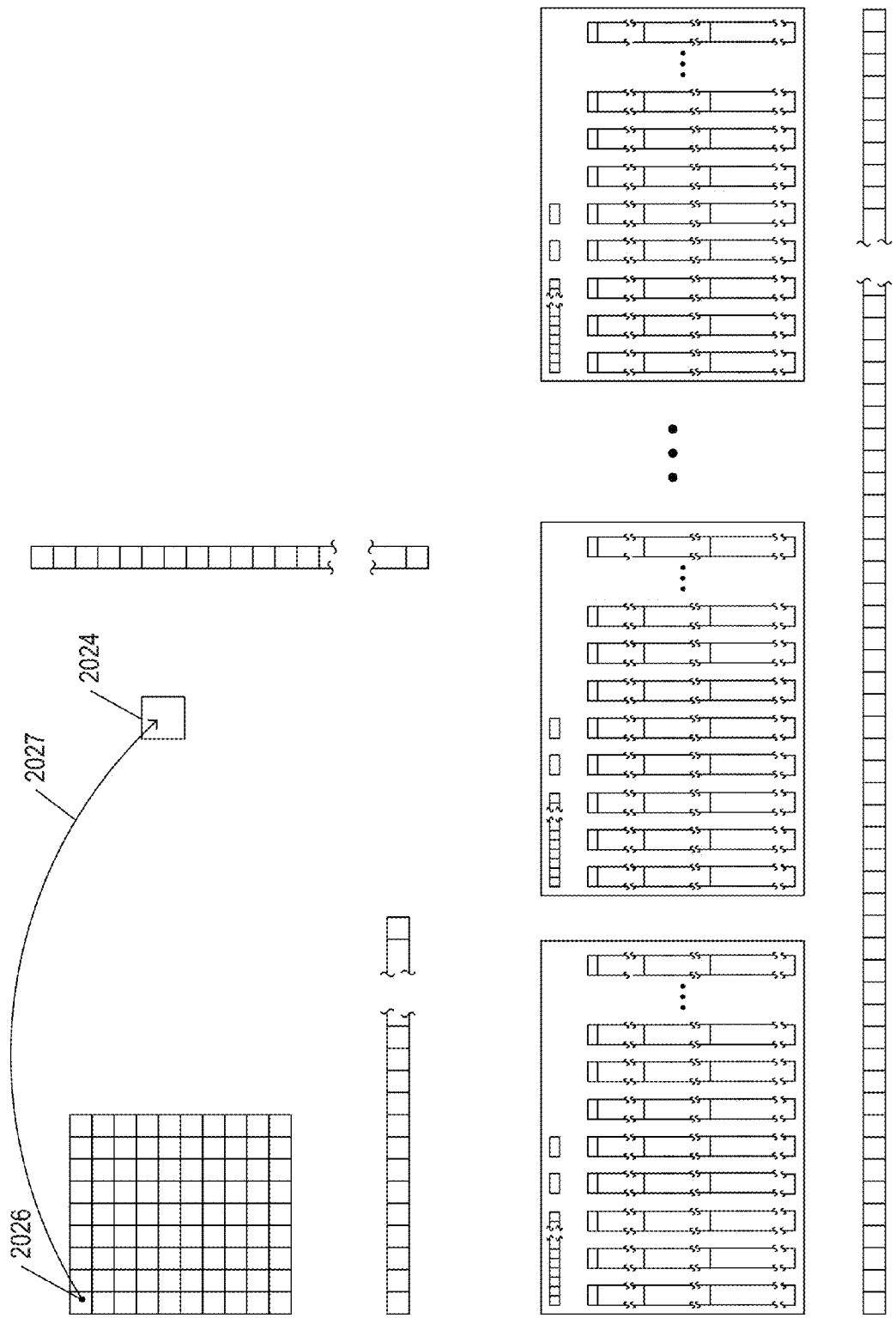
FIG. 20B illustrates multi-cluster OCR-based symbol-image-containing document processing.
Figure 20C:
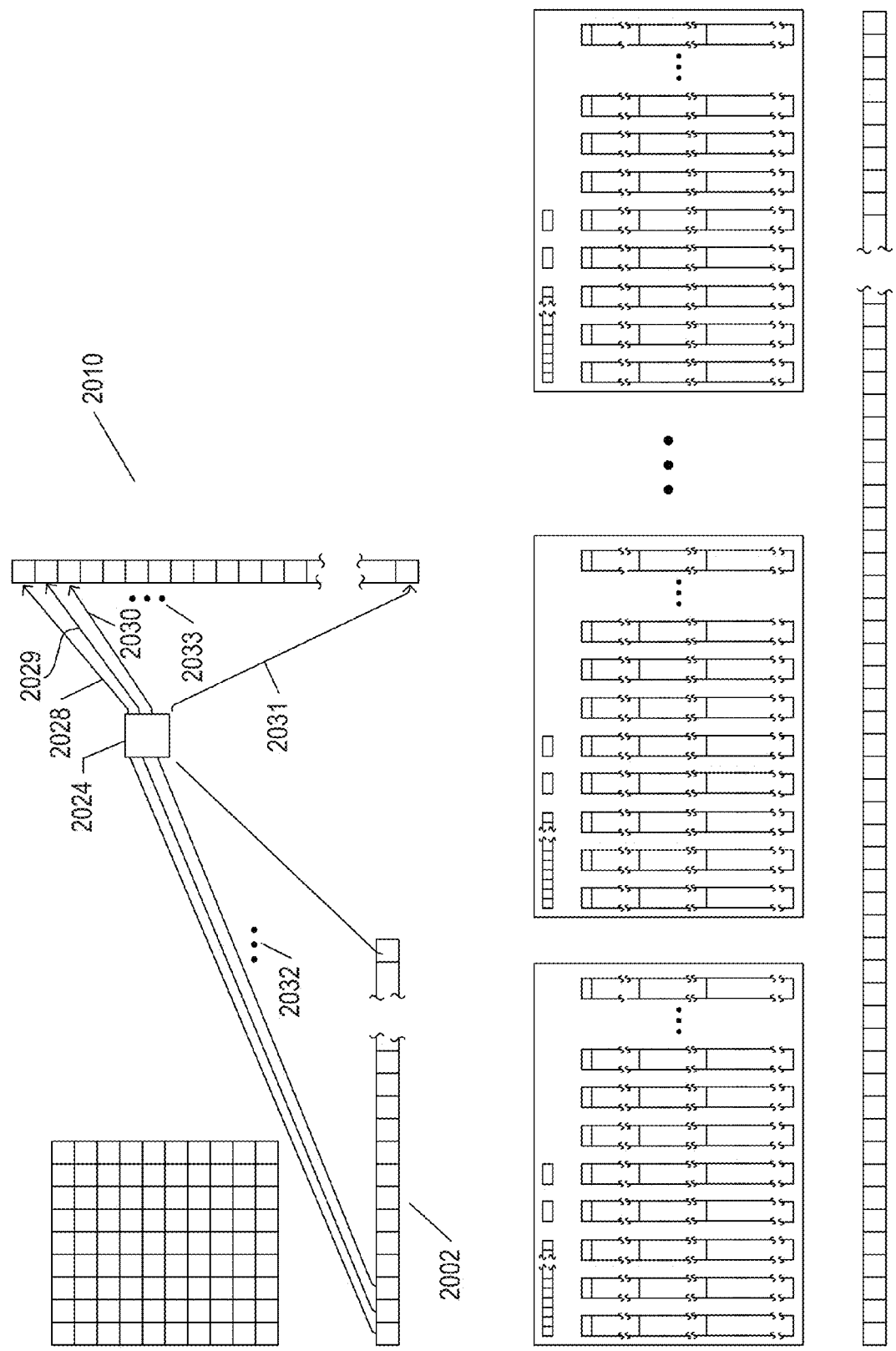
FIG. 20C illustrates multi-cluster OCR-based symbol-image-containing document processing.

In a first step, shown in FIG. 20B, an initial symbol image 2026 is read into, or referenced from, the currently considered symbol-image variable 2024, as represented by curved arrow 2027. Next, as illustrated in FIG. 20C, each parameter-computing function or routine included in, or referenced from, the parameters array 2002 is applied to the currently considered symbol image stored in, or referenced from, variable 2024 to generate corresponding parameter values stored in the array of computed parameter values 2010, as represented by arrows 2028-2031 and ellipses 2032-2033. Thus, the array of computed parameter values 2010 includes, in one implementation, numeric parameter values, corresponding to each of the parameters represented by functions or references to functions in parameter array 2002, computed with respect to a currently considered symbol image. Computation of parameter values is previously discussed with reference to FIGS. 19C-D.

Figure 20D:
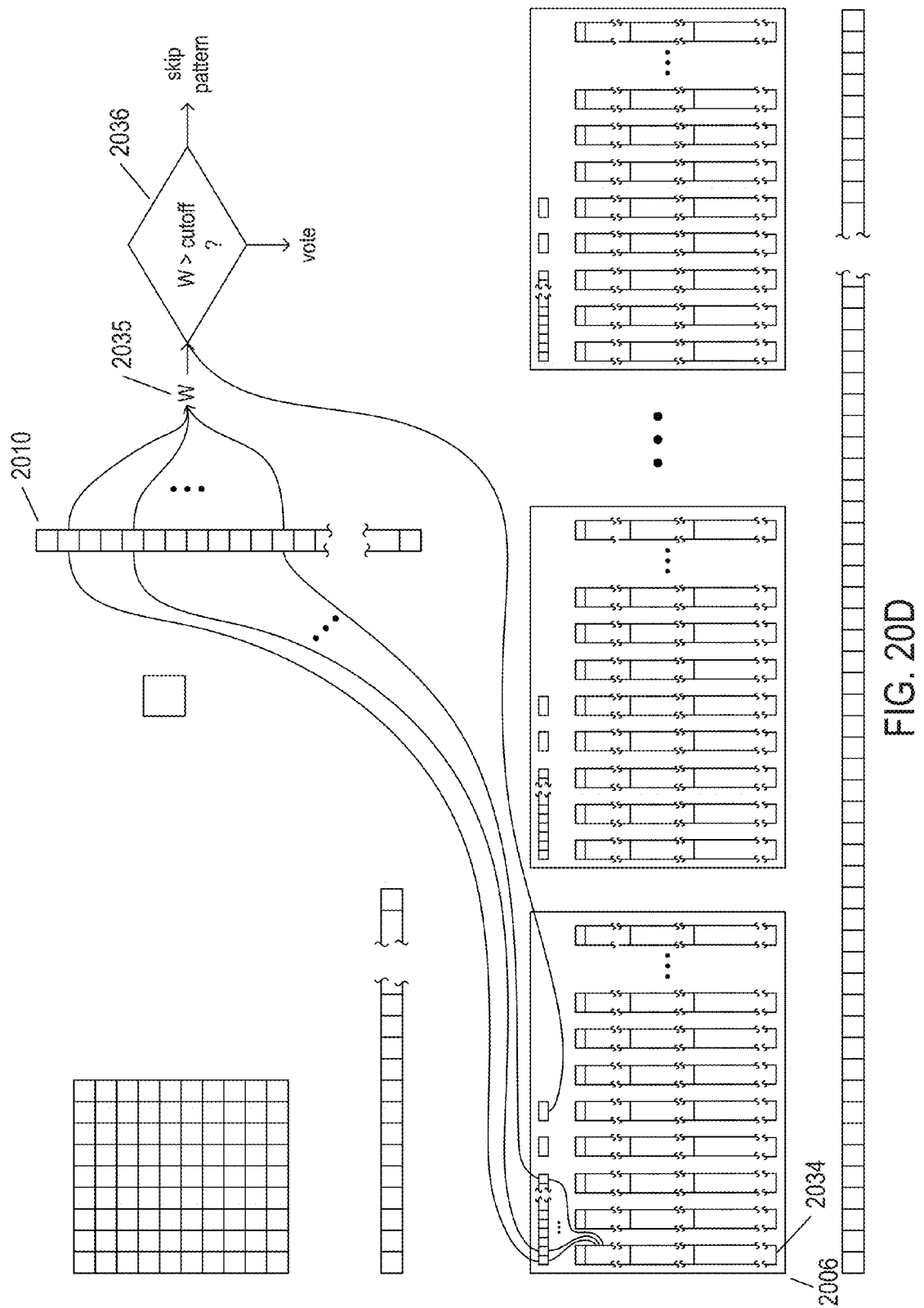
FIG. 20D illustrates multi-cluster OCR-based symbol-image-containing document processing.

Next, as shown in FIG. 20D, the first pattern data structure 2034 of the first cluster data structure 2006 is selected and the parameter values associated with the first pattern data structure are used, together with corresponding parameter values in the array of computed parameter values 2010 to computer a weight W 2035, as previously discussed above with reference to FIG. 19F. Note that the cluster-data-structure parameter array (2012 in FIG. 20A) is used to index the array of computed parameter values. As discussed above with reference to FIG. 19G, the computed weight is then compared with the cutoff value (2016 in FIG. 20A) 2036 to determine whether or not the first pattern data structure 2034 in the first cluster data structure 2006 can vote for graphemes, as discussed above with reference to FIG. 19H. In the current example, as shown in FIG. 20E, the computed weight 2035 is below the cutoff value, resulting in accumulation of votes in the votes array 2024 produced from the first pattern data structure 2034 in the first cluster data structure 2006. As discussed previously with reference to FIG. 19H, the computed weight 2035 is used as an index into a set of indices 2038 within the first pattern data structure 2034 and the contents of a selected member of the indices is used 2039 as an index into a grapheme-code-portion of the first pattern data structure 2040. Votes are generated for all graphemes corresponding to grapheme codes in the grapheme-code portion of the first pattern data structure from the first grapheme code down to the grapheme code indexed by the index selected from the indices portion of the pattern data structure. In FIG. 20E, the votes produced from the first pattern data structure 2034 within the first cluster data structure 2006 are represented by curved arrows 2042-2046. The blank values in the votes array (2004 in FIG. 20A) represent 0 values. The initial voting corresponding to the first pattern data structure 2034 in the first cluster data structure 2006 therefore increments the cumulative vote values 2047-2051 from 0 to 1 within the votes array for those graphemes for which corresponding grapheme codes are selected from the first pattern data structure. In alternative implementations, a vote may involve adding a number other than 1 to the value contained in the votes array.

Next, as shown in FIG. 20F, the second pattern data structure 2052 from the first cluster data structure 2006 is selected and the process described with reference to FIG. 20D is again repeated. In the current example, however, the computed weight for the second pattern data structure is above the cutoff value for the first cluster, and so no voting occurs. As shown in FIG. 20G, the third pattern data structure 2053 in the first cluster data structure 2006 is next selected for processing, and the steps illustrated in FIGS. 20D-E are repeated. In the current example, as shown in FIG. 20G, the computed weight for the pattern data structure is less than or equal to the cutoff value, and therefore votes are produced by the third pattern data structure 2053 and accumulated in the votes array 2004, as indicated by curved arrows 2054-2057. Note that the third pattern data structure votes 2055 for grapheme 2048, previously voted for by the first pattern data structure 2034, as shown in FIG. 20E. Thus, the total cumulative votes for this grapheme is now 2.

Figure 20H:
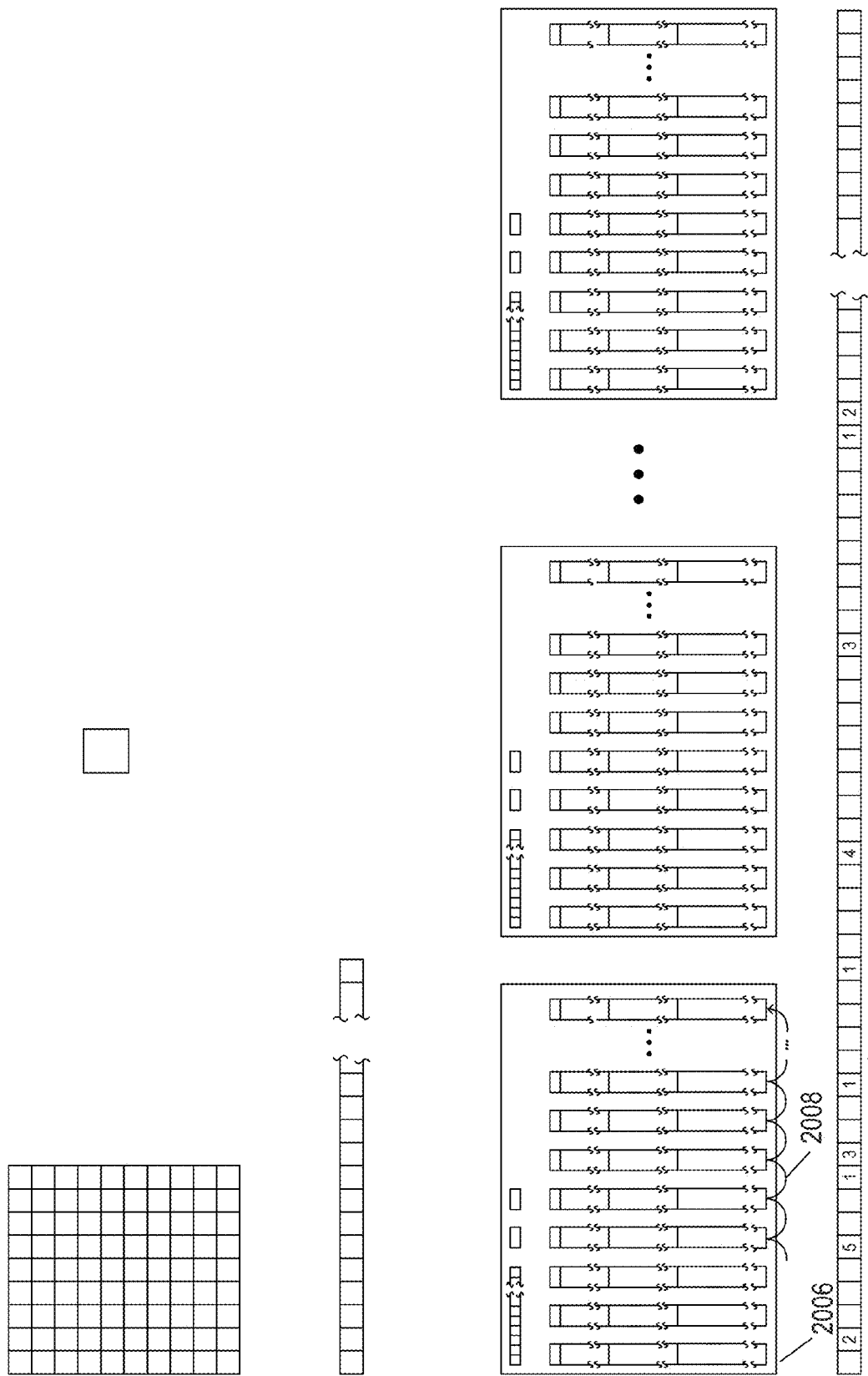
FIG. 20H illustrates multi-cluster OCR-based symbol-image-containing document processing.
Figure 20I:
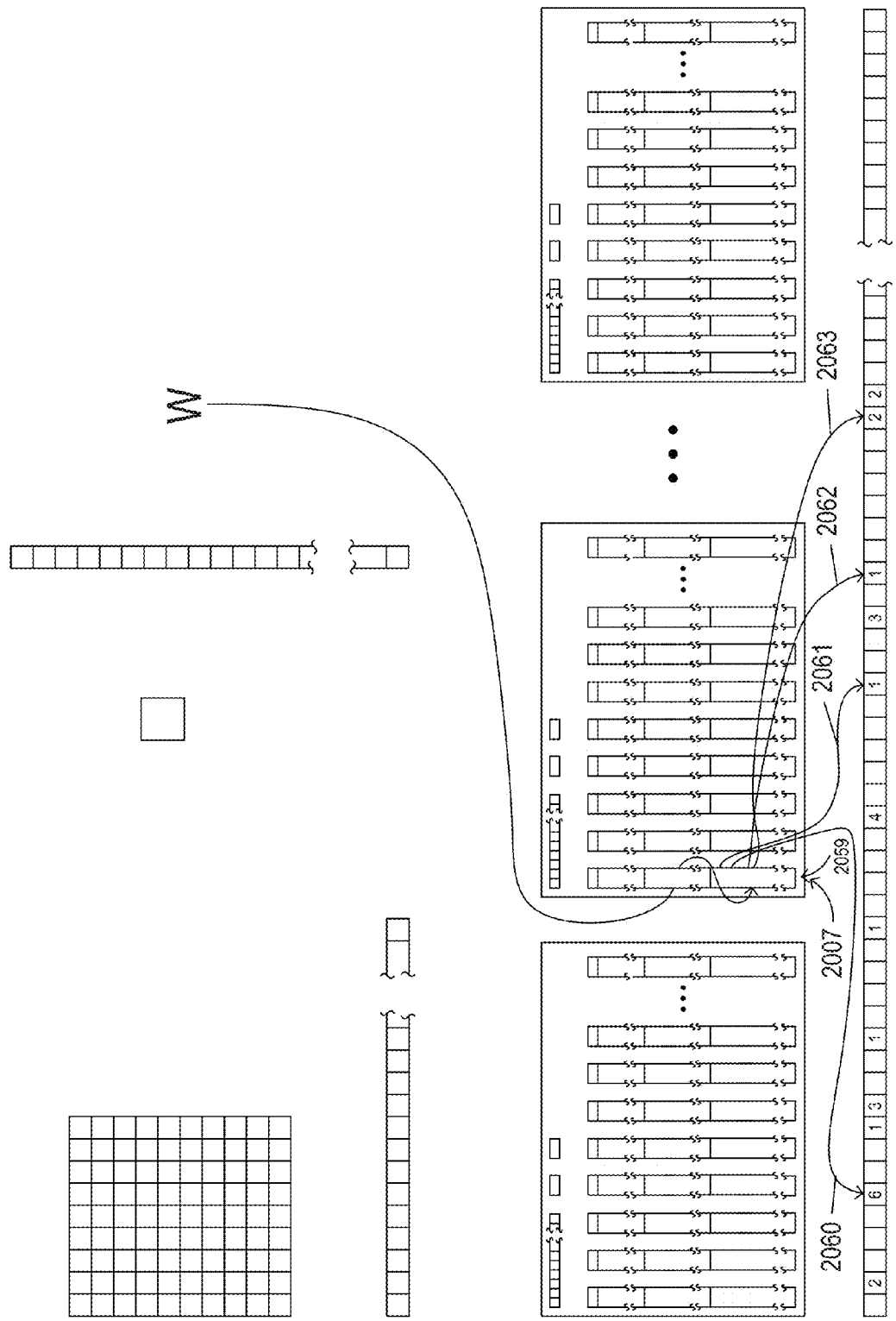
FIG. 20I illustrates multi-cluster OCR-based symbol-image-containing document processing.

As shown in FIG. 20H, the same process is repeated for each successive pattern data structure within the first cluster data structure 2006, as indicated by the serpentine curved arrow 2058, with any votes generated from the remaining pattern data structures accumulated in the votes array 2004. Next, as shown in FIG. 20I, the first pattern data structure 2059 in the second cluster data structure 2007 is selected and the steps illustrated in FIGS. 20D-E are carried out for this first pattern data structure 2059 in the second cluster data structure 2007, with the pattern data structure generating votes, in the current example, as indicated by curved arrows 2060-2063. It should be noted that the parameters referenced from the parameters array in each cluster, such as parameters array 2012 in cluster 2006, may differ from the parameters referenced from other clusters. In other words, each cluster data structure includes a parameters array that may reference a unique set of parameters associated with the cluster. There may be no, some, or substantial overlap between the parameters referenced from one cluster and the parameters referenced from another cluster. Each cluster represents a specialized recognition machine for families or sets of similar symbols. Because the different families or sets of symbols are best recognized using different corresponding sets of parameters, each cluster includes a parameters array to reference the particular parameters in the global parameters array (2002 in FIG. 20A) used by the cluster to recognize symbols of the family or set of symbols which the cluster is particularly designed to recognize. In addition, each cluster may employ a different number of pattern data structures, and, like the parameters referenced from clusters, there may be no, some, or substantial overlap between the parameter data structures referenced from one cluster and the parameter data structures referenced from another cluster.

Figure 20J:
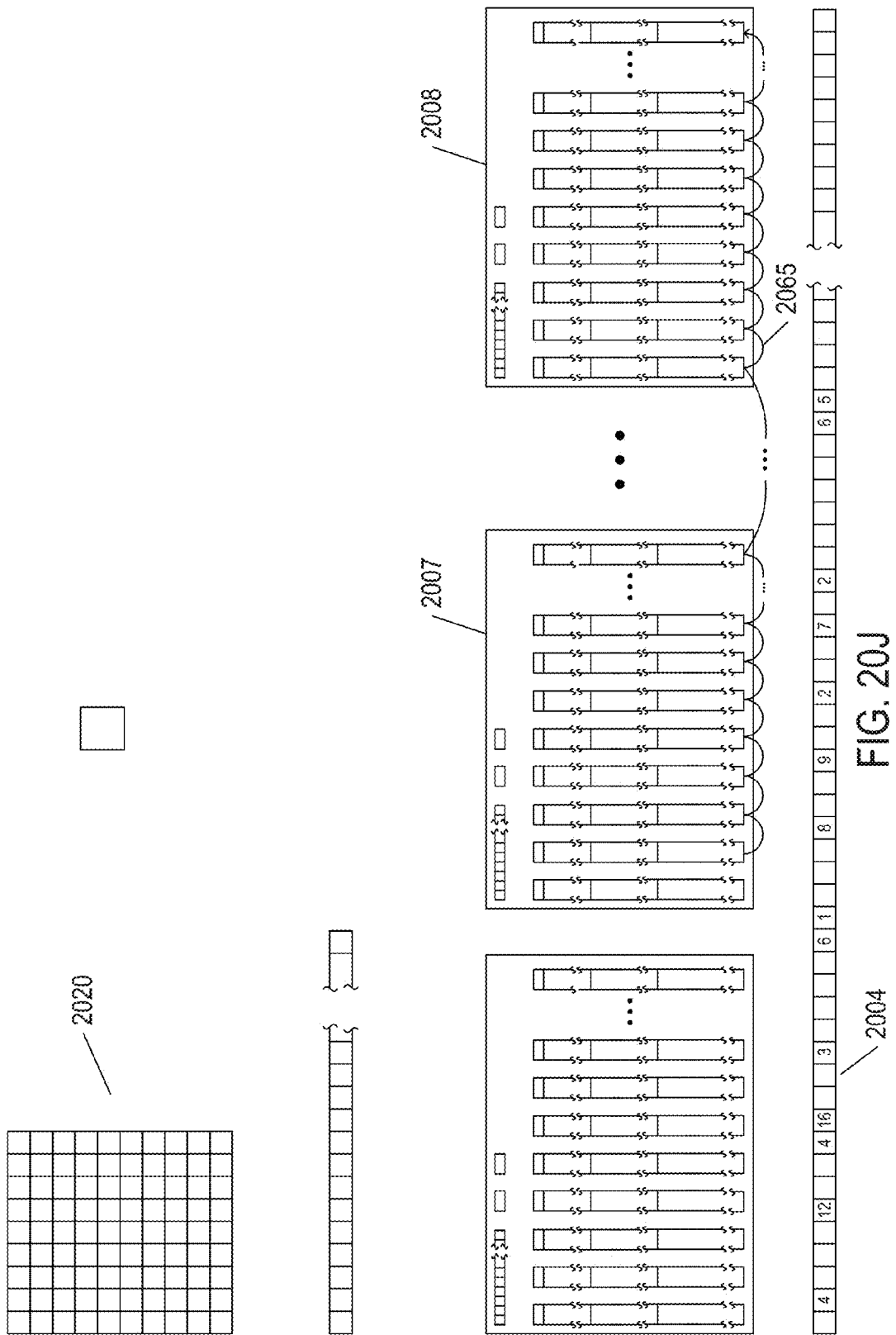
FIG. 20J illustrates multi-cluster OCR-based symbol-image-containing document processing.

As indicated by the serpentine arrow 2065 in FIG. 20J, processing continues with respect to each successive pattern data structure in the second cluster data structure 2007 and all additional cluster data structures including the final cluster data structure 2008. All of the votes generated from the pattern data structures are accumulated in votes array 2004. This constitutes processing of the first symbol image selected from the text page 2020.

Figure 20K:
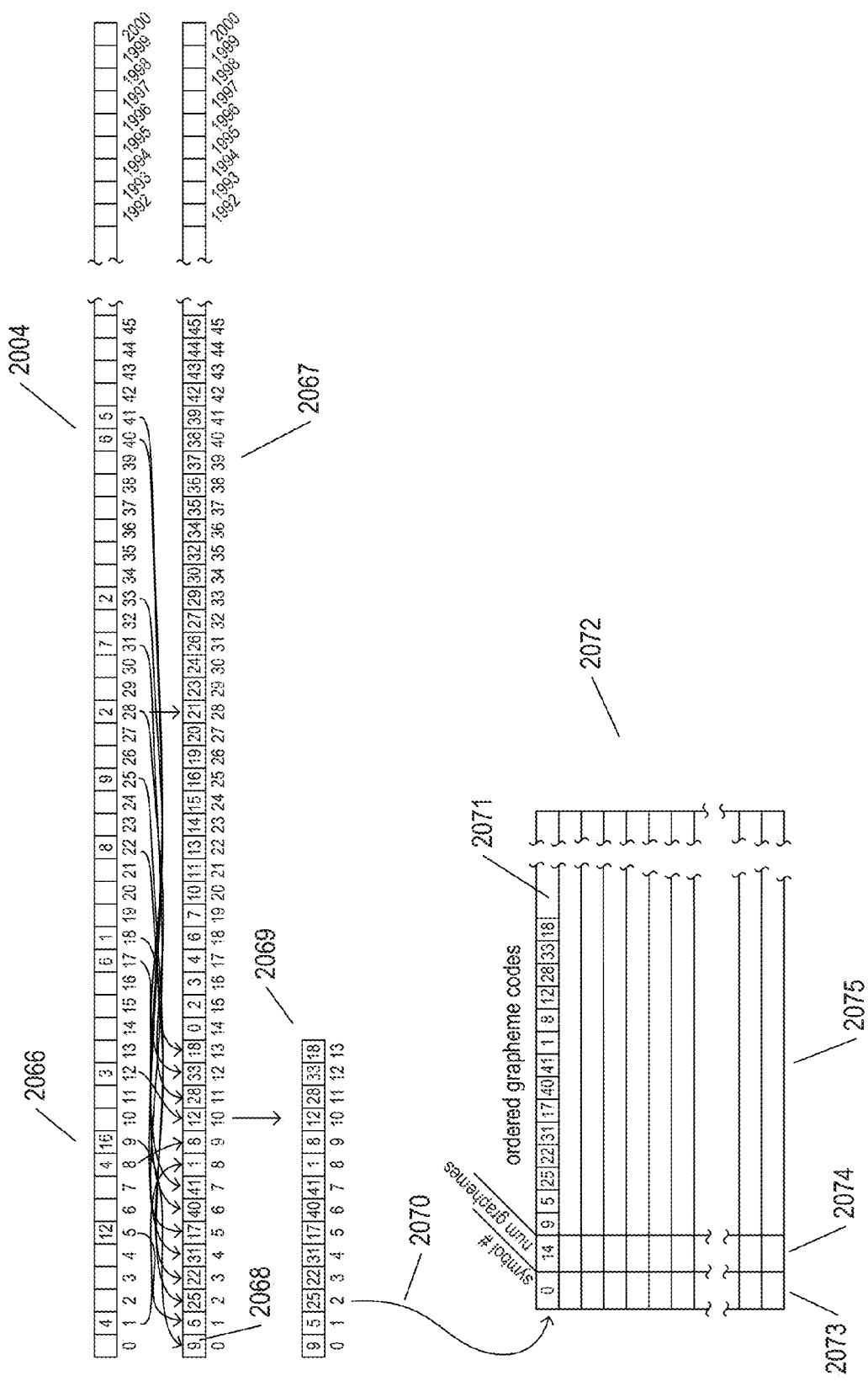
FIG. 20K illustrates multi-cluster OCR-based symbol-image-containing document processing.

Next, as shown in FIG. 20K, the votes accumulated in the votes array for the first symbol image selected from the text page are used to prepare a sorted list of grapheme codes corresponding to the graphemes most frequently matched to the symbol image in the process discussed above with reference to FIGS. 20B-J, as indicated by the accumulated votes for the grapheme codes in the votes array. In FIG. 20K, the votes array 2004 is shown at the top of the figure. Each cell in the votes array contains a number of votes, and the cells are indexed by grapheme code. The votes and grapheme code indexes are then sorted, in descending vote-number order, to produce a sorted array 2067 in which each cell contains a grapheme code and the indices are monotonically increasing, from left to right, to indicate the order of the grapheme codes with respect to the votes which the grapheme codes received during the processing described in FIGS. 20B-J. For example, the greatest number of votes, 16, was received by grapheme code "9" 2066, and therefore the grapheme code "9" appears in the first entry 2068 of the sorted array of grapheme codes 2067. Next, the sorted array 2067 is truncated to produce a truncated grapheme-code sorted array 2069. The truncated grapheme-code sorted array includes a sorted list of grapheme codes that received votes in the process discussed above with reference to FIGS. 20B-J. In the process discussed with reference to FIGS. 20B-J, only 14 grapheme codes received votes and, therefore, the truncated grapheme-code array 2069 includes only 14 entries. These are the first 14 entries in sorted grapheme-code array 2067. The remaining entries in the sorted grapheme-code array 2067, following the fourteenth entry with index 13, include the grapheme codes for which no votes were received. Then, as indicated by curved arrow 2070, the truncated grapheme-code array is included in a first entry 2071 of a processed symbol image table 2072. Each entry of the processed symbol image table includes a field indicating the number or order of the symbol within the text data structure (2020 in FIG. 20A), represented by a first column 2073, a field that contains a numeric indication of the number of grapheme codes that received votes when the symbol was processed, represented by a second column 2074 in the processed symbol image table, and the truncated grapheme-code sorted array, represented by a third column 2075 in the processed symbol image table 2072.

In certain implementations, rather than using a processed symbol image table, the truncated grapheme-code sorted array is immediately used by additional symbol-recognition logic to generate a matching symbol for the symbol image. This recognized symbol can then be immediately placed into a processed page corresponding to the page containing symbol images that is being processed by the method discussed above with reference to FIGS. 20A-J. However, in the implementation currently discussed, the truncated grapheme-code sorted arrays for the symbol images are accumulated in the processed symbol image table for each document page. The truncated grapheme-code sorted arrays are then employed, in a second phase, to transform the symbol images within a document page into symbols included within a processed document page. In either case, the truncated grapheme-code sorted array represents the result of initial, multi-cluster processing, which identifies a set of grapheme codes most likely related to a symbol image within the image of a page of a document. In the currently described implementation, all grapheme codes that received votes are included in each truncated grapheme-code sorted arrays. In alternative implementations, only those grapheme codes with a number of votes above a threshold are included in each truncated grapheme-code sorted array.

Figure 20L:
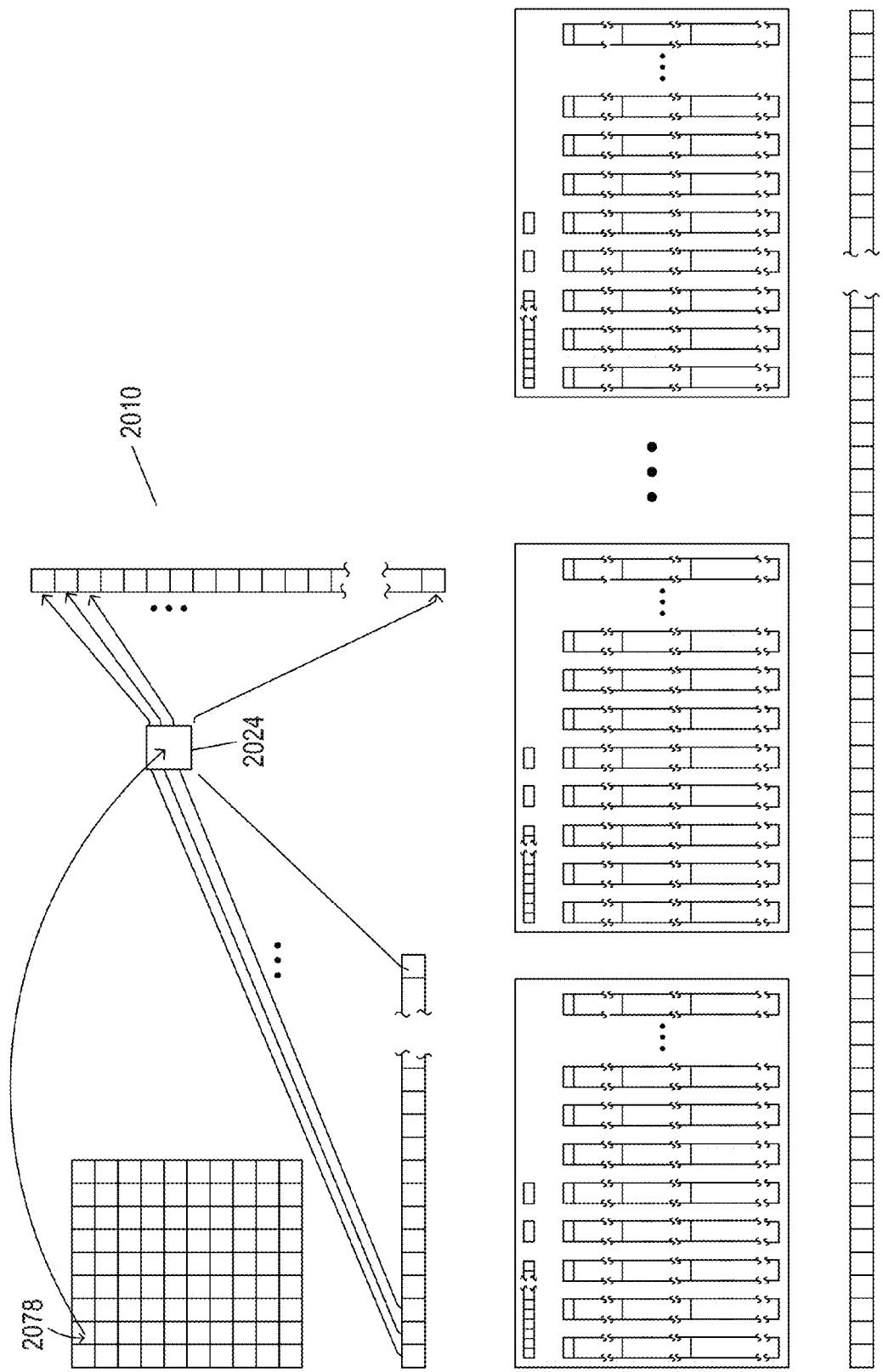
FIG. 20L illustrates multi-cluster OCR-based symbol-image-containing document processing.
Figure 20N:
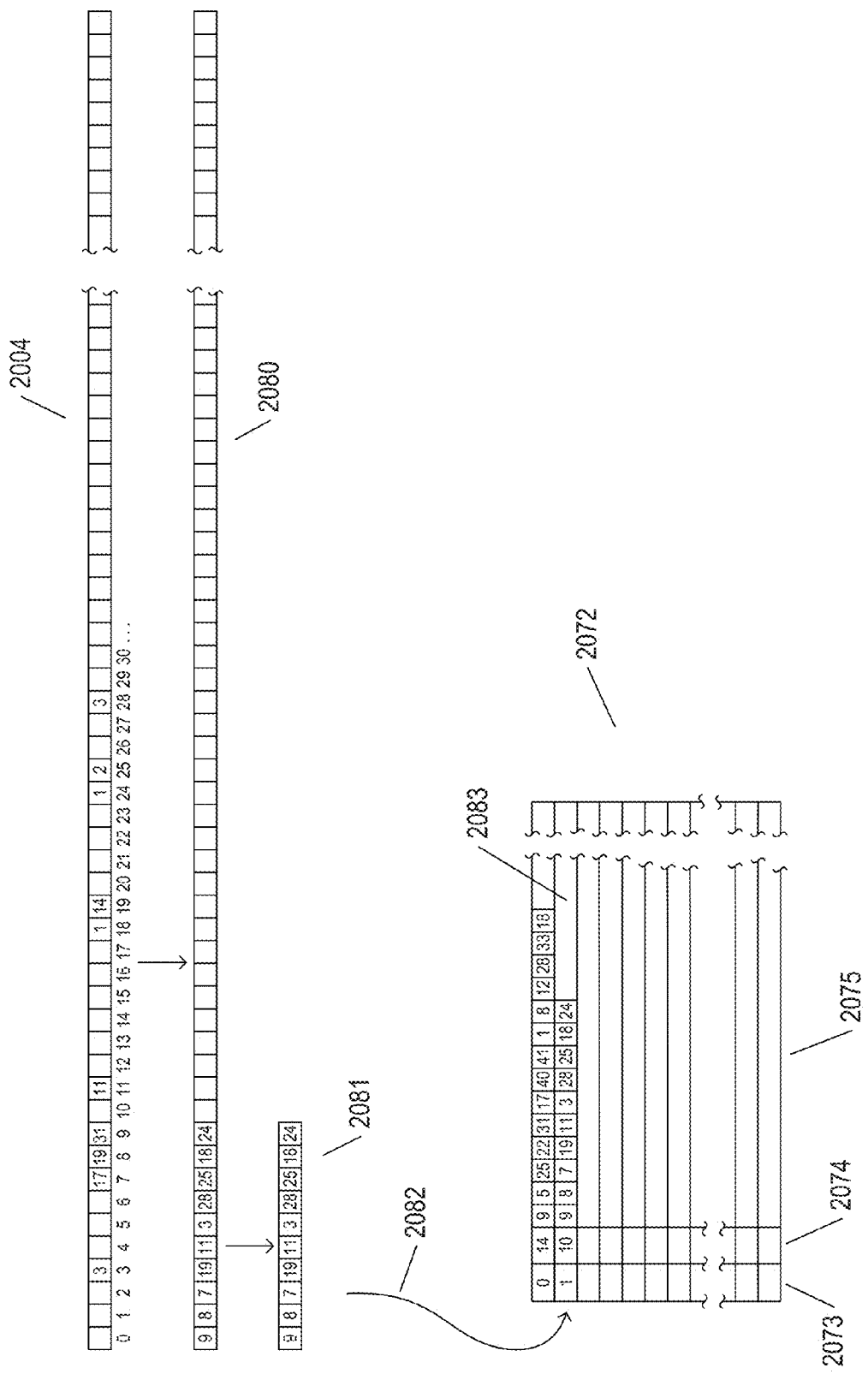
FIG. 20N illustrates multi-cluster OCR-based symbol-image-containing document processing.
Figure 20C:
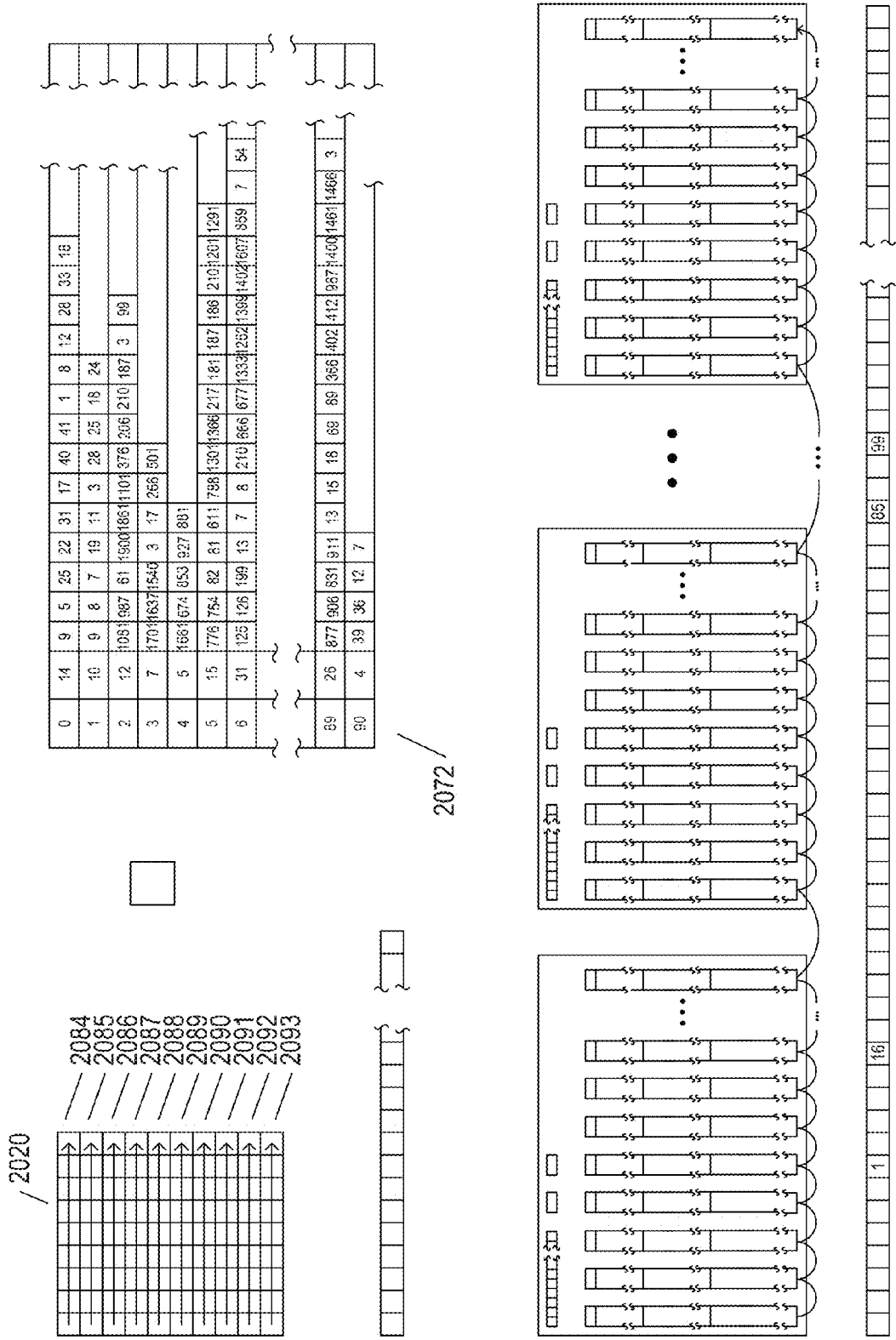

Once the first symbol image extracted from the document page has been processed, and an entry for the symbol image entered into the processed symbol image table, the second symbol image 2078 is then selected from the text data structure (2020 in FIG. 20A) and placed into symbol image variable 2024, and parameter values are computed for the next symbol and stored in the array of computed parameter values 2010, as shown in FIG. 20L, and as previously discussed above with reference to FIG. 20C. Then, as shown in FIG. 20M, the second symbol image is processed, using the method discussed above with reference to FIGS. 20C-J, to produce a new set of accumulated votes in the votes array 2004 for the second symbol image. As shown in FIG. 20N, the accumulated votes for the second symbol image 2004 are sorted by the number of votes to produce a sorted grapheme-code array 2080, as previously discussed above with reference to FIG. 20K. The sorted grapheme-code array 2080 is then truncated to produce a truncated grapheme-code sorted array 2081 which is included, as indicated by curved arrow 2082, in a second entry 2083 in the processed symbol image table 2072 that represents the second symbol image 2078.

As shown in FIG. 20O, each symbol image in the text document 2020 is successively processed by the set steps discussed above with reference to FIGS. 20B-J, as indicated by arrows 2084-2093, to accumulate votes in the votes array 2004 for each symbol image. The accumulated votes for each symbol image are then used, in turn, to generate truncated grapheme-code sorted arrays for each of the symbol images that are included in entries for the symbol images in the processed symbol image table 2072. As a result of the cluster-based processing of symbol images in the text document, a processed symbol image table 2072 is produced which contains an entry for each symbol image in the text document. Each entry of the processed symbol image table represents an initial set of potentially matching graphemes for the symbol image. The set of potentially matching graphemes appears, in the truncated grapheme-code sorted array, in decreasing accumulated-vote order, so that the grapheme codes that received the most votes appear first in the truncated grapheme-code sorted array. A set of potentially matching grapheme codes, represented by a truncated grapheme-code sorted array, can then be used by additional character-recognition logic to determine a best symbol code for the symbol image from which the truncated grapheme-code sorted array was generated by the process described above with reference to FIGS. 20B-J.

Figure 21A:
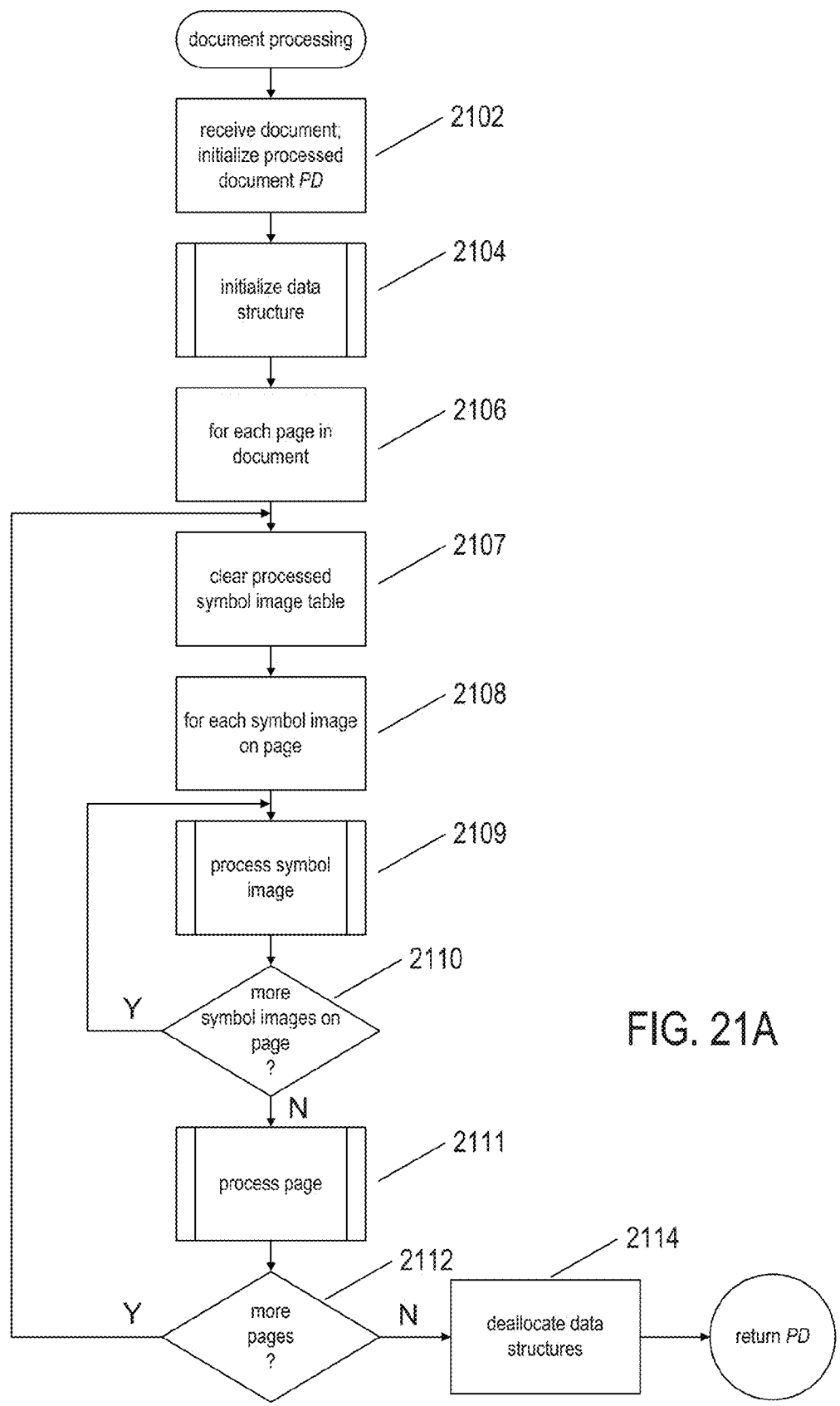
FIG. 21A illustrates using control-flow diagrams, one implementation of a multi-cluster OCR-based document processing method.

FIGS. 21A-D illustrate, using control-flow diagrams, one implementation of a multi-cluster OCR-based document processing method. FIG. 21A shows the highest level of the OCR-based document processing method. In step 2102, a document is received and a data structure corresponding to the processed document, PD, that will contain symbol codes corresponding to symbol images in the received document produced by the document-processing method, is initialized. Next, in step 2104, the data structures, discussed above with reference to FIGS. 18-20A, are initialized to prepare for document processing. Then, in the for-loop of steps 2106-2112, each page in the document is processed in order to replace symbol images in the received document with symbols, such as symbol codes or other computational representations of symbols, in the processed document PD. In a first step within the outer for-loop 2106-2112, the processed symbol image table, discussed above with reference to FIGS. 20K and 20N (2072 in FIGS. 20K and 20N), is cleared and re-initialized. Then, in an inner for-loop of steps 2108-2111, each symbol in the currently considered page is processed via a call to the routine "process symbol image" 2109. Upon completion of the nested for-loops of steps 2106-2112, the data structures used for OCR-based processing of the received document are deallocated, in step 2114, and the processed document PD is returned.

Figure 21B:
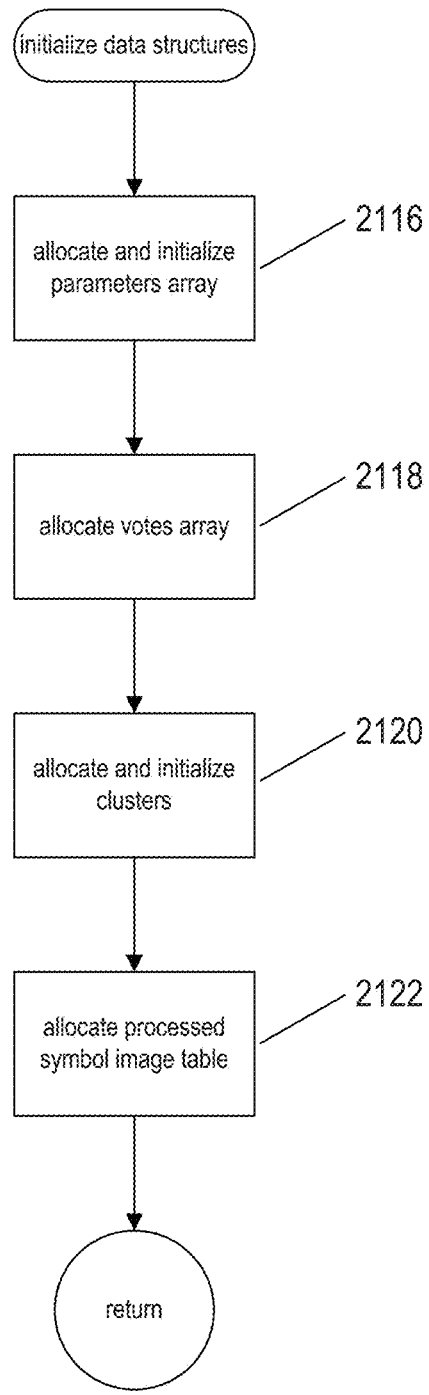
FIG. 21B illustrates using control-flow diagrams, one implementation of a multi-cluster OCR-based document processing method.

FIG. 21B shows the routine "initialized data structures," called in step 2104 of FIG. 21A. In step 2116, the parameters array (2002 in FIG. 20A) is allocated and initialized. In step 2118, the votes array (2004 in FIG. 20A) is allocated. In step 2120, the cluster data structures (2006-2008 in FIG. 20A) and data structures referenced from the cluster data structure or contained within the cluster data structures, including the local parameter arrays (2012 in FIG. 20A) and pattern data structures (2018 in FIG. 20A), are allocated and initialized. As discussed above, each cluster data structure may include a different set of references to parameters described by the global parameter array (2002 in FIG. 20A) as well as different pattern data structures and a different cutoff value than other cluster data structures. Each cluster data structure is specialized for recognizing a subset or family of symbol images for a particular language or set of related languages. Finally, in step 2122, the processed symbol image table (2072 in FIG. 20K) is allocated. In addition, various other variables and arrays are either statically allocated or dynamically allocated and initialized.

Figure 21C:
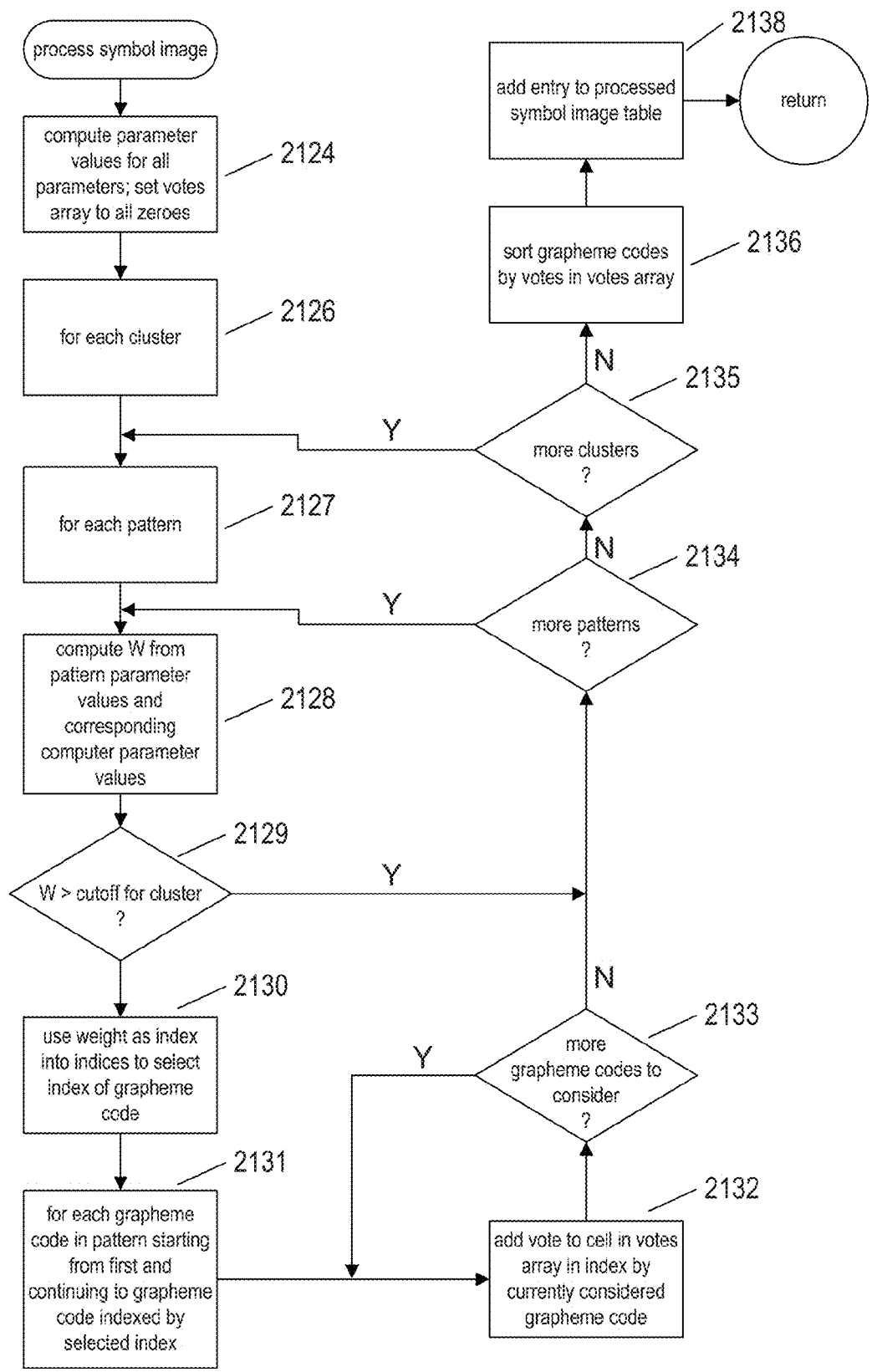
FIG. 21C illustrates using control-flow diagrams, one implementation of a multi-cluster OCR-based document processing method.

FIG. 21C provides a control-flow diagram for the routine "processed symbol image," called in step 2109 of FIG. 21A. In step 2124, the routine "process symbol image" computes parameters values for all of the parameters represented by parameter-value-calculating functions or references to parameter-value-calculating functions in the parameters array 2008. Then, in the nested for-loops of steps 2126-2135, the routine "process symbol image" processes a symbol image as discussed above with reference to FIGS. 20D-J. In the outer for-loop of steps 2126-2135, each cluster data structure is considered. In the first inner for-loop of steps 2127-2134, each pattern data structure within the currently considered cluster data structure is considered. In step 2128, the weight W is computed for the currently considered pattern data structure using the pattern parameter values contained in the pattern data structure and corresponding parameter values computed from the currently considered symbol image, as discussed above with reference to FIG. 20D. When the computed weight value is greater than the cutoff value for the cluster data structure, as determined in step 2129, then the currently considered pattern data structure is not further processed, and control flows to step 2134, discussed below. Otherwise, in step 2130, the computed weight is used as an index into the indices section of the pattern data structure to select an index into the grapheme-code portion of the pattern data structure. Then, in the innermost for-loop of steps 2131-2133, votes are added to vote-array cells indexed by each grapheme code in the pattern data structure, starting with the first grapheme code and proceeding through successive grapheme codes to the grapheme code indexed by the index selected in step 2130. In the currently described implementation, each vote adds 1 to the cumulative vote total for a grapheme. In alternative implementations, real-valued votes within a range, such as [0.0,1.0] may be employed. In additional implementations, integral vote values in a range of integer values may be used, with the magnitude of a vote related to how closely the pattern corresponding to a pattern data structure matches the grapheme. In step 2136, as discussed above with reference to FIG. 20K, the grapheme codes that have received votes during the processing of the currently considered symbol image are sorted into a truncated grapheme-code sorted array (2069 in FIG. 20K) and the truncated grapheme-code sorted array is then added, in step 2138, to an entry for the currently considered symbol image in the processed symbol image table (2072 in FIG. 20K).

Figure 21D:
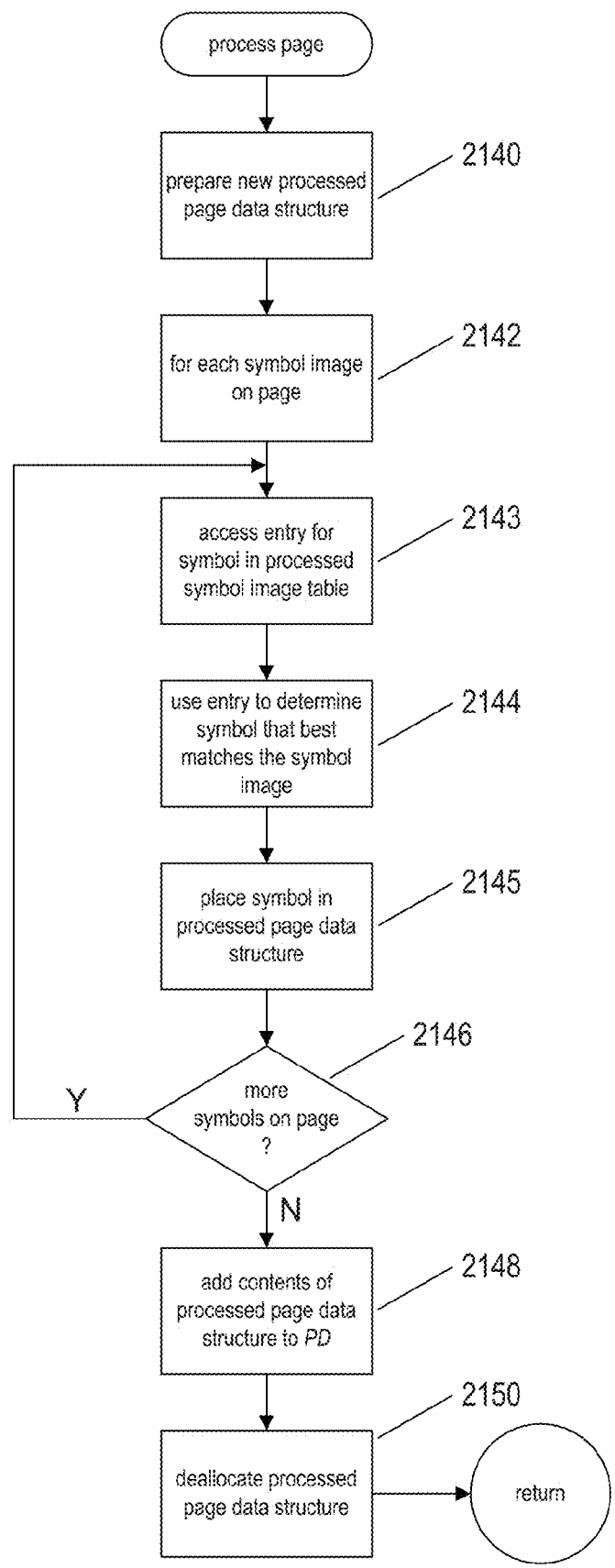
FIG. 21D illustrates using control-flow diagrams, one implementation of a multi-cluster OCR-based document processing method.

FIG. 21D illustrates, using a control-flow diagram, the routine "process page" called in step 2111 of FIG. 21A. In step 2140, a new processed page data structure that stores symbol codes or other representations of symbols for transfer to the processed document PD is initialized. Then, in the for-loop of steps 2142-2146, each symbol image within an image of a page of the text-containing document received in step 2102 of FIG. 21A is processed. In step 2143, the entry for the currently considered symbol image stored in the processed symbol image table is accessed and, in step 2144, used to determine a symbol that best matches the symbol image from among the graphemes codes associated with the symbol image during the processing of the symbol image by the routine "processed symbol image," illustrated in FIG. 21C. There are a variety of different methods that can be used to determine the symbol that best matches a symbol image. In step 2145, the symbol or symbol code representing the symbol is placed into a position within the processed page data structure corresponding to the position of the symbol image within the currently processed page of the received text-containing document. After all the symbol images have been processed, the contents of the processed page data structure are added to the processed document PD, in step 2148, and the processed page data structure is then deallocated, in step 2150.

Although the present invention has been described in terms of particular embodiments, it is not intended that the invention be limited to these embodiments. Modifications within the spirit of the invention will be apparent to those skilled in the art. For example, any of many different possible implementations of the data structures and methods used for preprocessing according to the generalized third implementation, described above, within an OCR system may be obtained by varying any of many different design and implementation parameters, including data structures, control structures, modular organization, programming language, underlying operating system and hardware, and many other such design and implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An optical-symbol-recognition system comprising:
 a memory device; and
 one or more processors, coupled to the memory device, to:
  receive a document image comprising a first symbol image of a plurality of symbol images;
  initialize a vote data structure that comprises a plurality of entries, an entry to store a cumulative vote of a plurality of cumulative votes and an associated grapheme of a plurality of graphemes, each grapheme corresponding to a symbol code of a plurality of symbol codes;
  determine, for the first symbol image, a cumulative vote for each of the plurality of graphemes, the cumulative vote based on a number of matches between the first symbol image and one or more graphemes of the plurality of graphemes;
  store determined cumulative votes for the first symbol image in the plurality of entries in the vote data structure;
  sort the plurality of entries in the vote data structure using the cumulative votes;
  select a grapheme from one of the plurality of entries that is identified based on an order associated with the cumulative votes; and
  generate a digital document comprising a symbol code corresponding to the selected grapheme.

2. The optical-symbol-recognition system of claim 1 further comprising:
 a set of data structures that are stored in the memory device, the set of data structures comprising:
  the votes data structure that comprises the plurality of cumulative votes, wherein:
   each cumulative vote of the plurality of cumulative votes is associated with a grapheme code of a respective grapheme of the plurality of graphemes,
   the plurality of cumulative votes in the votes data structure are indexed by grapheme codes;
  a plurality of pattern data structures, wherein:
   each of the plurality of pattern data structures represents a symbol pattern, and
   each of the plurality of pattern data structures comprises:
    an ordered set of parameter values;
    an ordered set of indices; and
    an ordered set of grapheme codes; and
  two or more cluster data structures, wherein each duster data structure comprises:
   an ordered set of references to parameters,
   a cutoff value, and a pattern data structure or multiple references to pattern data structures.

3. The optical-symbol-recognition system of claim 2 further comprising an ordered set of functions that generate parameter values from the plurality of symbol images.

4. The optical-symbol-recognition system of claim 3 wherein to determine, for the first symbol image, the cumulative vote for each of the plurality of graphemes, the one or more processors are further to:
 initialize the votes data structure; and
 accumulate a vote in the votes data structure for each match of the first symbol image and the one or more graphemes.

5. The optical-symbol-recognition system of claim 4 wherein the one or more processors are further to initialize the votes data structure further comprises setting each cumulative vote in the votes data structure to zero.

6. The optical-symbol-recognition system of claim 4 wherein to accumulate the vote in the votes data structure for each match of the first symbol image to the one or more graphemes the one or more processors are further: further comprises:
 select parameter values as a cluster-associated ordered set of parameter values, wherein the parameter values are generated by applying a function corresponding to each parameter referenced by the ordered set of references to parameters in the cluster data structure;
 evaluate the parameter values of the set of parameter values in the pattern data structure with respect to the parameter values in the cluster-associated ordered set of parameter values to generate a value; and
 when a comparison of the generated value and threshold value indicate that the symbol image is potentially related to the symbol pattern, add votes for the first symbol image to the plurality of cumulative votes stored in the votes data structure.

7. The optical-symbol-recognition system of claim 6 wherein the one or more processors are further to evaluate the parameter values of the set of parameter values in the pattern data structure with respect to the parameter values in the cluster-associated ordered set of parameter values to generate a value further comprises added the absolute values of differences between each parameter value of the set of parameter values in the pattern data structure and a corresponding parameter value in the cluster-associated ordered set of parameter values.

8. The optical-symbol-recognition system of claim 6 wherein to add votes for each of the one or more-graphemes to one or more cumulative votes stored in the votes data structure, the one or more processors are further to:
 select an index from the ordered set of indices within the pattern data structure using the generated value;
 select a grapheme code from the ordered set of grapheme codes within the pattern data structure using the selected index; and
 for each grapheme code in the ordered set of grapheme codes within the pattern data structure starting from a first grapheme code and ending with the selected grapheme code, index the votes data structure using the grapheme code to access a cumulative vote for a grapheme corresponding to the grapheme code and adding a value to the cumulative vote for the first set of graphemes.

9. The optical-symbol-recognition system of claim 2 wherein each cluster data structure comprises pattern data structures that are used to recognize symbol images corresponding to symbols of a set or family of related symbols.

10. A method comprising:
 receiving a document image comprising a first symbol image of a plurality of symbol images;
 initializing a vote data structure that comprises a plurality of entries, an entry to store a cumulative vote of a plurality of cumulative votes and an associated grapheme of a plurality of graphemes, each grapheme corresponding to a symbol code of a plurality of symbol codes;
 determining, for the first symbol image, a cumulative vote for each of the plurality of graphemes, the cumulative vote based on a number of matches between the first symbol image and one or more graphemes of the plurality of graphemes;
 storing determined cumulative votes for the first symbol image in the plurality of entries in the data structure;
 sorting the plurality of entries in the data structure using the cumulative votes;
 selecting a grapheme from one of the plurality of entries that is identified based on an order associated with the cumulative votes; and
 generating a digital document comprising a symbol code corresponding to the selected grapheme.

11. The method of claim 10 further comprising storing, in a memory device, a set of data structures, wherein the set of data structures comprises:
 the votes data structure that comprises the plurality of cumulative votes, wherein:
  each cumulative vote of the plurality of cumulative votes is associated with a grapheme code of a respective grapheme of the plurality of graphemes,
  the plurality of cumulative votes in the votes data structure indexed by grapheme codes;
 a plurality of pattern data structures, wherein:
  each of the plurality of pattern data structures represents symbol pattern, and
  each of the plurality of pattern data structures comprises:
   an ordered set of parameter values;
   an ordered set of indices; and
   an ordered set of grapheme codes; and
 two or more cluster data structures, wherein each cluster data structure comprises:
  an ordered set of references to parameters,
  a cutoff value, and
  a pattern data structure or multiple references to pattern data structures.

12. The method of claim 11 further comprising generating parameter values from symbol images using an ordered set of functions.

13. The method of claim 12 wherein identifying each grapheme of a set of graphemes that matches the first symbol image with respect to a symbol pattern is a set of symbol patterns further comprises:
 initializing the votes data structure; and
 accumulating a vote in the votes data structure for each match of the first symbol image and the one or more a grapheme.

14. The method of claim 13 wherein initializing the votes data structure further comprises setting each cumulative vote in the votes data structure to zero.

15. The method of claim 13 wherein accumulating the vote in the votes data structure for each match of a grapheme to the first symbol image with-respect to a symbol pattern further comprises:
 selecting, parameter values, as a cluster-associated ordered set of parameter values, wherein the parameter values are generated by applying a function corresponding to each parameter referenced by the ordered set of references to parameters in the cluster data structure to the symbol image, evaluating the parameter values of the set of parameter values in the pattern data structure with respect to the parameter values in the cluster-associated ordered set of parameter values to generate a value, and when a comparison of the generated value and threshold value indicate that the symbol image is potentially related to the symbol pattern, adding votes for the first grapheme to the plurality of cumulative votes stored in the votes data structure.

16. The method of claim 15 wherein evaluating the parameter values of the set of parameter values in the pattern data structure with respect to the parameter values in the cluster-associated ordered set of parameter values to generate a value further comprises added the absolute values of differences between each parameter value of the set of parameter values in the pattern data structure and a corresponding parameter value in the cluster-associated ordered set of parameter values.

17. The method of claim 15 wherein adding votes for the first symbol image to one or more cumulative votes stored in the votes data structure further comprises:
selecting an index from the ordered set of indices within the pattern data structure using the generated value;
selecting a grapheme code from the ordered set of grapheme codes within the pattern data structure using the selected index; and
for each grapheme code in the ordered set of grapheme codes within the pattern data structure starting from a first grapheme code and ending with the selected grapheme code, indexing the votes data structure using the grapheme code to access a cumulative vote for a grapheme corresponding to the grapheme code and adding a value to the cumulative vote for the first symbol image.

18. The method of claim 11 wherein each cluster data structure comprises pattern data structures that are used to recognize symbol images corresponding to symbols of a set or family of related symbols.

19. A non-transitory machine-readable storage medium having instructions that, when executed by a processing device, cause the processing device to perform operations comprising:
receive a document image comprising a first symbol image of a plurality of symbol images;
initialize a vote data structure that comprises a plurality of entries, an entry to store a cumulative vote of a plurality of cumulative votes and an associated grapheme of a plurality of graphemes, each grapheme corresponding to a symbol code of a plurality of symbol codes;
determine, for the first symbol image, a cumulative vote for each of the plurality of graphemes, the cumulative vote based on a number of matches between the first symbol image and one or more graphemes of the plurality of graphemes;
store determined cumulative votes for the first symbol image in the plurality of entries in the data structure;
sort the plurality of entries in the data structure using the cumulative votes;
select a grapheme from one of the plurality of entries that is identified based on an order associated with the cumulative votes; and
generate a digital document comprising a symbol code corresponding to the selected grapheme.

20. The non-transitory machine-readable storage medium of claim 19, wherein the operations further comprise storing, in a memory device, a set of data structures, wherein the set of data structures comprises:
the votes data structure that comprises the plurality of cumulative votes, wherein:
each cumulative vote of the plurality of cumulative votes is associated with a grapheme code of a respective grapheme of the plurality of graphemes,
the plurality of cumulative votes in the votes data structure are indexed by grapheme codes;
a plurality of pattern data structures, wherein:
each of the plurality of pattern data structures represents a symbol pattern, and
each of the plurality of pattern data structures comprises:
an ordered set of parameter values,
an ordered set of indices, and
an ordered set of grapheme codes; and
two or more cluster data structures, wherein each cluster data structure comprises:
an ordered set of references to parameters,
a cutoff value, and
a pattern data structure or multiple references to pattern data structures.

21. The optical-symbol-recognition system of claim 1, wherein the one or more processors are further to recursively select a symbol code for each symbol image of the plurality of symbol images in each page of a document.

22. The optical-symbol-recognition system of claim 1, wherein the one or more processors is further to normalize the plurality of symbol images.

* * * * *